(12) United States Patent
Nagaoka et al.

(10) Patent No.: US 12,378,131 B2
(45) Date of Patent: Aug. 5, 2025

(54) COMPOSITE OXIDE, METAL-SUPPORTED MATERIAL, AND AMMONIA SYNTHESIS CATALYST

(71) Applicant: Japan Science and Technology Agency, Kawaguchi (JP)

(72) Inventors: Katsutoshi Nagaoka, Nagoya (JP); Yuta Ogura, Kawaguchi (JP); Katsutoshi Sato, Nagoya (JP)

(73) Assignee: Japan Science and Technology Agency, Kawaguchi (JP)

( * ) Notice: Subject to any disclaimer, the term of this patent is extended or adjusted under 35 U.S.C. 154(b) by 650 days.

(21) Appl. No.: 17/053,436

(22) PCT Filed: May 7, 2019

(86) PCT No.: PCT/JP2019/018225
§ 371 (c)(1),
(2) Date: Nov. 6, 2020

(87) PCT Pub. No.: WO2019/216304
PCT Pub. Date: Nov. 14, 2019

(65) Prior Publication Data
US 2021/0246041 A1 Aug. 12, 2021

(30) Foreign Application Priority Data

May 7, 2018 (JP) .................................. 2018-089516
Sep. 18, 2018 (WO) ................. PCT/JP2018/034515
Mar. 26, 2019 (JP) .................................. 2019-059200

(51) Int. Cl.
*C01F 17/241* (2020.01)
*B01J 21/10* (2006.01)
(Continued)

(52) U.S. Cl.
CPC ............ *C01F 17/241* (2020.01); *B01J 21/10* (2013.01); *B01J 23/002* (2013.01); *B01J 23/10* (2013.01);
(Continued)

(58) Field of Classification Search
CPC ... C01F 7/241; C01F 7/32; B01J 21/10; B01J 23/002; B01J 23/10; B01J 23/58;
(Continued)

(56) References Cited

U.S. PATENT DOCUMENTS 6,044,644 A 4/2000 Hu et al.
6,350,421 B1 2/2002 Strehlau et al.
(Continued)

FOREIGN PATENT DOCUMENTS

CA 2280631 A1 2/2000
CN 1263789 A 8/2000
(Continued)

OTHER PUBLICATIONS

Ivanova et al., "New Y(La)—M—O Binary Systems (M = Ca, Sr, or Ba): Synthesis, Physicochemical Characterization, and Application as the Supports of Ruthenium Catalysts for Ammonia Synthesis", Kinetics and Catalysis, 2004, pp. 541-546, vol. 45, No. 4.
(Continued)

*Primary Examiner* — James A Fiorito
(74) *Attorney, Agent, or Firm* — The Webb Law Firm

(57) ABSTRACT

A composite oxide including a metal element represented by the composition of general formula: $A_nX_y$, where the composite oxide comprises an oxide of A and an oxide of X in a mixed state: A represents an element selected from the group consisting of Sc, Y, and a trivalent lanthanoid; X represents an element selected from the group consisting of Ca, Sr, and Ba; n is $0<n<1$; y is $0<y<1$; and $n+y=1$. Also, a
(Continued)

metal-supported material in which cobalt particles are supported on the composite oxide.

10 Claims, 19 Drawing Sheets

(51) Int. Cl.
| | |
|---|---|
| B01J 23/00 | (2006.01) |
| B01J 23/10 | (2006.01) |
| B01J 23/58 | (2006.01) |
| B01J 23/63 | (2006.01) |
| B01J 23/83 | (2006.01) |
| B01J 35/40 | (2024.01) |
| B01J 37/00 | (2006.01) |
| B01J 37/02 | (2006.01) |
| B01J 37/04 | (2006.01) |
| B01J 37/08 | (2006.01) |
| B01J 37/18 | (2006.01) |
| C01C 1/04 | (2006.01) |
| C01F 17/32 | (2020.01) |

(52) U.S. Cl.
CPC ............... *B01J 23/58* (2013.01); *B01J 23/63* (2013.01); *B01J 23/83* (2013.01); *B01J 35/40* (2024.01); *B01J 37/0036* (2013.01); *B01J 37/0207* (2013.01); *B01J 37/04* (2013.01); *B01J 37/082* (2013.01); *B01J 37/18* (2013.01); *C01C 1/0411* (2013.01); *C01F 17/32* (2020.01); *C01P 2002/01* (2013.01); *C01P 2002/72* (2013.01); *C01P 2002/82* (2013.01); *C01P 2004/38* (2013.01)

(58) Field of Classification Search
CPC . B01J 23/63; B01J 23/83; B01J 35/023; B01J 37/0036; B01J 37/0207; B01J 37/04; B01J 37/082; B01J 37/18; C01C 1/0411
See application file for complete search history.

(56) References Cited

U.S. PATENT DOCUMENTS

| | | | |
|---|---|---|---|
| 8,133,463 B1 | 3/2012 | Berry et al. | |
| 10,792,645 B2 | 10/2020 | Hosono et al. | |
| 2004/0204315 A1* | 10/2004 | Krumpelt ............... | B01J 23/002 502/303 |
| 2009/0283419 A1* | 11/2009 | Del-Gallo ........ | B01D 67/00931 205/628 |
| 2010/0022759 A1 | 1/2010 | Yamauchi | |
| 2014/0315711 A1 | 10/2014 | Kumar et al. | |
| 2015/0353369 A1 | 12/2015 | Sekine et al. | |

FOREIGN PATENT DOCUMENTS

| | | |
|---|---|---|
| CN | 103357406 A | 10/2013 |
| CN | 103706360 A | 4/2014 |
| CN | 104289217 A | 1/2015 |
| CN | 108472632 A | 8/2018 |
| EP | 2949625 A1 | 12/2015 |
| JP | H679177 A | 3/1994 |
| JP | 18141399 A | 6/1996 |
| JP | H10509641 A | 9/1998 |
| JP | 200084405 A | 3/2000 |
| JP | 2001179092 A | 7/2001 |
| JP | 2005171269 A | 6/2005 |
| JP | 20078799 A | 1/2007 |
| JP | 2012185994 A | 9/2012 |
| JP | 2013111562 A | 6/2013 |
| JP | 2014171916 A | 9/2014 |
| JP | 2016112538 A | 6/2016 |
| JP | 201718907 A | 1/2017 |
| WO | 9617671 A1 | 6/1996 |
| WO | 2007113981 A1 | 10/2007 |
| WO | 2016133213 A1 | 8/2016 |
| WO | 2019059190 A1 | 3/2019 |
| WO | 2019216304 A1 | 11/2019 |

OTHER PUBLICATIONS

Kondawar et al., "Tandem Synthesis of Glycidol via Transesterification of Glycerol with DMC over Ba-Mixed Metal Oxide Catalysts", ACS Sustainable Chemistry & Engineering, 2017, pp. 1763-1774, vol. 5.
Marques et al., "Thermal and Crystalographic Studies of Mixture La2O3—SrO Prepared via Reaction in the Solid State", Journal of Thermal Analysis and Calorimetry, 1999, pp. 143-149, vol. 56.
Venkatasubramanian et al., "Synthesis and Characterization of Electrolytes Based on BaO—CeO2—GdO1.5 System for Intermediate Termperature Solid Oxide Fuel Cells", International Journal of Hydrogen Energy, 2010, pp. 4597-4605, vol. 35.
Xie et al., "Preparation of La1.9Ca0.1Zr2O6.95 with pyrochlore structure and its application in synthesis of ammonia at atmospheric pressure", Solid State Ionics, 2004, pp. 117-121, vol. 168.
Belliere et al., "Phase Segregation in Cerium-Lanthanum Solid Solutions", The Journal of Physical Chemistry, Mar. 2006, pp. 9984-9990, vol. 110.
Itoh et al., "Magnetic Properties of Ba1-xLaxPrO3 and PrLu1—yMgyO3 with x and y ≤ 0.075", Journal of Solid State Chemistry, Jun. 1999, pp. 104-109, vol. 145.
Luo et al., "Effect of La2O3 on Ru/CeO2—La2O3 Catalyst for Ammonia Synthesis", Catalysis Letters, Oct. 2009, pp. 382-387 vol. 133.
Niwa et al., "Ruthenium Catalyst Supported on CeO2 for Ammonia Synthesis", Chemistry Letters, 1996, pp. 3-4.
The Materials Project, "Materials Data on BaCeO3 by Materials Project", Abstract, DOE Data Explorer, 2020, pp. 1-2.
Xiaodong, "Rare Earth Catalytic Materials, 1st Edition, Jun. 2017", Common Knowledge Evidence, 2017, p. 86.
Zhang et al., "Highly efficient Ru/Sm2O3—CeO2 catalyst for ammonia synthesis", Catalysis Communications, 2011, pp. 23-26.
Gao et al. "Barium Hydride-Mediated Nitrogen Transfer and Hydrogenation for Ammonia Synthesis: A Case Study of Cobalt", ACS Catalysis, Apr. 17, 2017, pp. 3654-3661, vol. 7, ACS Publications, DOI: 10.1021/acscatal.7b00284.
Kitano et al. "Self-organized Ruthenium-Barium Core-Shell Nanoparticles on a Mesoporous Calcium Amide Matrix for Efficient Low-Temperature Ammonia Synthesis", Angewandte Chemie International Edition, 2018, 2648-2652, vol. 57, Wiley-VCH Verlag Gmbh & Co. KGaA, Weinheim, https://doi.org/10.1002/anie.201712398.
Ogura et al. "Efficient ammonia synthesis over a Ru/La0.5Ce0.5O1.75 catalyst pre-reduced at high temperature", Chemical Science, Jan. 13, 2018, pp. 2230-2237, vol. 9, The Royal Society of Chemistry, DOI: 10.1039/c7sc05343frsc.li/chemical-science.
Bilal et al., "Effect of Heating Atmosphere and Alkali Metal Doping on the Acidic and Basic Sites of Magnesium Oxide," International Journal of Materials Science and Applications, 2016, pp. 36-42, vol. 5:2, Science Publishing Group.
Fishel et al., "Ammonia Synthesis Catalyzed by Ruthenium Supported on Basic Zeolites," Journal of Catalysis, 1996, pp. 148-157, vol. 163, Academic Press, Inc.
Kodama, T., "High-temperature solar chemistry for converting solar heat to chemical fuels," Progress in Energy and Combustion Science, 2003, pp. 567-597, vol. 29, Elsevier.
Muller et al., "Calcium Doping Facilitates Water Dissociation in Magnesium Oxide," Advanced Sustainable Systems, Dec. 11, 2017, vol. 2, Issue 1.
Wu et al., "Domino Reactions for Biofuel Production from Zymotic Biomass Wastes over Bifunctional Mg-Containing Catalysts," ACS Sustainable Chemistry & Engineering, 2019, pp. 18943-18954, vol. 7, American Chemical Society.

(56) References Cited

OTHER PUBLICATIONS

Fernandez et al., "Effect of the size of distribution of supported Ru nanoparticles on their activity in ammonia synthesis under mild reaction conditions", Applied Catalysis A: General, 2014, pp. 194-202, vol. 474.

Naggar et al., "Novel nano-structured for the improvement of photo-catalyzed hydrogen production via water splitting with in-situ nano-carbon formation", Renewable and Sustainable Energy Reviews, 2015, pp. 1205-1216, No. 41.

* cited by examiner

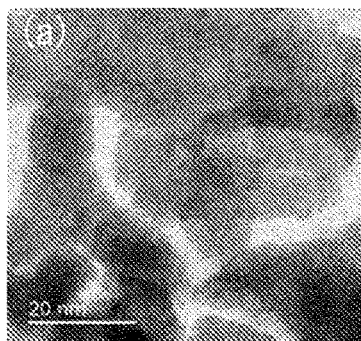
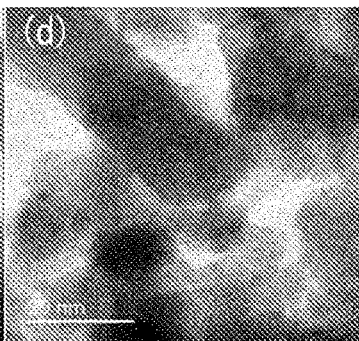
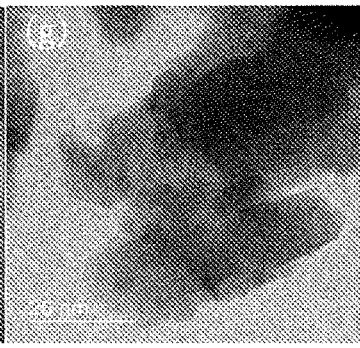
FIG. 2A  FIG. 2D  FIG. 2G
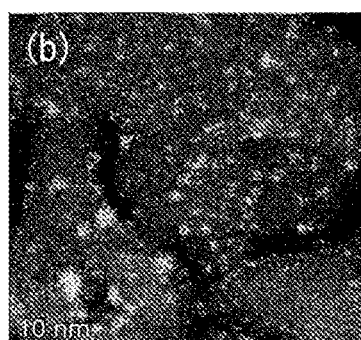
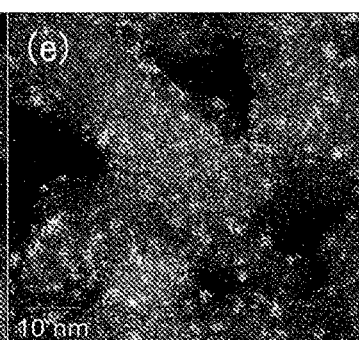
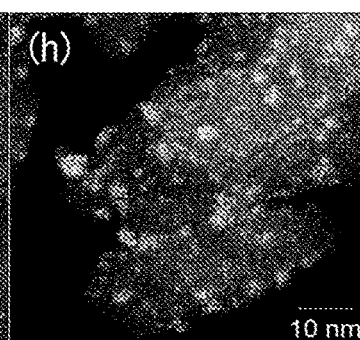
FIG. 2B  FIG. 2E  FIG. 2H
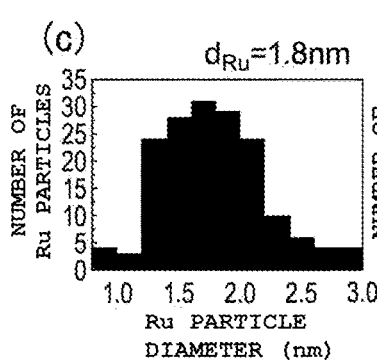
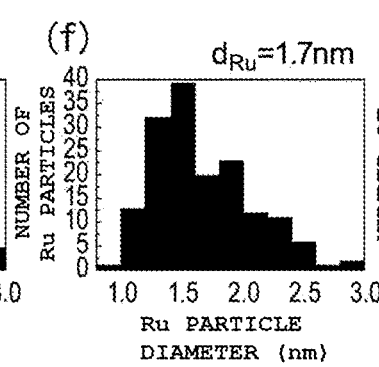
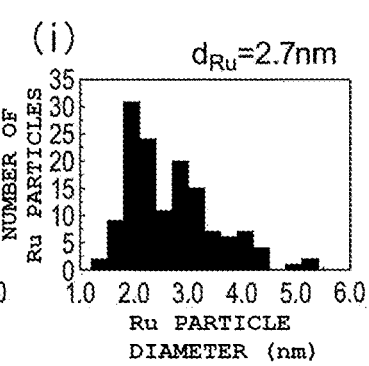
FIG. 2C  FIG. 2F  FIG. 2I

FIG. 5

| Ru/La$_{0.5}$Ce$_{0.5}$O$_{1.75}$ | | | Reduction temp. (°C) | | |
|---|---|---|---|---|---|
| | | | 500 | 650 | 800 |
| NH$_3$ synthesis rate @350°C (mmol g$^{-1}$ h$^{-1}$) | | 600 | 24.8 | 24.4 | 17.1 |
| | | 700 | 22.1 | 31.3 | 20.6 |
| | | 800 | | | |
| H/Ru (%) | | 600 | 40 | 24 | 4 |
| | | 700 | 46 | 35 | 11 |
| | Calcine temp. (°C) | 800 | | | |
| SSA (m$^2$ g$^{-1}$) | | 600 | 64 | 40 | 22 |
| | | 700 | 47 | 42 | 21 |
| | | 800 | | | |
| SSA (@ the temp/@500red) | | 600 | 1 | 0.63 | 0.34 |
| | | 700 | 1 | 0.89 | 0.44 |
| | | 800 | | | |
| Ru particle size by TEM (nm) | | 600 | 1.3 | 2.0 | 3.3 |
| | | 700 | 1.8 | 1.7 | 2.7 |
| | | 800 | | | |

COMPOSITE OXIDE, METAL-SUPPORTED MATERIAL, AND AMMONIA SYNTHESIS CATALYST

CROSS-REFERENCE TO RELATED APPLICATIONS

This application is the United States national phase of International Application No. PCT/JP2019/018225 filed May 7, 2019, and claims priority to Japanese Patent Application No. 2018-089516 filed May 7, 2018. International Application No. PCT/JP2018/034515, filed Sep. 18, 2018, and Japanese Patent Application No. 2019-059200 filed Mar. 2, 2019, the disclosures of which are hereby incorporated by reference in their entirety.

TECHNICAL FIELD

The present invention relates to a composite oxide useful in the synthesis of ammonia under mild conditions, a metal-supported material and an ammonia synthesis catalyst using the same, as well as to a method for producing the composite oxide, a method for producing the metal-supported material, and a method for producing ammonia.

BACKGROUND ART

Ammonia is an important raw material in the modern chemical industry. Not less than 80% of the ammonia produced is used to produce chemical fertilizers for cultivated crops. In addition, ammonia has received much attention as an energy and hydrogen carrier. This is because (1) the hydrogen content in ammonia is high (17.6 wt %), (2) the energy density of ammonia is high (12.8 $GJ/m^3$), and (3) carbon dioxide is not generated when ammonia is decomposed to produce hydrogen. If ammonia can be efficiently produced from renewable energy such as solar energy and wind power, global problems related to the energy and food crisis will be mitigated.

Currently, the Harber-Bosch process used to produce ammonia consumes a large amount of energy, which accounts for about 1 to 2% of the world's energy consumption. In this method, about 60% of the consumed energy is recovered and secured as the enthalpy of ammonia. However, most of the remaining energy is lost during the production of hydrogen from natural gas, the synthesis of ammonia, and the separation of the gas. Since ammonia synthesis by the Harber-Bosch process is performed at very high temperatures (>450° C.) and high pressures (>20 MPa), it is required to reduce the large amount of energy used in this process. To reduce global energy consumption, a catalyst that can synthesize ammonia under milder conditions (lower temperature and lower pressure) than iron-based catalysts used in the Harber-Bosch process has been required.

Recently, a method for producing ammonia under a low-pressure condition of about 1 MPa (10 atm pressure) is known. A ruthenium catalyst used for ammonia production is generally supported on a carrier. For example. Patent Literature 1 discloses that when a rare earth oxide is used as a carrier for supporting ruthenium, the amount of ruthenium used can be reduced and the reaction temperature can be lowered. However, in the ammonia production method of Patent Literature 1, the ammonia yield when producing ammonia under a lower pressure condition is not satisfactory. Therefore, the present inventors have developed a ruthenium catalyst using $La_{0.5}Ce_{0.5}O_{1.75}$ reduced at 650° C. as a support and reported that such a catalyst exhibits excellent characteristics even under low pressure conditions (Non Patent Literature 4).

In addition to Patent Literature 1 and Non Patent Literature 4, ammonia synthesis catalysts in which ruthenium is supported on various rare earth oxide supports are disclosed in various patent literatures. Typical examples include Patent Literatures 2 to 4 and Non Patent Literatures 1 to 3. Patent Literatures 2 and 4 disclose lanthanoid oxides. Patent Literature 3 discloses praseodymium oxide, and Non Patent Literature 1 discloses Ce oxide as supports. Non Patent Literature 2 discloses a $Ru/CeO_2$—$La_2O_3$-based catalyst produced by coprecipitation of hydroxides of Ru, Ce, and La, followed by drying and activating.

Prior art literatures including Patent Literatures 1, 2, and 4, and Non Patent Literature 1 describe that ruthenium catalysts used for ammonia synthesis have Ru as particles on the support surface. There is a report that when Ru is present as particles, the average diameter is greater than 5 nm (see Non Patent Literature 2), and there is a report that the average diameter of such Ru particles is less than 2 nm (Non Patent Literature 4). Further, Patent Literature 3 describes that Ru has an egg-shell structure.

On the other hand, regarding the support, Non Patent Literature 3 discloses that for the support oxide before supporting Ru in evaluating an ammonia synthesis activity of an Ru-supported Y(La)—M—O (M is Ca, Sr, or Ba) catalyst, the support oxide with a calcination temperature of 450° C. had a large specific surface area, and the support with a calcination temperature increased to 650° C. had a reduced specific surface area.

In view of the fact that Ru is expensive, an ammonia synthesis catalyst in which a transition metal compound other than Ru, such as Co, is supported on a support has also been proposed (see, for example, Non Patent Literature 5 and Non Patent Literature 6). However, Non Patent Literature 6 discloses Co—BaO/C in which cobalt was supported on barium oxide, but its ammonia synthesis activity was low. Further, in Non Patent Literature 5, calcium amide (Co/Ba—$Ca(NH_2)_2$)) is used instead of the oxide, but the ammonia yield at 1 MPa of the Co-supported catalyst was not as good as the catalyst on which Ru was supported.

Catalysts for synthesis are generally required to have high synthesis activity. There is a continuing need for highly active ruthenium catalysts for ammonia synthesis that are still under development enabling higher yields. In an equilibrium reaction in which 2 moles of ammonia are synthesized from 1 mole of nitrogen and 3 moles of hydrogen, high pressure conditions should be more convenient in terms of chemical equilibrium in order to improve the ammonia yield. Therefore, it can be considered that the ammonia yield is improved by reacting at a pressure higher than 1 MPa instead of the reaction at 1 MPa. However, a known ruthenium catalyst for synthesizing ammonia is liable to decrease its catalytic activity due to poisoning with hydrogen. Many existing Ru-based catalysts aim at higher ammonia synthesis activity under low-pressure conditions than the Harber-Bosch method, but it is not suitable to improve the yield under high-pressure conditions.

In addition, since a catalyst is loaded into a synthesis reactor and used and needs to be replaced periodically, it is also required that the catalyst be easy to handle. As for ruthenium catalysts for ammonia synthesis, there is still a demand for improved handling.

CITATION LIST

Patent Literature

Patent Literature 1: JP 6-079177 A
Patent Literature 2: JP 2013-111562 A
Patent Literature 3: WO 2016/133213 A
Patent Literature 4: JP 2017-018907 A Non Patent Literature Non Patent Literature 1: Y. Niwa and K. Aika, Chemistry Letters, (1996) 3-4
Non Patent literature 2: X. Luo et al., Catalysis Letters 133, 382 (2009)
Non Patent Literature 3: A. S. Ivanova et al., Kinetics and Catalysis, Vol. 45. No. 4, 2004. pp. 541-546. Translated from Kinetika i Kataliz, Vol. 45, No. 4, 2004. pp. 574-579.
Non Patent Literature 4: Y. Ogura et al., "Efficient ammonia synthesis over a Ru/La0.5Ce0.5O1.75 catalyst pre-reduced at high temperature", Chemical Science, vol. 9. pp. 2230-2237
Non Patent Literature 5: M. Kitano et al., Angew. Chem. Int. Ed., 130(2018)2678
Non Patent Literature 6: W. Gao et. al., ACS Catal., 7 (2017) 3654

SUMMARY OF INVENTION

An object of the present invention is to solve the above-mentioned problems and to provide a composite oxide which can further improve an ammonia synthesis activity by supporting, for example, a metal catalyst such as cobalt. Another object of the present invention is to provide a metal-supported material and an ammonia synthesis catalyst in which an ammonia synthesis activity is further improved by supporting a metal catalyst such as cobalt. Further, another object of the present invention is to provide a method for producing a composite oxide that improves an ammonia synthesis activity, a method for producing a metal-supported material that improves an ammonia synthesis activity, and an ammonia production method.

The purpose of the present invention is to solve the above problems and to provide a composite oxide that can serve as a support for a catalyst having an ammonia synthesis activity different from that of a known Ru-based catalyst and an iron-based catalyst used in the conventional Harber-Bosch process. In addition, the present invention makes it possible to synthesize ammonia at a pressure of 1 to 10 MPa, unlike a Harber-Bosch catalyst, by using a metal-supported material in which a specific metal is supported on the composite oxide. Thus, unlike the known Ru catalyst, an object of the present invention is to provide an ammonia synthesis catalyst capable of increasing the ammonia yield by increasing the pressure. Furthermore, the present invention aims at providing a production method of such composite oxide and metal-supported material, and a production method of ammonia.

In order to solve the above-mentioned problems, the present inventors have found that in a metal-supported material using a composite oxide as a support, it exhibits good catalytic activity when the metal oxide constituting the composite oxide is in a specific valence state, and that the partial negative charge of oxygen in the composite oxide affects the catalytic activity. Based on these findings, the present invention has been made.

In the present invention, the term "composite oxide" refers, in a narrower sense, to a so-called solid solution in which oxides of a plurality of elements have a homogeneous phase, but includes, in a broader sense, oxides showing a heterogeneous phase or a composition of oxides of a plurality of elements.

[1] A composite oxide including a metal element represented by the composition of general formula (1):

(in the general formula (1).
A is a lanthanoid characterized in that at least a part or all of A are in the III valence state;
X is a group 2 element selected from the group consisting of Ca, Sr, and Ba of the periodic table, or a lanthanoid and represents an element different from the A;
M is any of a group 1 element of the periodic table, a group 2 element selected from the group consisting of Ca, Sr, and Ba, or a lanthanoid, and represents an element different from the A and X;
n is $0<n<1$;
y is $0<y<1$;
m is $0 \leq m<1$; and
n+y+m=1).

[1A] A composite oxide including a metal element represented by the composition of general formula (1A) and having a partial negative charge of oxygen defined by formula (A) of 0.52 or more:

(in the general formula (1A),
A is a lanthanoid characterized in that at least a part or all of A are in the III valence state;
X is a group 2 element of the periodic table selected from the group consisting of Ca, Sr, and Ba;
M is a group 1 element of the periodic table, a group 2 element of the periodic table selected from the group consisting of Ca, Sr, and Ba, or a lanthanoid element, and represents an element different from the A and X;
n is $0<n<1$;
y is $0<y<1$;
m is $0<m<1$; and
n+y+m=1; and
in the above formula (A), when each element included in the composite oxide is represented by a suffix i (i=including at least A, X, M, and O), the composition ratio of each element is indicated by ni and Sanderson electronegativity is indicated by χi).

[1B] A composite oxide represented by the following general formula (1B):

(in the above general formula (1B),
A is a rare earth element characterized in that at least a part thereof is in the III valence state;
X is any of a group 2 element, a group 4 element, or a rare earth element in the periodic table, and represents an element different from the A;
M is any of a group 2 element, a group 4 element, or a rare earth element in the periodic table, and represents an element different from the A and X;

n is 0<n<1;
y is 1−n;
m is 0≤m≤0.5; and
x is the number of oxygen atoms necessary for the composite oxide to remain electrically neutral).

[1C] A composite oxide including a metal element represented by the composition of general formula (1C):

$$A_nX_yM_m \quad (1C)$$

(in the general formula (1C),
A is a rare earth element characterized in that at least a part thereof is in the III valence state;
X is any of a group 2 element, a group 4 element, or a rare earth element in the periodic table, and represents an element different from the A;
M is any of a group 1 element, a group 2 element, a group 4 element, or a rare earth element in the periodic table, and represents an element different from the A and X;
n is 0<n<1;
y is 0<y<1;
m is 0≤m<1; and
n+y+m=1).

[1D] The composite oxide according to any one of [1], [1A], [1B], and [1C] above selected from $Ce_nLa_yO_x$, $Pr_nLa_yO_x$, and $Ce_nPr_yO_x$ (where n=0.1 to 0.9, y=0.1 to 0.9, n+y=1).

[1E] The composite oxide according to any one of [1], [1A], [1B], and [1C] above selected from $Ce_nBa_yLa_mO_x$, $La_nBa_yPr_mO_x$, and $Pr_nBa_yCe_mO_x$ (where n=0.1 to 0.99, y=0.01 to 0.3, m=0 to 0.9, n+y+m=1).

[1F] The composite oxide according to [1] above selected from $Ce_{0.5}La_{0.5}O_x$, $Pr_{0.5}La_{0.5}O_x$, $Ce_{0.5}Pr_{0.5}O_x$, $Ce_{0.85}La_{0.15}O_x$, $Ce_{0.67}La_{0.33}O_x$, $Ce_{0.33}La_{0.67}O_x$, and $Ce_{0.15}La_{0.85}O_x$.

[1G] The composite oxide according to [1] above selected from $Ba_{0.1}La_{0.45}Ce_{0.45}O_x$, $Ba_{0.3}Pr_{0.35}Ce_{0.35}O_x$, $Ba_{0.3}Ce_{0.35}Pr_{0.35}O_x$, $Ba_{0.3}La_{0.35}Ce_{0.35}O_x$, $Ba_{0.1}La_{0.3}Ce_{0.6}O_x$, $Ba_{0.1}La_{0.6}Ce_{0.3}O_x$, $Ba_{0.1}La_{0.8}Ce_{0.1}O_x$, $Ba_{0.05}La_{0.475}Ce_{0.475}O_x$, $Ba_{0.15}La_{0.425}Ce_{0.425}O_x$, $Ba_{0.1}Pr_{0.45}Ce_{0.45}O_x$, and $Ba_{0.3}La_{0.35}Pr_{0.35}O_x$.

[1H] A binary composite oxide including a metal element represented by the composition of general formula (1-1):

$$A_nX_y \quad (1-1)$$

(in the above general formula (1-1),
A is a lanthanoid characterized in that at least a part or all of A are in the III valence state;
X is either a group 2 element of the periodic table selected from the group consisting of Ca, Sr, and Ba, or a lanthanoid, and represents an element different from the A;
n is 0<n<1;
y is 0<y<1; and
n+y=1).

[1K] A ternary composite oxide including a metal element represented by the composition of general formula (1-2):

$$A_nX_yM_m \quad (1-2)$$

(in the general formula (1-2),
A is a lanthanoid characterized in that at least a part or all of A are in the III valence state;
X is either a group 2 element of the periodic table selected from the group consisting of Ca, Sr, and Ba, or a lanthanoid, and represents an element different from the A;
M is any of a group 1 element, a group 2 element selected from the group consisting of Ca, Sr, and Ba, or a lanthanoid in the periodic table, and represents an element different from the A and X;
n is 0<n<1;
y is 0<y<1;
m is 0<m<1; and
n+y+m=1).

[2] The composite oxide according to any one of [1] to [1K] above, characterized in that the ratio ($A^{3+}/Ar_{total}$) of the number of moles ($A^{3+}$) in the III valence state to the total number of moles of A ($A_{total}$) is $0.1 \leq A^{3+}/A_{total} \leq 1.0$.

[3] The composite oxide according to any one of [1] to [1K] and [2] above, wherein the composite oxide includes a tetragonal or cubic solid solution.

[4-1] The composite oxide according to any one of [1] to [1K], [2], and [3] above, wherein at least one of the elements A, X, and M included in the composite oxide is a strongly basic element with a partial negative charge ($-\delta_o$) value of oxygen in the oxide state of 0.50 or more.

[4-2] The composite oxide according to any one of [1] to [1K],[2], and [3] above, wherein when the composition ratio of each element included in the composite oxide is expressed as ni (i shows all elements in the composite oxide including A, X, M, and O), and the Sanderson electronegativity of each element is expressed as xi (i shows all elements in the composite oxide including A, X, M, and O), the partial negative charge value ($-\delta_o$) of oxygen represented by the following formula (A) is 0.52 or more.

$$((\Pi(\chi_i^{in}))^{(1/\Sigma ni)} - 5.21)/-4.75 \quad \text{Formula (A)}$$

[5] The composite oxide according to any one of [2], [3], [4-1], and [4-2] above, wherein the general formula (1) is a binary composite oxide represented by the following general formula (1-1):

$$A_nX_y \quad (1-1)$$

(A, X, n, and y are as defined in [1H] above), and the composite oxide is a solid solution of the A and X.

[5A] The composite oxide according to any one of [2], [3], [4-1], and [4-2] above, wherein the general formula (1) is a binary composite oxide represented by the following general formula (1-1):

$$A_nX_y \quad (1-1)$$

(A, X, n, and y are as defined in [1H] above), and the A and X are in a mixed state.

[6] The composite oxide according to any one of [2], [3], [4-1], and [4-2] above, wherein the general formula (1) is a ternary composite oxide represented by the following general formula (1-2):

$$A_nX_yM_m \quad (1-2)$$

(A, X, M, n, y, and m are as defined in [1K] above), and the composite oxide is in a mixed state of a solid solution of one oxide of A and X or M and the other oxide of X or M.

[7] The composite oxide according to any one of [1] to [1K], [2], [3], [4-1], [4-2], [5], [5A], and [6] above, wherein X in the general formulas (1), (1A), (1B), (1C), (1-1), and (1-2) is Ba, and the amount of carbonate ions contained in the composite oxide is 10 mol % or less with respect to Ba.

[7A] The composite oxide according to any one of [1] to [1K], [2], [3], [4-1], [4-2], [5], [5A], and [6] above, wherein X in the general formulas (1), (1A), (1B), (1C), (1-1), and (1-2) is Ba, and the amount of carbonate ions contained in the composite oxide is 1 mol % or less with respect to Ba.

[7B] The composite oxide according to any one of [1] to [1K], [2][3], [4-1], [4-2], [5], [5A], and [6] above, wherein X in the general formulas (1), (1A), (1B), (1C), (1-1), and (1-2) is Ba, and the amount of carbonate ions contained in the composite oxide is 0.1 mol % or less with respect to Ba.

[7C] The composite oxide according to any one of [1] to [1K], [2], [3], [4-1], [4-2], [5], [5A], and [6] above, wherein X in the general formulas (1), (1A), (1B), (1C), (1-1), and (1-2) is Ba, and the amount of carbonate ions contained in the composite oxide is 0.01 mol % or less with respect to Ba.

[8] A composite oxide including a metal element represented by general formula (1A):

   (1A)

(in the general formula (1A),

A is a rare earth element characterized in that at least a part or all of A are in the III valence state;

X is any of a group 2 element, a group 4 element, or a rare earth element in the periodic table, and represents an element different from the A;

M is any of a group 1 element, a group 2 element, a group 4 element, or a rare earth element in the periodic table, and represents an element different from the A and X;

n is 0<n<1;

y is 0<y<1;

m is 0≤m<1; and n+y+m=1).

[8A] The composite oxide according to [8] above, characterized in that the ratio ($A^{3+}/A_{total}$) of the number of moles ($A^{3+}$) in the III valence state to the total number of moles of A ($A_{total}$) is $0.1 \le A^{3+}/A_{total} \le 1.0$.

[8B] The composite oxide according to [8] above, wherein m is 0.

[8C] The composite oxide according to [8] above, which is selected from $Ce_{0.5}La_{0.5}O_x$, $Ce_{0.5}Zr_{0.5}O_x$, $Pr_{0.5}La_{0.5}O_x$, $Pr_{0.5}Zr_{0.5}O_x$, and $Ce_{0.5}Pr_{0.5}O_x$.

[8D] The composite oxide according to [8] above, which is selected from $Ba_{0.1}La_{0.45}Ce_{0.45}O_x$, $Ba_{0.3}Pr_{0.35}Ce_{0.35}O_x$, $Ba_{0.3}Ce_{0.35}Pr_{0.35}O_x$, and $Ba_{0.3}La_{0.35}Ce_{0.35}O_x$.

[9] A composite oxide represented by the following general formula (2):

   (2)

(in the general formula (2),

A is a rare earth element characterized in that at least a part of A is in the III valence state;

X is any of a group 2 element, a group 4 element, or a rare earth element in the periodic table, and represents an element different from the A;

M is any of a group 2 element, a group 4 element, or a rare earth element in the periodic table, and represents an element different from the A and X;

n is 0<n<1;

m is 0≤m≤0.5; and x represents the number of oxygen atoms necessary for the composite oxide to remain electrically neutral).

[9A] The composite oxide according to [9] above, wherein m is 0.

[9B] The composite oxide according to [9] above, which is selected from $Ce_{0.5}La_{0.5}O_x$.

[9C] The composite oxide according to [9] above, wherein x is 0.5<x≤2.

[11] A metal-supported material, wherein a transition metal excluding a group 4 metal is supported on any one of the composite oxides of [1] to [9C] above.

[11B] The metal-supported material according to [11] above, wherein the transition metal is Co.

[11C] The metal-supported material according to [11] above, wherein the transition metal is Co and two or more kinds selected from the group consisting of Ru, Fe, Co, Ni, Rh, Pd, Os, Ir, and Pt.

[11D] The metal-supported material according to [11] above, wherein the transition metal is Co.

[11E] A metal-supported material in which a transition metal excluding a group 4 element is supported on a composite oxide including a metal element represented by the composition of general formula (1):

   (1)

(in the general formula (1),

A is a lanthanoid characterized in that at least a part or all of A are in the III valence state;

X is either a group 2 element of the periodic table selected from the group consisting of Ca, Sr, and Ba, or a lanthanoid, and represents an element different from the A;

M is any of a group 1 element, a group 2 element selected from the group consisting of Ca, Sr, and Ba, or a lanthanoid in the periodic table, and represents an element different from the A and X;

n is 0<n<1;

y is 0<y<1;

m is 0≤m<1; and n+y+m=1).

[12] The metal-supported material according to any one of [11] to [11E] above, wherein the ratio of a transition metal dispersity value ($D_{ads}$) excluding the group 4 of the periodic table determined by $H_2$ pulse chemisorption method and a transition metal dispersity value ($D_{TEM}$) expected from the average particle diameter of transition metal particles determined from a TEM image is $0 < D_{ads}/D_{TEM} < 1$.

[12B] The metal-supported material according to [11B] above, wherein the ratio of Co dispersity value ($D_{ads}$) determined by $H_2$ pulse chemisorption method and a Co dispersity value ($D_{TEM}$) expected from the average particle diameter of Co particles determined from a TEM image is $0 < D_{ads}/D_{TEM} < 1$.

[13] The metal-supported material according to any one of [11] to [12B] above, which is characterized in that when nitrogen is adsorbed on the supported transition metal, a N≡N stretching vibration v1 of a nitrogen molecule interacting in the long axis direction is observed at 2300 to 2000 $cm^{-1}$ by infrared absorption spectroscopy, and/or a weakened N≡N stretching vibration v2 of a nitrogen molecule interacting in the long axis direction with respect to the transition metal is observed at 1900 to 1500 $cm^{-1}$.

[13A] The metal-supported material according to any one of [11] to [12B] above, wherein the v1 is 2100 to 2000 $cm^{-1}$ and the v2 is 1700 to 1900 $cm^{-1}$.

[13B] The metal-supported material according to any one of [11] to [12B] above, wherein the transition metal is Co.

[13C] The metal-supported material according to any one of [11] to [12B] above, wherein an absorption peak derived from adsorbed nitrogen molecules appears at 2200 $cm^{-1}$ or less when nitrogen adsorption is performed, followed by measurement with an infrared spectrometer.

[13D] The metal-supported material according to any one of [11] to [12B] above, wherein an absorption peak further appears at 1900 to 1700 $cm^{-1}$.

[14] The metal-supported material according to any one of [11] to [13D] above, wherein the transition metal supported on the composite oxide has an average particle diameter of 100 nm or less.

[14B] The metal-supported material according to any one of [11] to [14] above, wherein the transition metal is Co, and the average particle diameter of Co supported on the composite oxide is 100 nm or less.

[15] The metal-supported material according to any one of [11] to [14B], wherein the amount of carbonate contained in the metal-supported material is 10 mol % or less with respect to a group 2 element X of the periodic table selected from the group consisting of Ca, Sr, and Ba.

[15A] The metal-supported material according to any one of [11] to [15] above, wherein the amount of the carbonate is 1 mol % or less.

[15B] The metal-supported material according to any one of [11] to [15] above, wherein the amount of the carbonate is 0.1 mol % or less.

[15C] The metal-supported material according to any one of [11] to [15] above, wherein the amount of the carbonate is 0.01 mol % or less.

[16] A catalyst for synthesizing ammonia, wherein the metal-supported material according to any one of [11] to [15C] above is used.

[16A] The catalyst for synthesizing ammonia according to [16] above, which is characterized in that the ammonia yield as measured by the following ammonia activity measurement method is 0.55% or more and the ammonia production rate is 10.0 mmol $g^{-1}$ $h^{-1}$.

<Ammonia Activity Measurement Method>

A method of quantifying the amount of ammonia produced in the outlet gas, which method includes increasing the pressure to 1.0 MPa or 3.0 MPa by a back pressure valve at the outlet of the reaction tube, while maintaining the temperature of a catalyst layer for ammonia synthesis at 300° C. with supplying Ar; circulating H2 and N2 at 90 mL $min^{-1}$ and 30 mL $min^{-1}$ (space velocity 72 L h-1 g-1), respectively, for transferring to the reaction atmosphere while maintaining the pressure after stopping the supply of Ar; adding 1 to 100 mM (1, 5, 10, 25, 100 mM) of an aqueous sulfuric acid solution of 200 mL to a three-necked flask connected to an electric conductivity meter depending on the height of $NH_3$ synthesis activity; bubbling a mixed gas containing hydrogen, nitrogen, and $NH_3$ flowing out from the reaction tube outlet into the aqueous sulfuric acid solution; and measuring the change in electrical conductivity caused by the reaction between $NH_3$ and sulfuric acid.

[16B] A catalyst for synthesizing ammonia, which is characterized by using a metal-supported material in which a transition metal excluding a group 4 element of the periodic table is supported on a composite oxide including a metal element represented by the composition of general formula (1):

$$A_n X_y M_m \quad (1)$$

(in the general formula (1),

A is a lanthanoid characterized in that at least a part or all of A are in the III valence state;

X is either a group 2 element of the periodic table selected from the group consisting of Ca, Sr, and Ba, or a lanthanoid, and represents an element different from the A;

M is any of a group 1 element, a group 2 selected from the group consisting of Ca, Sr, and Ba, or a lanthanoid in the periodic table, and represents an element different from the A and X;

n is 0<n<1;
y is 0<y<1;
m is 0≤m<1; and
n+y+m=1).

[17] A method for producing the composite oxide according to any one of [1] to [9C] above, characterized by including a mixing step of mixing an A precursor containing the A, an X precursor containing the X, and an M precursor containing the M to obtain a mixture; and a calcination step of calcining the mixture at a temperature of 600° C. or more.

[17A] The method for producing a composite oxide according to [17] above, wherein the calcination step includes calcining the mixture at a temperature of 700° C. or more.

[17B] The method for producing a composite oxide according to [17] or [17A] above, wherein the calcination step is performed at a temperature of 800° C. or less.

[17C] A method for producing a composite oxide including a metal element represented by the composition of general formula (1):

$$A_n X_y M_m \quad (1)$$

(in the general formula (1),

A is a lanthanoid characterized in that at least a part or all of A are in the III valence state;

X is either a group 2 element selected from the group consisting of Ca, Sr, and Ba, or a lanthanoid in the periodic table, and represents an element different from the A;

M is any of a group 1 element, a group 2 element selected from the group consisting of Ca, Sr, and Ba, or a lanthanoid in the periodic table, and represents an element different from the A and X;

n is 0<n<1;
y is 0<y<1;
m is 0≤m<1; and
n+y+m=1), which method is characterized by including a mixing step of mixing an A precursor containing the A, an X precursor containing the X, and an M precursor containing the M to obtain a mixture; and a calcination step of calcining the mixture at a temperature of 600° C. or more.

[18] A method for producing the metal-supported material according to any one of [11] to [15C] above, characterized by including:

a mixing step of mixing an A precursor containing the A, an X precursor containing the X, and an M precursor containing the M to obtain a mixture;

a calcination step of calcining the mixture at a temperature of 600° C. or more to obtain a composite oxide support;

a supporting step of preparing a supported material before pre-reduction treatment, by supporting the compound containing a transition metal on the composite oxide; and a reduction step of reducing the supported material before pre-reduction treatment, at a temperature of 400° C. or more.

[18A] The method for producing a metal-supported material according to [18] above, wherein the calcination step includes calcining the mixture at a temperature of 700° C. or more.

[18B] The method for producing a metal-supported material according to [18] or [18A] above, wherein the calcination step includes calcining the mixture at a temperature of 800° C. or less.

[18C] The method for producing a metal-supported material according to any one of [18] to [18B] above, wherein the reduction step includes reducing the mixture in an atmosphere containing hydrogen at a temperature of 350° C. or more for 2 hours or more.

[18D] The method for producing a metal-supported material according to any one of [18] to [18C] above, wherein the reduction step includes calcining the mixture in an atmosphere containing hydrogen at a temperature of 500° C. or more for 2 hours or more.

[18E] A method for producing a metal-supported material in which a transition metal excluding a group 4 element is supported on a composite oxide including a metal element represented by the composition of general formula (1):

$$A_nX_yM_m \quad (1)$$

(in the general formula (1).

A is a lanthanoid characterized in that at least a part or all of A are in the III valence state;

X is either a group 2 element selected from the group consisting of Ca, Sr, and Ba, or a lanthanoid in the periodic table, and represents an element different from the A;

M is any of a group 1 element, a group 2 element selected from the group consisting of Ca, Sr, and Ba, or a lanthanoid in the periodic table, and represents an element different from the A and X;

n is 0<n<1;
y is 0<y<1;
m is 0≤m<1; and
n+y+m=1), which method includes:

a mixing step of mixing an A precursor containing the A, an X precursor containing the X, and an M precursor containing the M to obtain a mixture;

a calcination step of calcining the mixture at a temperature of 600° C. or more to obtain a composite oxide support;

a supporting step of preparing a supported material before pre-reduction treatment, by supporting a compound containing the transition metal on the composite oxide; and a reduction step of reducing the supported material before pre-reduction treatment, at a temperature of 400° C. or more.

[19] A method for producing ammonia by bringing hydrogen and nitrogen into contact with a catalyst, wherein the catalyst is the ammonia synthesis catalyst according to any one of [16] to [16B] above.

[19A] The method for producing ammonia according to [19] above, wherein the reaction temperature is 300 to 550° C. and the reaction pressure is 0.1 to 20 MPa.

[19B] The method for producing ammonia according to any one of [19] to [19A] above, wherein the reaction temperature is 300 to 450° C. and the reaction pressure is 0.1 to 10 MPa.

[19C] A method for producing ammonia by bringing hydrogen and nitrogen into contact with a catalyst, wherein the catalyst is an ammonia synthesis catalyst using a metal-supported material in which a transition metal excluding a group 4 element is supported on a composite oxide including a metal element represented by the composition of general formula (1):

$$A_nX_yM_m \quad (1)$$

(in the general formula (1).

A is a lanthanoid characterized in that at least a part or all of A are in the III valence state;

X is either a group 2 element selected from the group consisting of Ca, Sr, and Ba, or a lanthanoid in the periodic table, and represents an element different from the A;

M is any of a group 1 element, a group 2 element selected from the group consisting of Ca, Sr, and Ba, or a lanthanoid in the periodic table, and represents an element different from the A and X;

n is 0<n<1;
y is 0<y<1;
m is 0≤m<1; and
n+y+m=1).

<<Invention of Cobalt/Support>>

[21] A composite oxide including a metal element represented by the composition of general formula (6):

$$A_nX_y \quad (6),$$

which is in a mixed state of an oxide of A and an oxide of X (in the general formula (6).

A represents an element selected from the group consisting of Sc, Y, and a trivalent lanthanoid;

X represents an element selected from the group consisting of Ca, Sr, and Ba;

n is 0<n<1;
y is 0<y<1; and
n+y=1).

[22] A composite oxide including a metal element represented by the composition of general formula (7):

$$A_nX_yO_x \quad (7),$$

which is in a mixed state of an oxide of A and an oxide of X (in the general formula (7), A represents an element selected from the group consisting of Sc, Y, and a trivalent lanthanoid;

X represents an element selected from the group consisting of Ca, Sr, and Ba;

n is 0<n<1;
y is 0<y<1;
n+y=1; and x represents the number of oxygen atoms necessary for the composite oxide to remain electrically neutral).

The composite oxide according to [21] or [22] above, wherein the A is selected from the group consisting of Sc, Y, La, Nd, Pm, Sm, Eu, Gd, Dy, Ho, Er, Tm, and Lu.

[24] The composite oxide according to [21] or [22] above, wherein the A is La and the X is Ba.

[25] The composite oxide according to [21] or [22] above, wherein the amount of carbonate ions is 10 mol % or less with respect to the X.

[26] The composite oxide according to [21] or [22] above, wherein oxide particles of the X are deposited on the surface of oxide particles of the A.

[27] The composite oxide according to [21] above, including a metal element represented by the composition of general formula (6A):

$$A_nX_yM_m \quad (6A)$$

(in the general formula (6A),

A and X are as defined in claim 1;

M is any of a group 1 element of the periodic table, a group 2 element selected from the group consisting of Ca, Sr, and Ba, or a lanthanoid, and represents an element different from the A and the X;

n is 0<n<1;
y is 0<y<1;
m is 0≤m<1; and
n+y+m=1).

[27a] The composite oxide according to [27] above, wherein the composite oxide includes a tetragonal or cubic solid solution.

[27b] The composite oxide according to [27] above, wherein at least one of the elements A, X, and M included in the composite oxide is a strongly basic element having a partial negative charge value $(-\delta_o)$ of oxygen in the oxide state of 0.50 or more.

[27c] The composite oxide according to [27] above, wherein when the composition ratio of each element contained in the composite oxide is expressed as ni (i shows all elements in the composite oxide containing A, X, M, and O), and the Sanderson electronegativity of each element is expressed as xi (i shows all elements in the composite oxide containing A, X, M, and O), the partial negative charge value $(-\delta_o)$ of oxygen represented by the following formula (A) is 0.52 or more.

$$((\Pi(\chi i^{ni}))^{\wedge}(1/\Sigma ni)-5.21)/-4.75 \qquad \text{Formula A}$$

[27d] The composite oxide according to [27] above, wherein X in the general formula (6A) is Ba, and the amount of carbonate ions contained in the composite oxide is 10 mol % or less with respect to Ba.

[28] A metal-supported material wherein cobalt particles are supported on the composite oxide according to [21] or [22] above.

[29] The metal-supported material according to [28] above, wherein a layer including fine particles of the oxide of A and the oxide of X is provided on the cobalt particles.

[29-2] The metal-supported material according to [28] above, wherein a layer including fine particles of the composite oxide of the A and the X is provided on the cobalt particles.

[30] The metal-supported material according to [28] above, wherein the ratio of a Co dispersity value $(D_{ads})$ determined by $H_2$ pulse chemisorption method and a Co dispersity value $(D_{TEM})$ expected from the average particle diameter of Co particles determined from a TEM image is $0 < D_{ads}/D_{TEM} < 1$.

[31] The metal-supported material according to [28] above, wherein the average particle diameter of the cobalt particles supported on the composite oxide is 100 nm or less.

[32] An ammonia synthesis catalyst using the metal-supported material according to [28] above.

[33] A method for producing the metal-supported material according to [28] above, which method includes:
  a mixing step of mixing an A precursor containing the A and an X precursor containing the X to obtain a mixture;
  a calcination step of calcining the mixture at a temperature of 600° C. or more to obtain a composite oxide support;
  a supporting step of preparing a supported material before pre-reduction treatment, by supporting a compound containing cobalt on the composite oxide; and
  a reduction step of reducing the supported material before pre-reduction treatment, at a temperature of 400° C. or more.

[34] A method for producing ammonia by bringing hydrogen and nitrogen into contact with a catalyst, wherein the catalyst is the ammonia synthesis catalyst according to [22] above.

Advantageous Effects of Invention

According to the present invention, it is possible to provide a composite oxide that can have ammonia synthesis activity different from that of a known Ru catalyst and a conventional Harber-Bosch catalyst. In addition, according to the present invention, by using a metal-supported material in which cobalt is supported on the composite oxide, it has become possible to provide an ammonia synthesis catalyst having a high ammonia yield on the high-pressure side compared to a catalyst supporting Ru. Furthermore, according to the present invention, it is possible to provide a method for producing such a composite oxide or a metal-supported material, and a method for producing ammonia using the same.

BRIEF DESCRIPTION OF DRAWINGS

FIGS. 2A-2I show HR-TEM and EDX mapping images of Ru-supported composite oxides exposed to air after reduction of $Ru/La_{0.5}Ce_{0.5}O_{1.75}$ at different temperatures, as well as histograms of Ru particle diameters.

FIG. 2A is a STEM image of $LaCeO_x$ after reduction at 500° C.

FIG. 2B, is an EDX mapping of $LaCeO_x$ after reduction at 500° C.

FIG. 2C is a histogram of Ru partible diameters of $LaCeO_x$ after reduction at 500° C.

FIG. 2D is a STEM image of $LaCeO_x$ after reduction at 650° C.

FIG. 2E, is an EDX mapping of $LaCeO_x$ after reduction at 650° C.

FIG. 2F is a histogram of Ru partible diameters of $LaCeO_x$ after reduction at 650° C.

FIG. 5 is a table showing the relationship among ammonia production rate H/Ru, specific surface area reduction, and Ru particle size change by the difference between calcination temperature of $Ru/La_{0.5}Ce_{0.5}O_{1.75}$ composite oxide and reduction temperature of metal-supported material.

DESCRIPTION OF THE INVENTION

Figure 1:
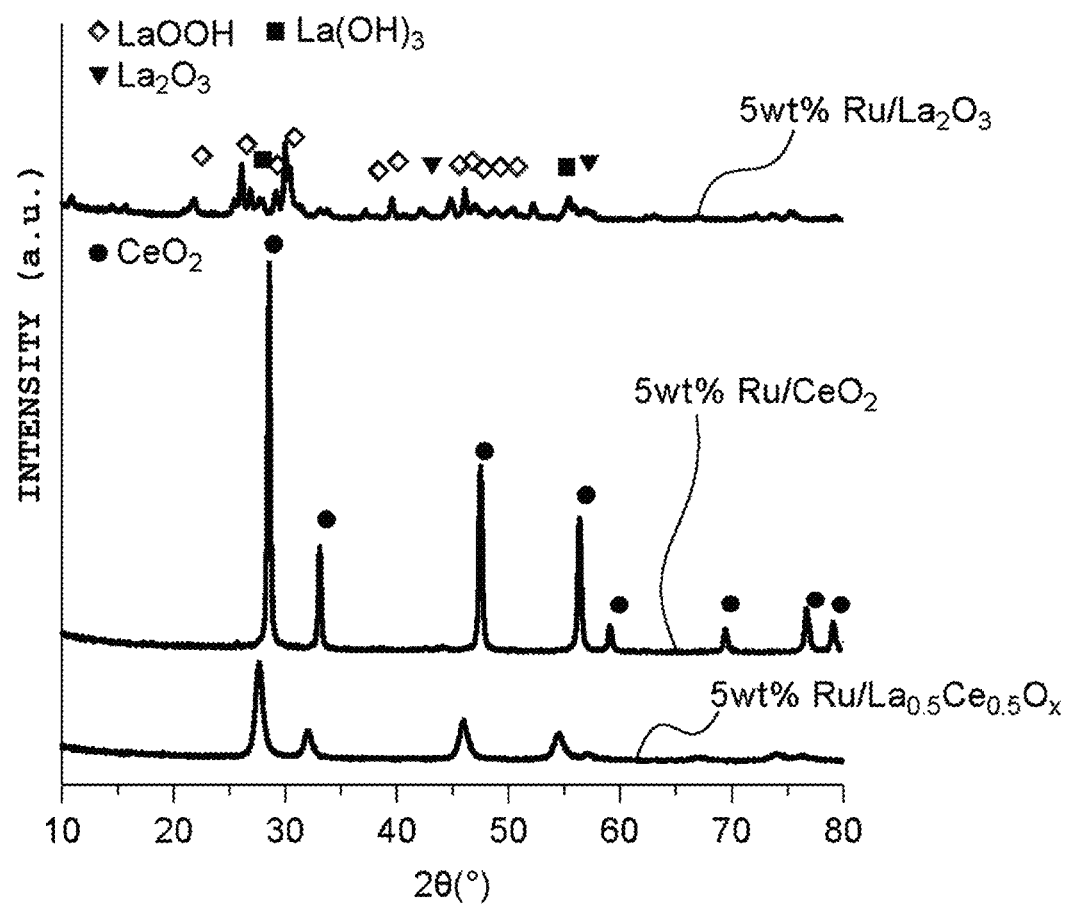
FIG. 1 is an XRD pattern of different Ru-supported composite oxides.

The composite oxide of the present invention is a composite oxide including a metal element represented by the composition of the following general formula (1):

$$A_n X_y M_m \tag{1}$$

In this composite oxide, (1) A is a rare earth element characterized in that at least a part or all thereof are in the III valence state and in particular, A is preferably a lanthanoid characterized in that at least a part or all thereof are in the III valence state.

(2) X is an element selected from group 2 elements, group 4 elements, or rare earth elements in the periodic table and is different from the A. and in particular, X is a group 2 element of the periodic table selected from the group consisting of Ca, Sr, and Ba, or a lanthanoid, and is preferably different from the A.

(3) M is an element selected from a group 1 element, a group 2 element, a group 4 element, or a rare earth element in the periodic table, and different from the A and X, and in particular, M is a group 1 element of the periodic table, a group 2 element selected from the group consisting of Ca, Sr, and Ba, or a lanthanoid and is preferably different from the A and X.

(4) n is 0<n<1, y is 0<y<1, m is 0<m<1, and n+y+m=1.

The composite oxide of the present invention is particularly preferably a composite oxide including a metal element represented by the composition of general formula (1):

$$A_n X_y M_m \tag{1}$$

(in the general formula (1),
A is a lanthanoid characterized in that at least a part or all thereof are in the III valence state;
X is either a group 2 element of the periodic table selected from the group consisting of Ca, Sr, and Ba, or a lanthanoid, and represents an element different from the A;
M is any of a group 1 element of the periodic table, a group 2 element selected from the group consisting of Ca, Sr, and Ba, or a lanthanoid, and represents an element different from the A and the X;

n is 0<n<1;
y is 0<y<1;
m is 0<m<1; and
n+y+m=1).

Alternatively, the composite oxide of the present invention may be a composite oxide including a metal element represented by general formula (1A):

$$A_n X_y M_m \tag{1A}$$

(in the general formula (1A),
A is a rare earth element characterized in that at least a part or all thereof are in the III valence state;
X is any of a group 2 element, a group 4 element, or a rare earth element in the periodic table, and represents an element different from the A;
M is any of a group 1 element, a group 2 element, a group 4 element, or a rare earth element in the periodic table, and represents an element different from the A and the X;

n is 0<n<1;
y is 0<y<1;
m is 0≤m<1; and
n+y+m=1).

Furthermore, the composite oxide of the present invention may be a composite oxide represented by the following general formula (2):

$$A_n X_y M_m O_x \tag{2}$$

(in the general formula (2),
A is a rare earth element characterized in that at least a part or all thereof are in the III valence state;
X is any of a group 2 element, a group 4 element, or a rare earth element in the periodic table, and represents an element different from the A;
M is any of a group 2 element, a group 4 element, or a rare earth element in the periodic table, and represents an element different from the A and the X;

n is 0<n<1;
y is 1−n;
m is 0≤m≤0.5); and
x represents the number of oxygen atoms necessary for the composite oxide to remain electrically neutral).

In addition, at least one of the elements A, X, and M constituting the composite oxide including the metal element represented by the composition of the general formula (1) is preferably a strongly basic element having a partial negative charge value (−δ$_o$) of oxygen in the oxide state of 0.50 or more.

Element A is a rare earth, and at least a part or all thereof are in the III valence state. Here, "at least a part or all thereof are in the III valence state" means that in the case of an element capable of taking only III valence, a part or all thereof is in the III valence state, and in the case of an element that can take a state of III valence and other valence (for example, IV valence), a part or all thereof are in the III valence state. That is, the element A includes an element that can only take a valence of III, or an element which can take both a valence of III and a valence of IV and in which at least a part or all thereof are in the III valence state. In order to at least partially convert an element that can be in both the III valence state and the IV valence state, into the III valence state, a part of the IV valence is converted into the III valence by reduction treatment described later.

In the present invention, at least one of the elements A, X, and M contained in the composite oxide is a strongly basic element that exhibits high basicity in the state of the oxide, making it possible to improve a catalytic activity for ammonia synthesis. The outline of the mechanism will be described below.

The basicity (Lewis basicity) of the metal oxide is related to the height of electron donating ability. That is, it is considered that a substance having a higher electron donating ability shows stronger basicity. Basically, since oxygen acts as an electron donor in an oxide, the amount of charge of oxygen in the oxide, that is, the partial negative charge of oxygen is useful as a basic indicator. In fact, in the non patent literature (Sanderson "Inorganic Chemistry (Volume One)" Hirokawa Shoten (1975), page 276, Table 12.7), it has been shown that the partial negative charge of oxygen correlates well with the acid basicity of oxides.

The calculation method of the partial negative charge of oxygen was based on non patent literature (Sanderson "Inorganic Chemistry (Volume One)". Hirokawa Shoten (1975), page 122, table 6.7, pages 126 to 128). First, the composition ratio of each element in the composite oxide is determined. For example, the ratio of La in "$Ce_{0.5}La_{0.5}O_{1.75}$" is 0.5. Let this value be ni (i is the corresponding element). Further, the electronegativity of each element is expressed as $\chi i$. Then, the geometric mean of the electronegativity of all atoms constituting the composite oxide is obtained by $(\Pi(\chi i^{ni}))^{\wedge}(1/\Sigma ni)$. Next, in order to obtain the partial negative charge of oxygen from the change of oxygen electronegativity, the difference between the geometric mean and the oxygen electronegativity (5.21) is taken. Finally, such a difference is divided by the change in electronegativity (−4.75) when one oxygen atom acquires one electron from the change in electronegativity of oxygen. Through the above calculation, the partial negative charge of oxygen exhibited by the composite oxide can be calculated. For details, reference can be made to Examples described later.

To summarize the above, the value, represented by the following formula (A), of the partial negative charge of oxygen in the composite oxide is preferably 0.52 or more when the composition ratio of each element contained in the composite oxide is expressed as ni (i shows all elements in the composite oxide containing at least A, X, M, and O) and the electronegativity of each element is expressed as xi (i shows all elements in the composite oxide containing at least A, X, M, and O).

$$((\Pi(\chi i^{ni}))^{\wedge}(1/\Sigma ni)-5.21)/-4.75 \quad \text{Formula (A)}$$

The value of the partial negative charge of oxygen in the composite oxide is preferably 0.52 or more, more preferably 0.55 or more, and particularly preferably 0.57 or more. If the value of the partial negative charge of oxygen in the composite oxide is 0.52 or more, the ammonia synthesis activity tends to increase. The upper limit of the value of the partial negative charge of oxygen in the composite oxide is not particularly limited but is theoretically about 0.70 at the maximum.

When A is an element having a valence of III such as La, these are strongly basic metal elements. For this reason, electrons are generated from the base site of the composite oxide (support), and this is reversely donated to nitrogen molecules via a transition metal (Ru or the like) supported on the composite oxide, thereby weakening the nitrogen triple bond. Thereby, the energy of breaking the triple bond of the nitrogen molecule, which is the rate-determining step of the ammonia synthesis reaction, is reduced to improve the ammonia synthesis activity of the metal-supported material (catalyst).

When A is an element capable of taking III and IV valences such as Ce, the A in the case of III valence is a strongly basic metal element, but in the case of IV valence, the A has a degree of basicity smaller than in the case of III valence. As will be described later, when the raw materials are mixed and calcined to obtain a composite oxide, Ce has a IV valence, but at least a part or all of the Ce can be converted to Ce with a III valence by a reduction treatment or the like described later, thereby to obtain a strongly basic element. As a result, the ammonia synthesis activity of the metal-supported material is improved by the same mechanism as in the case where the A is La. Further, reduction of an IV valent element to a III valent element causes donable electrons to be generated by reoxidation of the element to IV valence, which is reversely donated to nitrogen molecules via a transition metal (Ru, etc.), thereby to improve the ammonia synthesis activity of the metal-supported material.

In the above description, the case where the element A is a strongly basic element has been described. However, the element X and the element M described later can also become a strongly basic element. Particularly, in the case of a binary composite oxide composed of elements A and X, it is more preferred that both elements A and X are strongly basic. In the case of a ternary composite oxide composed of elements A, X, and M, elements X and M may be more basic than element A in some cases. Particularly, when the element X and/or M is an element belonging to group 2 selected from Ca, Sr, and Ba in the periodic table, the basicity tends to be higher than that of the element A (rare earth).

In addition, when a strongly basic element, especially the element M is an element belonging to group 2 of the periodic table, it easily reacts with carbon dioxide or water in the atmosphere to form a metal carbonate or hydroxide. The metal carbonate or hydroxide lowers the basicity of the composite oxide and causes the ammonia synthesis activity of the catalyst to decrease. For example, Ba becomes $BaCO_3$ or $Ba(OH)_2$ in the atmosphere, which lowers ammonia synthesis activity. For this reason, the metal carbonate and the metal hydroxide contained in the ammonia synthesis catalyst should be as small as possible. In order to decrease metal carbonates and hydroxides, it is preferable to carry out reduction treatment under heating conditions as will be described later, thereby being able to decompose the metal carbonates and hydroxides contained in the catalyst and prevent the decrease in the basicity. The amount of the carbonate contained in the metal-supported material is not particularly limited so long as it does not inhibit the ammonia synthesis activity, but is, for example, 10 mol % or less, preferably 1 mol % or less, more preferably 0.1 mol % or less, and still more preferably 0.01 mol % or less, relative to a group 2 element X selected from the group consisting of Ca, Sr, and Ba in the periodic table.

As a method for quantifying the amount of carbonates present as a metal carbonate, hydrocarbons such as methane generated by hydrogenating carbonic acid species by heating the catalyst under hydrogen flow are detected by mass spectrometry or by using a hydrogen flame ionization detector, or the like. The resulting detected amount is converted, so that the abundance as carbonate can be quantified.

In addition, infrared absorption spectroscopy having high sensitivity to metal carbonate can also be used. The amount of carbonate contained in the catalyst can be quantified by irradiating the catalyst with infrared light and measuring the absorption intensity of the wavenumber peak characteristically absorbed by the carbonates. For example, the peak positions that can be used for the quantitative determination of barium carbonate are around 3000 cm$^{-1}$, around 2450 cm$^{-1}$, around 1750 cm$^{-1}$, around 1480 cm$^{-1}$, and around 1060 cm$^{-1}$.

When A is a rare earth element capable of taking a valence of III and a higher valence (IV or more), the ratio ($A^{3+}/A_{total}$) of the number of moles in the III valence state ($A^{3+}$) to the total number of moles of A ($A_{total}$) is preferably $0.1 \leq A^{3+}/A_{total} \leq 1.0$. The lower limit of the value of $A^{3+}/A_{total}$ is 0.1 or more, preferably 0.2 or more, and more preferably 0.3 or more. The upper limit of the value of $A^{3+}/A_{total}$ is not particularly limited and is preferably close to 1.0, but is preferably 0.8 or more, more preferably 0.9 or more, and particularly preferably 0.95 or more. If the value of $A^{3+}/A_{total}$ is 0.1 or more and 0.95 or less, the performance per catalyst weight is excellent when used as an ammonia synthesis catalyst. An example of such a rare earth element can be Ce.

On the other hand, when A is a rare earth element that can only take III valence, $A^{3+}/A_{total}$ is 1.00. Examples of such rare earths can include La.

When M is a rare earth element capable of taking a valence of III and a higher valence (IV or higher valence), the ratio ($M^{3+}/M_{total}$) of the number of moles in the III valence state ($M^{3+}$) to the total number of moles of M ($M_{total}$) is preferably $0.1 \leq M^{3+}/M_{total} \leq 1.0$. The lower limit of the value of $M^{3+}/M_{total}$ is 0.1 or more, preferably 0.2 or more, and more preferably 0.3 or more. The upper limit of the value of $M^{3+}/M_{total}$ is not particularly limited and is preferably close to 1.0, but is preferably 0.8 or more, more preferably 0.9 or more, and particularly preferably 0.95 or more. If the value of $M^{3+}/M_{total}$ is 0.1 or more and 0.95 or less, the performance per catalyst weight is excellent when used as an ammonia synthesis catalyst. An example of such a rare earth element can be Ce.

On the other hand, when M is a rare earth element that can take only III valence, $M^{3+}/M_{total}$ is 1.00. Examples of such rare earths can include La.

When A is a rare earth element that can have a valence of III and higher (IV or higher valence), various chemical reduction methods can be used to obtain the desired $A^{3+}/A_{total}$ value. The simplest method is to heat the metal-supported material under the flow of hydrogen, and $A^{3+}/A_{total}$ can be controlled to an arbitrary value by changing the temperature and heating time. In addition. $A^{3+}/A_{total}$ can be also controlled to an arbitrary value by mixing with an inert gas such as nitrogen or argon to change the concentration of hydrogen.

Examples of such element A include lanthanoids, preferably Ce, Pr, Tb, and La, more preferably Ce and La, and most preferably Ce.

The element X constituting the composite oxide of the general formula (1) is selected from a group 2 element of the periodic table, that is, Mg, Ca, Sr, or Ba, a group 4 element of the periodic table, that is, Ti, Zr, or Hf, or a rare earth element of the periodic table, that is, Sc, Y, La, Ce, Pr, Nd, Sm, Eu, Gd, Tb, Dy, Ho, Er, Tm, Yb, or Lu, and is not the same as another element A constituting the composite oxide, and X and M are not the same as each other.

When the element X is a group 2 element of the periodic table, such an element is preferably selected from Ca, Sr, and Ba. Further, when the element X is a rare earth, X is preferably a lanthanoid.

The element M constituting the composite oxide of the general formula (1) is a group 1 element of the periodic table, that is, Na, K, Rb, Cs, or Fr, or a group 2 element of the periodic table, that is, Mg, Ca, Sr. or Ba, a group 4 element, that is, Ti, Zr, or Hf, or a rare earth element, that is, Sc, Y, La, Ce, Pr, Nd, Sm, Eu, Gd, Tb, Dy, Ho, Er, Tm, Yb, or Lu, which is not the same as another element A constituting the composite oxide, and X and M are not the same as each other. When the element M is a group 2 element of the periodic table, it is preferably selected from Ca, Sr, and Ba. Further, when the element M is a rare earth, it is preferably a lanthanoid. Particularly, from the viewpoint of ammonia synthesis activity, the element M is preferably Ba.

Preferably, X and M are selected from Zr and La. The composite oxide in the present invention may contain two kinds of group 4 elements or rare earth elements in the periodic table as X and M, or may contain only one kind of group 4 elements or rare earth elements in the periodic table as X (m is zero in the general formula (1)).

At least one of the elements A, X, and M is preferably a strongly basic element having a partial negative charge ($-\delta_o$) value of oxygen in the oxide state of 0.50 or more. Among the elements A, X, and M, any one of them is a strong basic element having a partial negative charge ($-\delta_o$) value of oxygen of 0.50 or more, but two or more of these elements, particularly all three elements are preferably strongly basic elements having a partial negative charge ($-\delta_o$) value of 0.50 or more.

Here, the values listed in Table 12.7 of non patent literature (Sanderson "Inorganic Chemistry (Volume One)" Hirokawa Shoten (1975), page 276) as the partial negative charge ($-\delta_o$) of oxygen can be used. The values not listed therein can be calculated by the partial negative charge calculation of oxygen described above. The table below shows typical oxides and valences of elements contained in the composite oxide used in Examples, and partial negative charge ($-\delta_o$) of oxygen.

TABLE 1

| Oxide | Valence | Partial negative charge ($-\delta o$) of oxygen |
|---|---|---|
| BaO | Bivalent | 0.67 |
| La$_2$O$_3$ | Trivalent | 0.56 |
| Pr$_2$O$_3$ | Trivalent | 0.55 |
| Ce$_2$O$_3$ | Trivalent | 0.55 |
| Tb$_2$O$_3$ | Trivalent | 0.54 |
| Tb$_4$O$_7$ | Trivalent + Tetravalent | 0.50 |
| CeO$_2$ | Tetravalent | 0.49 |
| PrO$_2$ | Tetravalent | 0.48 |
| ZrO$_2$ | Tetravalent | 0.44 |

In elements A, X, and M, when the oxide has only one valence, such as in the case of Ba and La whose oxygen partial negative charge ($-\delta_o$) is 0.50 or more, these elements are strong bases. In the case of an element having two or more oxide valences such as Ce, Pr, and Tb, the value of the partial negative charge ($-\delta_o$) of oxygen calculated by the ratio of the valences of the elements contained in the composite oxide is preferably 0.50 or more. For example, in the case where Pr contained in the composite oxide is completely IV-valent. Pr has the partial negative charge ($-\delta_o$) of oxygen of 0.48. On the other hand, when Pr is completely III-valent, the value of partial negative charge ($-\delta_o$) of oxygen is 0.55, which is preferable from the viewpoint of ammonia synthesis activity than in the case of Pr (IV valency). The value of partial negative charge ($-\delta_o$) of oxygen in the case where III and IV valences coexist in the element can be calculated in the same manner as in the case of partial negative charge of oxygen in the above composite oxide. That is, if the ratio (composition ratio) between the III-valent element and the IV-valent element is known, the oxygen content at which the oxide becomes electrically neutral can be determined, so that the value of partial negative charge ($-\delta_o$) of oxygen can be calculated as a geometric mean according to an equation (A). In addition, for example, when two or more elements having both valences III and IV are included, such as a composite oxide composed of Ce and Pr, the oxygen content at which the oxide becomes electrically neutral can be determined by using the ratio of the III-valent element and the IV-valent element in each element. In order to obtain the ratio of the III-valent element and the IV-valent element in each element, a method such as diffraction line shift by XRD or X-ray absorption spectroscopy can be used. For elements having valences other than III and IV valences, the partial negative charge ($-\delta_o$) value of oxygen can be calculated by the same method.

The ranges of n, y, m, and x when the composite oxide of the present invention is expressed as general formulas (1) and (2) are as follows.

In the general formulas (1) and (2) representing the ratio of the element A in the composite oxide, n is 0<n<1, preferably 0.05<n<0.95, more preferably 0.1<n<0.9, and particularly preferably 0.35≤n≤0.5.

y in the general formula (1) representing the ratio of the element X in the composite oxide is 0<y<1, preferably 0.05<y<0.95, more preferably 0.1<y<0.9, and particularly preferably 0.35≤y≤0.5. Further, y in the general formula (2) representing the ratio of the element X in the composite oxide is 1−n.

m in the general formula (1) representing the ratio of the element M in the composite oxide is 0≤m<1, and m in the general formula (2) is 0≤m≤0.5. In both formulas (1) and (2), m is preferably 0<m<0.5, more preferably 0.05≤m≤0.45, and particularly preferably 0.1≤m≤0.3. When m is zero, the composite oxide is composed of only A, X, and O.

x in the general formula (2) representing the ratio of oxygen O in the composite oxide is the number of oxygen atoms necessary for the composite oxide to remain electrically neutral. Although x depends on the types of elements A, X, and M, x is generally in the range of 0.5<x≤2, and particularly in the range of 1<x≤2.

The composite oxide including a metal element represented by the composition of the general formula (1) and the composite oxide of the general formula (2) used in the present invention are preferably tetragonal or cubic solid solutions. Since these crystal structures have high symmetry and the crystal lattice has flexibility, the crystal structure can be maintained even when the ratio of III valence in the element A changes to vary the number of oxygen atoms.

For example, in the case of a binary support containing two metal elements such as $La_{0.5}Ce_{0.5}O_{1.75}$, when these elements are a complex of lanthanoid elements, a uniform solid solution is often formed. Then, Ru particles are contacted directly with the surface of the solid solutions. Since both La and Ce are strong basic elements in the oxide state when Ce is reduced, there are many active sites with Ru, so that it is presumed that ammonia synthesis activity becomes high.

On the other hand, in the case of a ternary support containing three metal elements such as $Ba_{0.1}La_{0.45}Ce_{0.45}O_x$, Ba has a larger atomic radius than La and Ce. In this case, when the calcination temperature of the raw material mixture is high, for example, when the calcination temperature is higher than 1000° C., all the elements are uniformly solid-solved to form a perovskite crystal structure. To the contrary, when the calcination temperature of the raw material mixture is low, Ba is not easily solid-solved in other elements because Ba is a large element. For this reason, a structure in which Ba is non-uniformly mixed with a solid solution of La and Ce is formed, so that a part of Ba is exposed on the surface of the solid solution of La and Ce. Since Ba is a strongly basic element having a higher partial negative charge of oxygen than La and Ce, the contact area between Ba and Ru increases in a support in which Ba is exposed unevenly, thereby to increase the active sites. For this reason, it is estimated that ammonia synthesis activity becomes high.

The same applies to a binary support containing two metal elements having a large difference in atomic radius, such as $Ba_{0.05}La_{0.95}O_x$, and such a binary support does not become a solid solution under the calcination conditions of Examples according to the present invention. Instead, a structure such that Ba is heterogeneously mixed with La is formed (see FIG. 15: $Ba_{0.05}La_{0.95}O_x$ is not a solid solution, so the diffraction angle does not shift with respect to $La_2O_3$).

When determining the partial negative charge of oxygen in the present invention, among the elements forming the composite, (a) the partial negative charge of oxygen in the oxide state may be determined, or (b) the partial negative charge of oxygen may be determined by the following formula (A) when the composition ratio of each element contained in the composite oxide is expressed as ni (where i represents all elements in the composite oxide containing A, X, M, and O), and the Anderson electronegativity of each element is expressed as $\chi i$ (where i represents all elements in the composite oxide containing A, X, M, and O).

$$(\Pi(\chi_i^{ni}))^{(1/\Sigma ni)} - 5.21)/-4.75 \quad \text{Formula (A)}$$

When the composite oxide of the present invention forms a uniform composite oxide, it is preferable to carry out the method (b) for obtaining the partial negative charge of oxygen. When the composite oxide of the present invention forms a heterogeneous composite oxide, the method (a) is preferably performed for obtaining the partial negative charge of oxygen, and in this case, the result of the element having the largest absolute value among the partial negative charges of oxygen of the individual element is used. In this specification, the value of the partial negative charge of oxygen in the composite oxide is calculated by the method (b) described above.

The metal-supported material of the present invention is characterized in that a transition metal excluding a group 4 element is supported on the composite oxide of the present invention. The transition metal is preferably at least one selected from the group consisting of Ru, Fe, Co, Ni, Rh, Pd, Os, Ir, and Pt from the viewpoint of high catalytic activity, and more preferably Ru and/or Co. The amount ratio between the transition metal and the composite oxide can be determined in consideration of the catalytic activity and the cost of the transition metal. For example, the ratio of the transition metal to the entire metal-supported material is preferably in a range of 0.1 to 50% by weight, and more preferably in a range of 5.0 to 30% by weight.

In the metal-supported material in which ruthenium is supported on the composite oxide of the present invention, it is preferable that the ratio of Ru dispersity value ($D_{ads}$) obtained by $H_2$ pulse chemisorption method to Ru dispersity value ($D_{TEM}$) estimated from average particle diameter of Ru particles obtained from the TEM image is $0 < D_{ads}/D_{TEM} < 1$.

The Ru dispersity represents the ratio between the number of Ru atoms exposed on the surface of the metal-supported material and the number of all Ru atoms contained in the metal-supported material. The Ru dispersity can be determined from the amount of hydrogen adsorbed on a metal-supported material on which Ru is supported.

Specifically, assuming that one Ru atom adsorbs one H atom, the ratio (H/Ru) of the number of hydrogen atoms H corresponding to the number of Ru atoms exposed on the surface of the metal-supported material to the total number of Ru atoms supported on the metal-supported material is the dispersity of Ru. In the present invention, the Ru dispersity based on the hydrogen adsorption amount is expressed as $D_{ads}$. By comparing metal-supported materials supporting the same amount (the same number of atoms) of Ru, it can be considered that the higher the dispersity of Ru, the greater the number of catalyst active sites.

Assuming that the form of Ru particles is a cube, it is known that the value of Ru dispersity can be obtained geometrically using the average particle diameter (d, unit in nm) of Ru obtained by TEM observation (see the literature "Catalyst Dictionary"). The calculation method can be expressed by general formula (4). The average particle diameter of Ru can be calculated by randomly extracting 100 to 150 Ru particles from a TEM image, measuring the respective particle diameters, and averaging them. In the present invention, the Ru dispersity value obtained based on the general formula (4) is expressed as $D_{TEM}$:

$$D_{TEM}=1.113/d \quad (4).$$

Therefore, when $D_{ads}/D_{TEM}$ is less than 1, such a ratio means that a part of Ru particles, mainly the vicinity of the interface between the particles and the composite oxide (support) is coated with the support material, and the adsorption of H atoms on the surface of the Ru particles is blocked. Such a phenomenon is known as a Strong Metal Support Interaction (SMSI) phenomenon and appears when a strong interaction exists between a supported metal and a support. The driving force of SMSI has been reported to be the production of a reduced support, such as $Ru/CeO_{2-x}$.

In the metal-supported material of the present invention in which metal ruthenium is supported on the composite oxide, the average particle diameter of Ru is preferably 5 nm or less. The average particle diameter of Ru is more preferably 3 nm or less, and still more preferably 2 nm or less. The smaller the particle diameter of Ru, the more the number of active sites when used as an ammonia synthesis catalyst is advantageously increased. The lower limit of the average particle diameter of Ru is not particularly limited, but is, for example, 0.1 nm or more and 0.5 nm or more.

When the composite oxide supports a metal cobalt, the average particle diameter of Co is preferably 100 nm or less. More preferably, such a diameter is 50 nm or less, and still more preferably 30 nm or less. The smaller the particle diameter of Co, the more the number of active sites when used as an ammonia synthesis catalyst is increased, which is advantageous. The lower limit of the average particle diameter of Co is not particularly limited, but is, for example, 0.5 nm or more, and 1 nm or more. Similarly to the case of Ru, the ratio between the Co dispersity value ($D_{ads}$) determined by the $H_2$ pulse chemisorption method and the Co dispersity value ($D_{TEM}$) expected from the average particle diameter of the Co particles determined from the TEM image is preferably $0<D_{ads}/D_{TEM}<1$.

In the metal-supported material in which Ru is supported on the composite oxide of the general formula (1) used in the present invention, a very high ammonia synthesis rate (e.g., 13.4 mmol $g^{-1}$ $h^{-1}$ under 0.1 MPa at 350° C. or 31.3 mmol $g^{-1}$ $h^{-1}$ under 1 MPa at 350° C.) is shown under mild ammonia synthesis conditions (300-500° C., 0.1-20 MPa) because a part or all of A is III-valent and the supported catalyst Ru has an average particle diameter of 5 nm or less.

A composite oxide of the present invention in which a part of A is III-valent is obtained by reducing a thermally stable composite oxide supporting a Ru catalyst at a high temperature. The technology for reducing a Ru-supported Ce oxide has been known for a long time, but until now it has been understood that the ammonia synthesis rate of the catalyst decreases when the reduction treatment temperature exceeds 500° C. (Non Patent Literature 1).

On the other hand, the inventors have found that the ammonia synthesis rate of a Ru-supported material on a composite oxide, including a metal-supported material in which $La_{0.5}Ce_{0.5}O_{1.75}$ supporting Ru is reduced, was improved by reduction treatment at a high temperature exceeding 500° C. and reached a peak at a reduction treatment temperature of about 650° C. That is, it has been found that by using as a support a composite oxide containing Ce, a catalyst having higher activity can be obtained as compared with the case where an oxide containing only Ce is used as a support.

In this specification, in order to simplify the expression, a metal-supported material represented by "$La_{0.5}Ce_{0.5}O_{1.75}$ supporting Ru" is referred to as "$Ru/La_{0.5}Ce_{0.5}O_{1.5}$", and the reduction product of the metal-supported material is expressed as "$Ru/La_{0.5}Ce_{0.5}O_x$". Similar expressions will be used for other supported materials. Here, x means that 1.75 which is the molar ratio of oxygen at the time of calcination is reduced to x as a part of Ce is reduced from IV valence to III valence.

For example, the composite oxide $La_{0.5}Ce_{0.5}O_x$ of the present invention, which is a composite oxide of $CeO_2$ and $La_2O_3$ and reduced at a high temperature of 650° C. which is not conventional, is a solid solution of tetragonal crystal or cubic crystal. The Ru catalyst supported on the composite oxide exhibits a high ammonia synthesis activity comparable to the activity of the most active catalyst reported so far. Such a structure and state of the catalyst due to the action of the reduction temperature has been elucidated by a combination of various characterization methods including scanning transmission electron microscope (STEM) image processing and chemical adsorption amount measurement.

As shown in Example 1 of Table 2 described later, the ammonia synthesis rate at a reaction pressure of 1.0 MPa and a reaction temperature of 350° C. of a metal-supported material ($Ru/La_{0.5}Ce_{0.5}O_x$) obtained by reduction of $Ru/La_{0.5}Ce_{0.5}O_{1.75}$ at 500° C. was 1.7 times or more larger than those when $Ru/La_2O_3$ was reduced at 500° C. (Comparative Example 4 in Table 9: $Ru/La_2O_3$) and $Ru/CeO_2$ was reduced at 500° C. (Comparative Example 5 in Table 9: $Ru/CeO_x$). This indicates that the ammonia synthesis rate was increased by using a composite oxide of $La_2O_3$ and $CeO_2$.

As shown in FIG. 1, in the XRD pattern for $Ru/La_2O_3$, many peaks derived from LaOOH and $La(OH)_3$ were observed in addition to small peaks caused by $La_2O_3$. On the other hand, in the XRD pattern of $Ru/La_{0.5}Ce_{0.5}O_x$, a peak derived from a cubic crystal structure having a crystal lattice smaller than $CeO_2$ was observed and no other peaks derived from impurities such as LaOOH and $La(OH)_3$ were observed. These results indicate that the formation of $La_{0.5}Ce_{0.5}O_{1.75}$ composite oxide before reduction hindered the adsorption of water to $La_2O_3$ and the crystal growth of the acidic support. Actually, the specific surface area of the composite oxide obtained by reducing $La_{0.5}Ce_{0.5}O_{1.75}$ at 500° C. was 47 $m^2g^{-1}$, and was much larger than those obtained by reducing $Ru/CeO_2$ at 500° C. and 650° C.

(respectively 24 and 20 $m^2g^{-1}$). The reason why the specific surface area increases in $La_{0.5}Ce_{0.5}O_x$ is probably due to the co-presence of different cations on the surface of the composite oxide. These results show that by using the composite oxide of $CeO_2$ and $La_2O_3$, the number of Ru active sites is increased, so that a large ammonia synthesis rate was produced for the metal-supported material obtained by reduction of $Ru/La_{0.5}Ce_{0.5}O$ at 500° C.

As described above, in the metal-supported material according to the present invention, the heat-stable $La_{0.5}Ce_{0.5}O_x$ after reduction firmly fixes fine Ru nanoparticles, and the number of active sites of Ru strongly interacting with the reduced support increases. As a result, it is considered that high ammonia synthesis activity can be obtained by these synergistic effects.

FIGS. 2A-2I show HR-TEM and EDX mapping images of $Ru/La_{0.5}Ce_{0.5}O_x$ after reduction at different temperatures, and histograms of Ru particle diameters observed with a TEM of a support exposed to air after reduction. In addition, Table 2 summarizes some of the characteristics and the results of activity tests.

Further, as shown in Examples 1 to 3 in Table 4, even when the reduction temperature was increased from 500° C. to 650° C., the average particle diameter of Ru was almost the same (1.8 nm or 1.7 nm). However, when the reduction temperature was further increased from 650° C. to 800° C., the average particle diameter of Ru increased from 1.7 nm to 2.7 nm, and the specific surface area decreased from 42 $m^2g^{-1}$ to 21 $m^2g^{-1}$.

The Ru dispersity represents the ratio between the number of Ru atoms exposed on the surface of the metal-supported material and the number of all Ru atoms contained in the metal-supported material. The Ru dispersity of the metal-supported material shown in Table 4 is determined from the amount of hydrogen adsorbed on the metal-supported material supporting Ru. Specifically, assuming that one Ru atom adsorbs one H atom, the ratio (H/Ru) of the number of hydrogen atoms corresponding to the number of Ru atoms exposed on the surface of the metal-supported material (referred to as H) and the total number "Ru" of Ru supported on the metal-supported material (referred to as Ru) was defined as the Ru dispersity. The amount of hydrogen adsorbed on the metal-supported material can be determined by the $H_2$ pulse chemisorption method. In the present invention, the Ru dispersity based on the hydrogen adsorption amount is expressed as $D_{ads}$. By comparing the metal-supported material on which the same amount (the same number of moles) of Ru is supported, it can be considered that the higher the Ru dispersity, the greater the number of catalyst active sites.

As shown in Table 4, $D_{ads}$ (H/Ru) decreased from 0.46 to 0.11 as the reduction temperature increased from 500° C. to 800° C. When the reduction temperature increased from 500° C. to 650° C. Das decreased from 0.46 to 0.35.

At this time, assuming that the form of the Ru particles is a cube, the value of Ru dispersity can be obtained geometrically using the average particle diameter (d, unit in nm) of Ru obtained by TEM observation, and the calculation method can be expressed by general formula (4). The average particle diameter can be calculated by randomly extracting 100 to 150 Ru particles from the TEM image, measuring the respective particle diameters, and averaging the measured values. In the present invention, the Ru dispersity value obtained based on the general formula (4) is expressed as $D_{TEM}$.

When the value of $D_{TEM}$ was determined, it was 0.62 in the case of reduction at 500° C. and 0.65 in the case of reduction at 650° C. which was larger than the value of $D_{ads}$ determined from the hydrogen adsorption method. For example, in the case of reduction at 650° C., the ratio $D_{ads}/D_{TEM}$ was 0.54.

These results indicate that after reduction at least at 650° C., about 50% of the Ru atoms on the surface of the Ru particles were covered with the support material, that is, the SMSI phenomenon occurred. The driving force of SMSI has been reported to be the production of reduced supports, such as $Ru/CeO_{2-x}$.

Table 4 shows the relationship between the specific surface area and dispersity of a metal-supported material $Ru/La_{0.5}Ce_{0.5}O_x$ (abbreviated as $Ru/La_{0.5}Ce_{0.5}O_x\_500°$ C.) after reduction of $Ru/La_{0.5}Ce_{0.5}O_{1.75}$ at 500° C. and a metal-supported material $Ru/La_{0.5}Ce_{0.5}O_x$ (abbreviated as $Ru/La_{0.5}Ce_{0.5}O_x\_650°$ C.) after reduction of $Ru/La_{0.5}Ce_{0.5}O_{1.75}$ at 650° C.

For the metal-supported material after reducing $Ru/La_{0.5}Ce_{0.5}O_{1.75}$, the degrees of reduction of $Ce^{4+}$ ($Ce^{4+} \rightarrow Ce^{3+}$) were 23% and 43%, respectively, after reduction at 500° C. and 650° C., estimated by the absorption capacity of oxygen ($O_2$) to $Ru/La_{0.5}Ce_{0.5}O_x$ after the reduction. That is, from this result, it became clear that the occurrence of SMSI and its involvement became stronger at higher temperatures. Furthermore, after reduction at 800°, the SMSI becomes noticeable in addition to the sintering of the Ru particles, and this is explained by the fact that the H/Ru ratio greatly reduced to 0.11 and the reduction degree of $Ce^{4+}$ increased to 63%. When SMSI is generated in this way, the TOF (catalyst turnover frequency) of Ru increases, that is, from 0.027 $s^{-1}$ at 500° C. reduction to 0.051 $s^{-1}$ and 0.108 $s^{-1}$ at 650° C. reduction and 800° C. reduction, respectively. This is because a part of the Ru particles is covered with a reduced support containing $Ce^{3+}$ enriched in electrons as compared to $Ce^{4+}$. The oxygen absorption capacity of the metal-supported material after reduction here was determined by the following method. The metal-supported material was heated to 500 to 800° C. under a flow of $H_2$ of 60 mL/min and then heated at 500° C. for 1 hour. The flow of $H_2$ was stopped, and Ar gas was circulated at 30 mL/min for 0.5 hours. Thereafter, $O_2$ pulse absorption measurement was performed at room temperature. 450° C. and 800° C. respectively.

In the Ru metal-supported material used in the present invention, when measured with an infrared spectrometer, an infrared absorption peak derived from nitrogen molecules ($^{14}N_2$) adsorbed on Ru particles appears below 2200 $cm^{-1}$. This absorption peak is derived from the stretching vibration mode of $N_2$ in which one N atom is adsorbed on the Ru particles, and this shows that the metal-supported material having an absorption in the region below this wavenumber weakens the N≡N bond in the nitrogen molecule, that is, has a function of promoting the activation of the nitrogen molecule.

Of the Ru metal-supported materials used in the present invention, it is shown that those having an infrared absorption peak derived from nitrogen molecules ($^{14}N_2$) adsorbed on Ru particles appearing at 1900 to 1700 $cm^{-1}$ has an effect of weakening the N≡N bond in the nitrogen molecules. For this reason, when such a metal-supported material is used as a catalyst in the ammonia synthesis reaction whose activation of a N≡N bond is a rate-determining step, the catalyst shows a particularly high activity.

Hereinafter, the infrared absorption peak will be described in detail. In the metal-supported material of the present invention, an intensity of activation of nitrogen molecules, which is regarded as a rate-determining step in the synthesis of ammonia from nitrogen and hydrogen, can be examined by an infrared absorption spectrum. Nitrogen interacts with the support of the present invention, as well as with the supported metal. The interaction means that nitrogen is adsorbed on a metal or forms a coordinate bond. In the state where nitrogen is close to and interacts with the supported metal in the long axis direction, v1 is observed in the region of 2300 to 2000 cm$^{-1}$ by the infrared absorption spectrum method. This region is a region where triple bonds such as C≡N and C≡C are observed, and it can be confirmed by $^{15}N_2$ that this is a vibration caused by nitrogen molecules used as a raw material. Nitrogen can also interact with the support, and further stretching vibration is observed at 1900-1500 cm$^{-1}$ on the low wavenumber side. This region is a region where double bond functional groups such as C=C, C=O, C=N, and N=O are observed, and it can be confirmed by $^{15}N_2$ that this vibration is a vibration caused by a nitrogen molecule used as a raw material. The inventors consider that the triple bond is weakened as a result of receiving electrons from the support in the vacant orbital of the nitrogen molecule, although not being bound by a specific mechanism. In the present invention, both stretching vibrations v1 and v2 may be seen, but only one of them may be seen. The N≡N bond is observed when there is an interaction with the supported metal and is not observed when there is an interaction with the support. Therefore, the exposed metal area by SMSI effects, kinetic problems, or electron donating properties of the support and the supported metal are factors for shifts in observed vibration frequency or only one observation of stretching vibrations.

Figure 3:
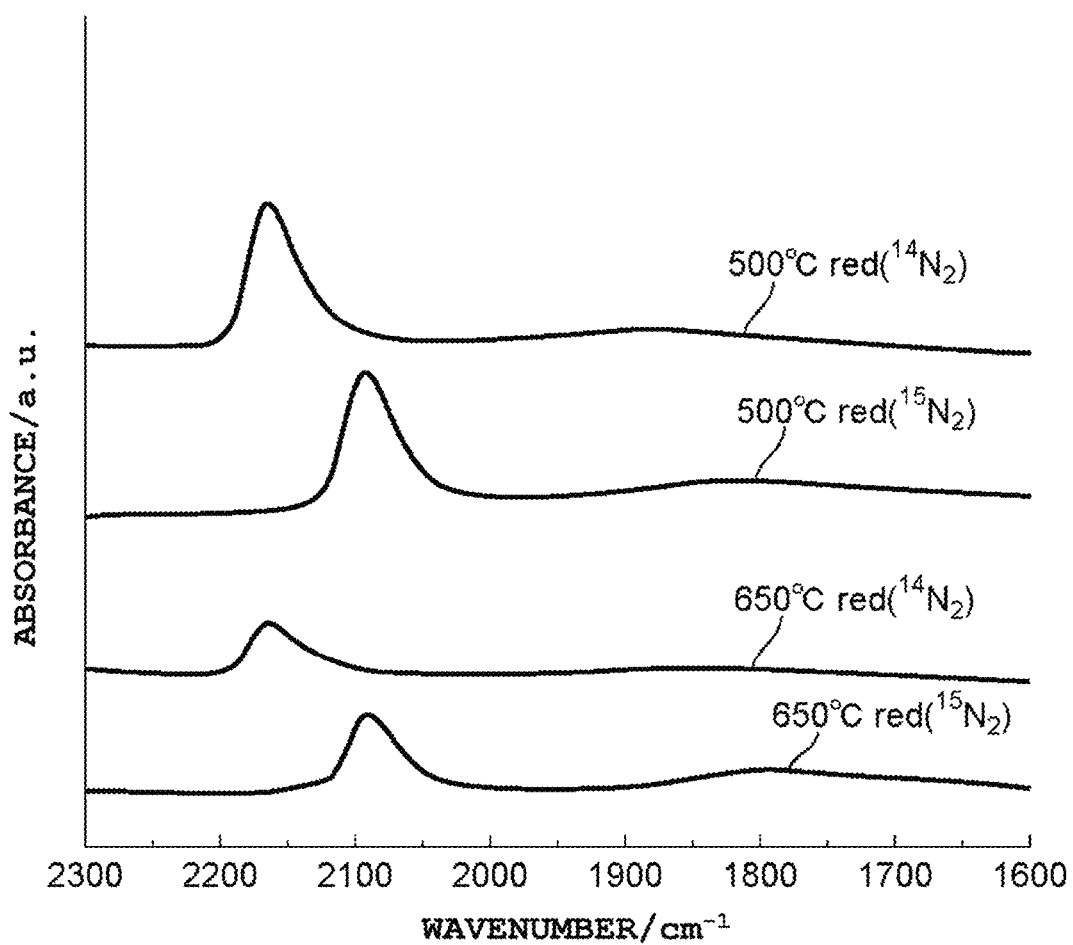
FIG. 3 is an IR spectrum of a reduced Ru-supported composite oxide after N2 addition at room temperature.

To understand the effect of reduction temperature on the activation of $N_2$ molecules, which is the rate-determining step of ammonia synthesis, the present inventors investigated the state of adsorbed $^{14}N_2$ by FT-IR technique for $Ru/La_{0.5}Ce_{0.5}O_{1.75}$. FIG. 3 shows an IR spectrum after introducing $N_2$ at room temperature to a metal-supported material obtained by reducing $Ru/La_{0.5}Ce_{0.5}O_{1.75}$ at 500° C. and 650° C. The IR spectra of both catalysts showed a peak at 2164 cm$^{-1}$ and a broad peak at approximately 1700-1900 cm$^{-1}$. It is noted that the broad peak shifted from 1883 cm$^{-1}$ to a lower wavenumber of 1844 cm$^{-1}$ as the reduction temperature increased from 500° C. to 650° C. In the spectrum when $^{15}N_2$ was adsorbed, the absorption peak of $Ru/La_{0.5}Ce_{0.5}O_x$ reduced at 500° C. shifted to lower wavenumbers (2093 cm$^{-1}$ and 1818 cm$^{-1}$). This is sufficiently equal to the wavenumbers predicted from the isotope effect (2164 cm$^{-1}$×(14/15)$^{1/2}$=2091 cm$^{-1}$ and 1885 cm$^{-1}$×(14/15)$^{1/2}$=1821 cm$^{-1}$). Similarly, in the spectrum where $Ru/La_{0.5}Ce_{0.5}O_x$ reduced at 650° C. and $^{15}N_2$ was adsorbed, a peak shift to a low wavenumber due to the isotope effect was observed. Therefore, all the peaks were due to the stretching vibration mode of $N_2$ in which one N atom was adsorbed on the Ru particles. Regardless of the reduction temperature, the peak appearing at the higher wavenumber of 2164 cm$^{-1}$ was attributed to $N_2$ adsorbed on Ru atoms that interact weakly with the reduced support. On the other hand, the broad peak at 1700-1900 cm$^{-1}$ was due to $N_2$ adsorbed on Ru atoms that interact directly with the reduced support formed by SMSI. That is, it became clear that the N≡N bond of $N_2$ is weakened by the contribution of SMSI even after reduction at 500° C.

From these results, in the metal-supported material of the present invention, if the wavenumber of the absorption peak in the infrared absorption spectrum after adsorbing nitrogen [$^{14}N_2$] to the metal-supported material is 2200 cm$^{-1}$ or less, it is presumed that activation of the $N_2$ molecules is promoted and the ammonia synthesis activity of the catalyst is increased. Further, a catalyst having an absorption peak at 1900-1700 cm$^{-1}$ has a particularly high activity, and an absorption peak around 2200 cm$^{-1}$ is not so often observed, and a peak at 1900-1700 cm$^{-1}$ may be characteristically observed.

When the reduction temperature is further increased to 650° C. SMSI occurs strongly, a lot of electrons move from the reduced support to the metal Ru, and the electrons move to the antibonding π orbitals of $N_2$, thereby to further weaken the N≡N bond on the Ru atom that interacts strongly with the reduced support. The fact that the ratio of the peak area of the higher wavenumber to the peak area of the lower wavenumber decreases as the reduction temperature increases from 500° C. to 650° C. is in good agreement with the increase in SMSI.

From these results, it was demonstrated that reduction of the metal-supported material at a high temperature induced SMSI and increased TOF, but the Ru surface was partially covered by the reduced composite oxide (support), thereby to decrease the number of active sites of Ru. As a result, after reduction at 650° C., the active site of Ru increased (TOF=0.051 s$^{-1}$, H/Ru=0.35), and the metal-supported material obtained by reducing $Ru/La_{0.5}Ce_{0.5}O_{1.75}$ at 650° C. exhibited a high ammonia synthesis rate of 31.3 mmol g$^{-1}$ h$^{-1}$. On the other hand, after reduction at 800° C., the Ru site is very active (TOF=0.108 s$^{-1}$), but the number of active Ru sites is small (H/Ru=0.11). Therefore, the ammonia synthesis rate of the metal-supported material obtained by reducing $Ru/La_{0.5}Ce_{0.5}O_{1.75}$ at 800° C. was smaller than that of the metal-supported material obtained by reducing $Ru/La_{0.5}Ce_{0.5}O_{1.75}$ at 650° C., and was 21 mmol g$^{-1}$h$^{-1}$. For comparison, when $Ru/CeO_2$ was reduced at 650° C., the specific surface area was only 20 m$^2$ g$^{-1}$, the average diameter of Ru particles was 2.7 nm, and H/Ru was 0.17, indicating that the Ru particles were sintered. On the other hand, when $Ru/La_{0.5}Ce_{0.5}O_{0.75}$ was reduced at 650° C., the sintering was suppressed well, and a high H/Ru ratio of the catalyst was maintained.

<Effect of Calcination Temperature and Reduction Temperature on Ammonia Synthesis Activity>

An important factor constituting the present invention is the calcination temperature of the composite oxide used as a support.

The catalyst of the present invention is activated by hydrogen pre-reduction treatment at a high temperature. This is because not only the transition metal such as Ru is reduced, but also the cation (for example, Ce$^{4+}$) in the composite oxide is reduced, thereby increasing the electron donating ability. Further, at this time, SMSI in which a part of the support covers Ru is developed.

In general, when the pre-reduction treatment is carried out at a high temperature, the specific surface area decreases with the sintering of the support and the metal particle diameter enlarges, resulting in deterioration of the catalytic activity.

Figure 4:
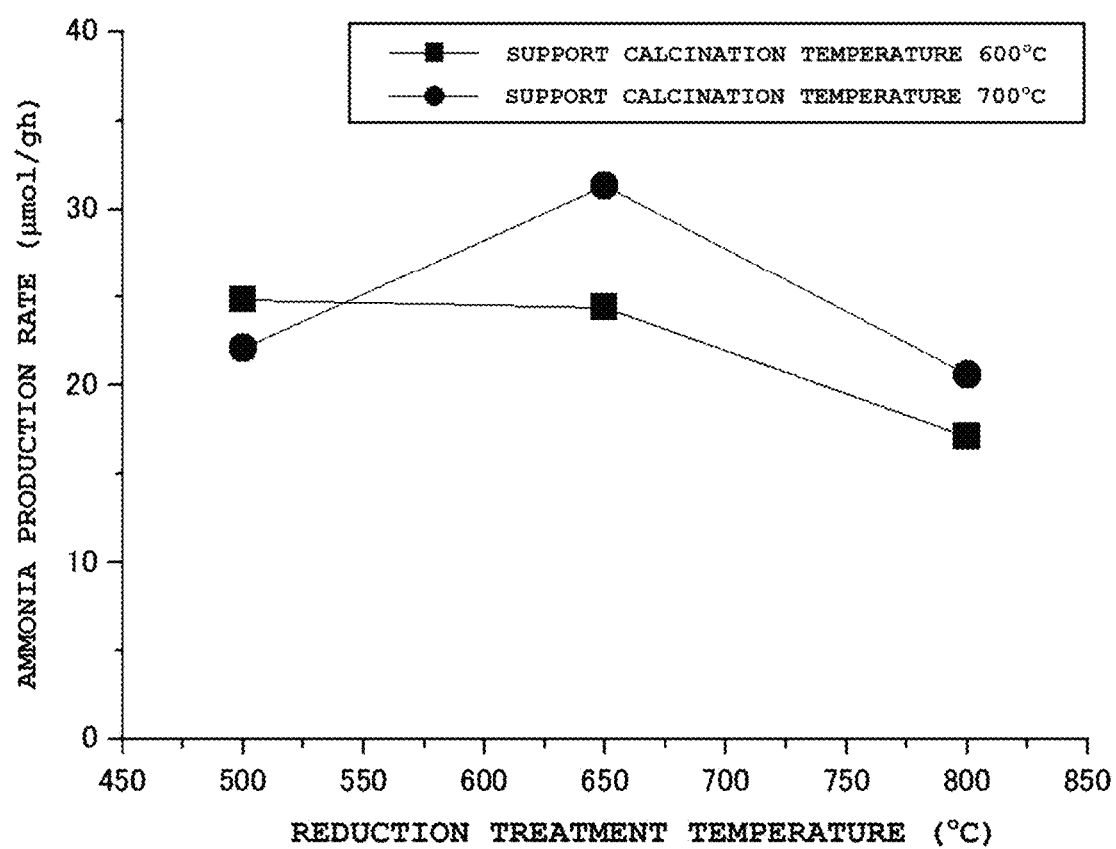
FIG. 4 is a graph showing the relationship between the ammonia production rate and the reduction treatment temperature of $Ru/La_{0.5}Ce_{0.5}O_x$.

An example of $La_{0.5}Ce_{0.5}O_{1.75}$ will be described. FIG. 4 is a graph of the ammonia production rate after reduction at 500° C. (Example 69 described later), 650° C. (Example 70), and 800° C. (Example 71) using $La_{0.5}Ce_{0.5}O_{1.75}$ with a calcination temperature of 600° C. From this graph, it can be understood that the ammonia synthesis activity decreases with an increase in the reduction temperature, and particularly when the reduction is performed at 800° C. the ammonia production rate is greatly decreased.

At this time. H/Ru, reduction degree of specific surface area, and changes in Ru particle diameter were examined. The results are shown in FIG. 5. It can be found that the specific surface area (SSA) is greatly reduced when the reduction temperature is increased from 650° C. to 800° C. At this time, it was revealed that the Ru particle diameter was increased, the Ru particles were also being sintered, and H/Ru was also decreased. This is thought to be because the calcination temperature for the support is low and a catalyst with insufficient structural stability was reduced at a temperature higher than the calcination temperature of the support.

That is, the reason why the ammonia production rate decreases as the reduction temperature increases is considered as follows: the specific surface area decreases due to sintering enlargement of the support particles to promote the Ru sintering, and the instability of the support surface causes SMSI to be excessively developed to cover the surface of the Ru particles, thereby decreasing the number of active sites.

On the other hand, $La_{0.5}Ce_{0.5}O_{1.75}$ calcined at a temperature of 700° C. was used and reduced at 500° C. (Example 1). 650° C. (Example 2), and 800° C. (Example 3). After that, the activity was measured (FIG. 4), and a particularly dramatic improvement in activity was observed when the reduction temperature was increased from 500° C. to 650° C. Referring to FIG. 5, the Ru particle diameter does not change, and the H/Ru is decreased. Thus, the improvement of the activity resides in that the electron donating property of the support is improved by the development of the SMSI phenomenon, and the electron is transferred to the antibonding n orbit of N≡N to promote the adsorption and dissociation of $N_2$, which is a rate-determining step.

On the other hand, the ammonia production rate decreased when reduced at 800° C., but the results were such that the activity was higher than when the support calcinated at 600° C. was reduced at 800° C. At this time, H/Ru, reduction in specific surface area, and changes in Ru particle diameter were examined.

As a result, it was found that the increases in the specific surface area and in the Ru particle diameter accompanying the increase in the reduction temperature were moderate compared with the case where the calcination temperature of the support was 600° C. and the aggregation of Ru was also suppressed. This is considered to reduce damages caused by the reduction treatment by calcining the support at a high temperature in advance and stabilizing the structure.

Particularly in the present composite oxide, reduction treatment at a high temperature for expressing the SMSI is important for catalyst activation, and it is preferable to calcine the support at a temperature higher than the target reduction treatment temperature.

By using the metal-supported material supporting Ru and/or Co as a catalyst according to the present invention, nitrogen and hydrogen can be reacted to produce ammonia.

Although the ammonia synthesis method itself is not particularly limited, for example, ammonia can be produced by supplying a raw material gas composed of hydrogen gas and nitrogen gas into a reaction vessel charged with a catalyst. The reaction temperature is preferably from 300 to 550° C., more preferably from 300 to 500° C., and still more preferably from 300 to 450° C. The reaction pressure is preferably a low pressure of 0.1 to 20 MPa, more preferably 0.1 to 15 MPa, and still more preferably 0.1 to 10 MPa.

When using the metal-supported material supporting Ru as a catalyst according to the present invention, the ammonia production rate is, for example, 13.4 mmol $g^1$ $h^1$ at a reaction temperature of 350° C. under a reaction pressure of 0.1 MPa, or 31.3 mmol $g^1$ $h^1$ under a reaction pressure of 1 MPa. This is equal to or higher than the yield obtained with a conventional Ru catalyst. In general, the higher the pressure is due to thermodynamic equilibrium, ammonia synthesis tends to increase the higher, while Ru catalysts are susceptible to poisoning by hydrogen. Therefore, by using the ammonia synthesis catalyst according to the present invention, it is expected that a higher yield will be obtained at a reaction pressure of, for example, about 3 MPa. Thus, the reaction pressure is most preferably 0.1 to 3 MPa.

<Production Method of Composite Oxide/Metal-Supported Material>

Next, a method for producing the composite oxide and metal-supported material according to the present invention will be described. The composite oxide of the present invention can be produced by the following method including:

(a) a mixing step of mixing an A precursor containing an element A, an X precursor containing an element X, and an M precursor containing an element M to obtain a mixture; and (b) a calcination step of calcining the mixture.

The metal-supported material of the present invention can be further produced by the following method using the composite oxide obtained in the above (a) and (b):

(c) a supporting step of preparing a supported material before pre-reduction treatment, by supporting a compound containing a transition metal on the composite oxide; and (d) a reduction step of reducing the supported material before pre-reduction treatment.

Hereinafter, step (a) will be described. Step (a) corresponds to the method for producing a composite oxide of the present invention. The composite oxide is a step of obtaining a mixture (a precursor of a composite oxide) by mixing an A precursor containing A, an X precursor containing X, and optionally an M precursor containing M. The precursor of the composite oxide can be prepared by various methods such as a precipitation method and a complex polymerization method. For example, a neutralizing precipitation method in which a hydroxide is obtained by reacting a precipitant such as ammonia, sodium hydroxide, or cesium hydroxide with nitrates, chlorides, acetates, carbonates, or sulfates of A, X, or M can be used.

Preferably, first, a composite hydroxide that is a precursor of the composite oxide is prepared by mixing an aqueous ammonia with an aqueous nitrate solution. The mixing molar ratio of ammonia and nitrate is preferably about 5:1 to 2:1, and more preferably about 3:1. The concentrations of ammonia and nitrate in the aqueous ammonia solution and aqueous nitrate solution are preferably about 4 to 32 mol/liter and 0.1 to 1 mol/liter, respectively, and more preferably about 8 to 16 mol/liter and 0.25 to 0.5 mol/liter, respectively. Such mixing can be performed at room temperature.

The precursor of the composite oxide can be also obtained by individually preparing a compound containing one or more of A, X, and M elements and then mixing the individual compound. In this way, the compound containing A, the compound containing X, and the compound containing M are mixed to obtain a mixture.

Next, step (b) will be described. This step is a step of calcining the mixture obtained in step (a). Thereby, the produced mixture (composite oxide precursor) is converted into a composite oxide of a high specific surface area by the calcination.

The calcination is preferably performed at a low temperature of about 200 to 400° C. for about 1 to 10 hours; at an intermediate temperature of about 400 to 600° C. for about 1 to 10 hours; and at a high temperature of about 600 to 700° C. for about 1 to 10 hours. The calcination temperature in the final step is most preferably 700° C. This calcination can be performed under any oxygen concentration so long as the calcination is performed in an atmosphere containing oxygen, such as air or a mixed gas of oxygen with an inert gas.

Hereinafter, step (c) will be described using an example in which ruthenium is used as the metal. In the step (c), the composite oxide obtained in the step (b) is stirred with a solvent in which the ruthenium supply source is dissolved, so that the composite oxide is impregnated with the ruthenium supply source. After that, the solvent is removed by heating, and then the ruthenium supply source is decomposed, thereby to obtain a supported material before pre-reduction treatment in which ruthenium is supported in the form of fine particles on the composite oxide support.

As the ruthenium supply source, various compounds containing Ru can be used. Preferably, an organometallic compound such as triruthenium dodecacarbonyl or ruthenium acetylacetonate can be used. Other ruthenium supply sources capable of supporting ruthenium on the composite oxide, such as ruthenium chloride and ruthenium nitrosyl nitrate, can also be used.

When an organometallic compound such as triruthenium dodecacarbonyl is used as the ruthenium supply source, it is advantageous to use an organic solvent as the solvent. Examples of the organic solvent include tetrahydrofuran (THF), methanol, ethanol, hexane, toluene, and the like. These solvents can be used without any pre-treatment so long as they are general commercial products, but it is more preferable to use those that have been purified, dehydrated, and the like. The solid content concentrations of the composite oxide and ruthenium supply source with respect to 1 liter of the solvent are generally preferably about 1 to 30 g/liter and 0.1 to 3 g/liter, respectively, and more preferably 10 to 30 g/liter and 0.1 to 0.3 g/liter, respectively. Stirring can be performed at a normal temperature, and the stirring time is preferably 1 to 24 hours, and more preferably 6 to 12 hours. The removal of the solvent can be carried out under heating by various methods. It is preferable to carry out such removal of the solvent using, for example, an evaporator under reduced pressure in a low-temperature atmosphere. The ruthenium supply source is decomposed by heating in an inert atmosphere, such as in a helium, argon, or nitrogen atmosphere. The decomposition can be carried out even in an atmosphere containing hydrogen. The heating is performed at a temperature of about 200 to 600° C. for about 1 to 12 hours. A more preferred heating temperature is about 300 to 500° C. and a more preferable heating time is about 3 to 6 hours.

Hereinafter, the step (d) will be described. Next, a reduction treatment is performed on the resulting supported material before pre-reduction treatment. The reduction treatment is performed for the purpose of reduction of an IV-valent metal element included in the composite oxide as a support, reduction of a transition metal such as Ru, and reduction for decomposition of a carbonate described later. The reduction temperature is from 400° C. to 800° C., and preferably from 600 to 700° C. When the reduction temperature is a high temperature higher than 500° C. the reduction time is usually from 10 minutes to 40 hours, and preferably about 30 minutes to 5 hours. When the reduction temperature is low, the reduction time is from 48 hours to 120 hours, and preferably from 60 hours to 100 hours. The reduction treatment is performed in the presence of a reducing gas such as hydrogen gas.

When the composite oxide contains a strongly basic Ba, it is known that BaO reacts with carbon dioxide, etc. in the air to easily form barium carbonate (Ba(CO$_3$)) or barium hydroxide (Ba(OH)$_2$)). When carbonates or hydroxides are formed in this way, the partial negative charge of oxygen in BaO is remarkably reduced, and high basicity cannot be obtained. Therefore, in order to express high ammonia synthesis activity, it is necessary to decompose this carbonate and hydroxide by an appropriate treatment. For example, as a method for decomposing Ba carbonate to prepare BaO, heat treatment (reduction treatment) under hydrogen gas circulation is effective. This reaction is represented by the following formula (5):

$$BaCO_3 + 4H_2 \rightarrow BaO + CH_4 + 2H_2O \tag{5}$$

When the catalyst is heated in a hydrogen atmosphere, hydrogen is dissociated on the surface of the supported metal species, and a hydrogen species having a strong reducing power is generated. By the action of this hydrogen species. Ba carbonate is decomposed and changed to BaO.

Examples of the method for decomposing Ba carbonate include holding the catalyst under a hydrogen flow at a temperature of 550° C. or more for about 1 hour. Preferred conditions are about 600° C. to about 800° C.

In addition, Ba carbonate can be decomposed by holding the catalyst under a hydrogen flow for a long time at a low temperature. Preferred conditions are 500° C. for about 48 hours, 450° C. for about 72 hours, or 400° C. for 120 hours or more.

By using such a method. Ba carbonate can be decomposed. In order to develop the basic properties of Ba, it is desirable to reduce the proportion of Ba present as the carbonate as much as possible. The proportion of Ba present as the carbonate in the catalyst is preferably 10 mol % or less, more preferably 1 mol % or less, still more preferably 0.1 mol % or less, and particularly preferably 0.01 mol % or less, based on the total amount of Ba contained in the catalyst.

The calcination temperature in the calcination step is most preferably 700 to 800° C. If the calcination temperature in this step is too low, excessive sintering of the support and the active metal proceeds during the reduction treatment, and the particle size increases, thereby reducing the number of active sites and lowering the catalyst performance.

On the other hand, if the calcination temperature in this step is too high, the specific surface area of the support becomes small, so that the active metal is dispersed poorly, and the particle size becomes large, thereby reducing the number of active sites and lowering the catalyst performance.

Regarding the relationship between the calcination temperature and the reduction temperature, as described above, it is preferable to calcine the support at a temperature higher than the reduction treatment temperature from the viewpoint of ammonia synthesis activity.

The metal-supported material according to the present invention thus obtained has better handleability and stability during the reaction than the conventional metal supports used for ammonia synthesis catalysts.

For example, Y. Inoue, M. Kitano, K. Kishida, H. Abe, Y. Niwa, M. Sasase, Y. Fujita, H. Ishikawa. T. Yokoyama. M. Hara. H. Hosono, ACS Catal., (2016) 7577-7584 describes Ru/Ca(NH$_2$)$_2$ as a highly active catalyst, but it is known that the amide compound as a component easily reacts with moisture and oxygen in the atmosphere. It is assumed that the production process of such a catalyst is also complicated, and its handling as an industrial catalyst is very difficult.

In addition, in the case where Ba etc. are contained in a composite oxide, even if a catalyst is an oxidation state at the time of manufacture, the catalyst will absorb CO$_2$ to become a carbonate easily when exposed to an atmosphere. For this reason, after decomposition of Ba carbonate by the above reduction treatment, it is necessary to handle the catalyst without exposing to $CO_2$ until the catalyst is used. For example, it is preferable to store the catalyst sealed in a container filled with an inert gas. In addition, when the support becomes a carbonate, ammonia synthesis activity can be restored by decomposing through hydrogenation to reduce the carbonate.

In addition, the reported oxide-supported ruthenium catalyst, such as Ru/MgO, needs to add an alkali metal such as Cs in order to increase the ammonia synthesis activity, and this alkali metal becomes a hydroxide having a low melting point during the reaction. Thus, it is feared that the hydroxide will cause corrosion of the reaction tube (J. G. van Ommen, W. J. Bolink, J. Prasad and P. Mars. J. Catal., 1975, 38, 120-127).

Furthermore, it has been reported that the activity of Ba—Ru/activated carbon catalysts that are industrially used in some processes decreases as the activated carbon of the support gradually methanates during the reaction (B. Lin, Y. Guo, J. Lin, J. Ni, J. Lin, L. Jiang, Y. Wang, Appl. Catal., A, 541 (2017) 1-7).

The metal-supported material used as a catalyst after being loaded into a synthesis reactor is inevitable to replace periodically, and since it is assumed that such a catalyst will be used for a long period of time. Thus, a metal-supported material that is easy to handle and excellent in stability is required. The metal-supported material of the present invention is advantageous in this respect.

Invention of Cobalt/Support

The composite oxide of the present invention is a composite oxide including a metal element represented by the composition of the following general formula (6):

$$A_n X_y \quad (6),$$

which is in a mixed state of an oxide of A and an oxide of X (in the general formula (6), A represents an element selected from the group consisting of Sc, Y, and a trivalent lanthanoid, X represents an element selected from the group consisting of Ca, Sr and Ba, n is 0<n<1, y is 0<y<1, and n+y=1).

The composite oxide of the present invention is particularly a composite oxide including a metal element represented by the composition of general formula (7):

$$A_n X_y O_x \quad (7),$$

which is preferably in a mixed state of an oxide of A and an oxide of X (in the general formula (7), A represents an element selected from the group consisting of Sc, Y, and a trivalent lanthanoid, X represents an element selected from the group consisting of Ca, Sr, and Ba, n is 0<n<1, y is 0<y<1, n+y=L, and x represents the number of oxygen atoms necessary for the composite oxide to remain electrically neutral).

Element A is an element that can take only III valence (that is, an element that does not take other valence states such as II valence and IV valence), and specifically, is Sc, Y, and a trivalent lanthanoid. The trivalent lanthanoid is preferably selected from the group consisting of La, Nd, Pm, Sm, Eu, Gd, Dy, Ho, Er, Tm, and Lu, and more preferably selected from the group consisting of La, Pm, Gd, Ho, Er, and Lu, among which La is particularly preferable from the viewpoint of electronegativity.

In the present invention, since at least one or both of elements A and X contained in the catalyst are a strongly basic element exhibiting high basicity in the oxide state, the activity of the ammonia synthesis catalyst can be improved. The outline of the mechanism will be described below.

Element A represents an element selected from the group consisting of Sc, Y, and a trivalent lanthanoid, and is preferably a strongly basic metal element. Electrons are generated from the base site of the composite oxide (support) of such elements, and this is reversely donated to nitrogen molecules via a metal cobalt which is a catalyst supported on the composite oxide, thereby weakening the nitrogen triple bond. The inventors consider that this step is a rate-determining step of the ammonia synthesis reaction and a series of movements of electrons described above reduces the energy of breaking the triple bond of the nitrogen molecule, resulting in improvement of the ammonia synthesis activity of the metal-supported material (catalyst).

Element X is an element belonging to group 2 of the periodic table selected from Ca, Sr and Ba, and tends to be highly basic. In the present invention, since both the element A and the element X are strongly basic metal elements, the ammonia synthesis activity is higher compared to the case where each basicity of the element A and the element X is low or to the case where only one of the element A and the element X is high.

Note that the element X is Ca, Sr, or Ba, and any element of these easily reacts with carbon dioxide or water vapor in the atmosphere to become a metal carbonate or hydroxide. This metal carbonate and hydroxide reduce the basicity of the composite oxide and cause a decrease in the ammonia synthesis activity of the catalyst. For example. Ba becomes $BaCO_3$ or $Ba(OH)_2$ in the atmosphere, which reduces the ammonia synthesis activity. For this reason, the amount of the metal carbonate and the hydroxide contained in the ammonia synthesis catalyst should be as small as possible. In order to reduce or remove the carbonate (carbonate ion), it is preferable to perform a reduction treatment at a high temperature as will be described later, thereby to be able to decompose the carbonate and hydroxide contained in the catalyst. As a result, the basicity can be prevented from being lowered. The amount of carbonate contained in the metal-supported material is not particularly limited so long as it does not inhibit the ammonia synthesis activity. For example, it is 10 mol % or less, preferably 1 mol % or less, and more preferably 0.01 mol % or less, with respect to the element X.

From the above viewpoint, La is preferable as the element A. and similarly, Ba is preferable as the element X from the viewpoint of catalytic activity. Preferably, a combination of the element A and the element X is La and Ba. The selection and combination of these elements are related to the above mechanism and are preferable from the viewpoint of catalytic activity.

At least one of the elements A and X is preferably a strongly basic element having a partial negative charge $(-\delta_o)$ value of oxygen in the oxide state of 0.50 or more. Elements A and X are strong basic elements in which any one of them has a partial negative charge $(-\delta_o)$ value of oxygen of 0.50 or more, but it is preferred that two or more, particularly all three of such elements A and X are strong basic elements each having a partial negative charge $(-\delta_o)$ value of oxygen of 0.50 or more.

The ranges of n, y, and x when the composite oxide of the present invention is represented by the general formulas (6) and (7) are as follows.

n in the general formulas (6) and (7) representing the ratio of the element A in the composite oxide is 0<n<1, preferably 0.5≤n≤0.999, more preferably 0.8≤n≤0.995, and particularly preferably 0.9≤n≤0.99.

y in the general formulas (6) and (7) representing the ratio of the element X in the composite oxide is 0<y<1, preferably 0.001≤y≤0.5, more preferably 0.005≤y≤0.2, and particularly preferably 0.01≤y≤0.1.

Further, in the general formulas (6) and (7), n, y, and x are selected so as to satisfy n+y=1.

x in the general formula (7) representing the ratio of oxygen O in the composite oxide is the number of oxygen atoms necessary for the composite oxide to remain electrically neutral. Although x depends on the types of elements A and X, the x is generally in the range of 0.5<x≤2, and particularly in the range of 1<x≤2.

The composite oxide including a metal element represented by the composition of the general formula (6) and the composite oxide of the general formula (7) used in the present invention are preferably in a mixed state of an oxide of A and an oxide of X. Particularly, a laminated structure in which oxide particles of element X are deposited on the surface of oxide particles of element A is preferable. It is preferable that both have a so-called sea-island structure rather than a core/shell relationship. That is, a structure in which the element X is heterogeneously dispersed in an island shape with respect to the element A that is the sea is preferable. Further, the element X may not be present inside the catalyst support, and the element X is preferably present on the surface of the support.

When the oxide of A and the oxide of X are in a mixed state without being solid-solved, cobalt particles are in direct contact with the oxide of A and the oxide of X on the surface of the composite oxide. Since the oxide of A (for example, La) and the oxide of X are strongly basic, it is presumed that when the cobalt particles are in direct contact with these oxides, the active sites increase to enhance the ammonia synthesis activity. In the case of Ru, it is important that the support has a high specific surface area and there are oxygen lattice defects, and that the support contains Ce. On the other hand, in the case of Co, the basicity of the cation is important, and the richer the A oxide such as La, the higher the ammonia synthesis activity (if a metal oxide with a relatively low basicity, such as Ce, is included, the basicity tends to decrease).

The general formula (6) may include a composite oxide including a metal element represented by the composition of the following general formula (6A):

$$A_n X_y M_m \quad (6A)$$

(in the general formula (6A),

A and X are as defined in the general formula (6),

M is any of a group 1 element, a group 2 element selected from the group consisting Ca, Sr, and Ba, or a lanthanoid, in the periodic table, and represents an element different from the A and X, n is 0<n<1, y is 0<y<1, m is 0≤m<1, and n+y+m=1).

In this case, the composite oxide may contain a tetragonal or cubic solid solution. In addition, it is preferable that at least one of the elements A, X, and M included in the composite oxide is a strongly basic element having a partial negative charge ($-\delta_o$) value of oxygen in the oxide state of 0.50 or more.

Furthermore, when the composition ratio of each element contained in the composite oxide is expressed as ni (i shows all elements in the composite oxide containing A, X, M, and O), and the Sanderson electronegativity of each element is expressed as xi (i shows all elements in the composite oxide containing A, X, M, and O), the partial negative charge value ($-\delta_o$) of oxygen represented by the following formula (A) is preferably 0.52 or more.

$$((\Pi(\chi_i^{in}))^{\wedge}(1/\Sigma ni)-5.21)/-4.75 \quad \text{Formula (A)}$$

Further, X in the general formula (6A) is Ba, and the amount of carbonate ions contained in the composite oxide is preferably 10 mol % or less with respect to Ba.

The metal-supported material of the present invention is obtained by supporting cobalt on the composite oxide of the present invention. The amount ratio of cobalt to the composite oxide can be determined in consideration of the catalyst activity and the cost of cobalt. For example, the ratio of cobalt to the entire metal-supported material is preferably in a range of 0.1 to 50% by weight, and more preferably in a range of 5.0 to 30% by weight.

The Co dispersity represents the ratio between the number of Co atoms exposed on the surface of the metal-supported material and the number of all Co atoms contained in the metal-supported material. The dispersity of Co can be determined from the amount of hydrogen adsorbed on the metal-supported material.

Specifically, assuming that one Co atom adsorbs one H atom, the ratio (H/Co) of the number H of hydrogen atoms corresponding to the number Co of cobalt atoms exposed on the surface of the metal-supported material to the total number Co of cobalt that is supported on the metal-supported material is a Co dispersity. In the present invention, this Co dispersity based on the hydrogen adsorption amount is expressed as $D_{ads}$. By comparing the metal-supported material on which the same amount (the same number of atoms) of Co is supported, it can be considered that the higher the Co dispersity, the greater the number of catalyst active sites.

Further, assuming that the form of Co particles is a cube, it is known that the value of Co dispersity can be obtained geometrically using the average particle diameter (d, unit in nm) of Co obtained by TEM observation (refer to the literature "Catalyst Dictionary"). The calculation method can be expressed by general formula (8). The average particle diameter of Co can be calculated by randomly extracting 100 to 150 Co particles from a TEM image, measuring the respective particle diameters, and averaging them. In the present invention, the value of Co dispersity obtained based on the general formula (4) is expressed as $D_{TEM}$.

$$D_{TEM}=0.732/d \quad (8)$$

Therefore, when $D_{ads}/D_{TEM}$ is less than 1, this means that a part of Co particles, mainly the vicinity of the interface between the particles and the composite oxide (support) was coated with the support material, so that the adsorption of H atoms to the Co particle surface was blocked. Such a phenomenon is known as a strong metal support interaction (SMSI) phenomenon and appears when a strong interaction exists between a supported metal and a support. The driving force of SMSI has been reported to be the production of reduced supports, such as $Co/CeO_{2-x}$.

TOF (catalyst turnover frequency) represents the number of reactions that progressed per unit time at one active site on the catalyst surface. In the present application. TOF is described as the number of ammonia molecules generated for one second per one atom of the surface Co that is an active site.

The average particle diameter of Co supported on the composite oxide is preferably 100 nm or less, more preferably 50 nm or less, and still more preferably 30 nm or less. The smaller the Co particle diameter, the more advantageous the number of active sites becomes increased when used as an ammonia synthesis catalyst. The lower limit of the average particle diameter of Co is not particularly limited, but is, for example, 0.5 nm or more and 1 nm or more.

The metal-supported material of the present invention is fine particles of the supported metal cobalt having an average particle diameter of 100 nm or less. As a result, under mild ammonia synthesis conditions (300 to 500° C., 0.1 to 20 MPa), a very high ammonia synthesis rate (for example, 19.3 mmol g$^{-1}$ h$^{-1}$ at 350° C. under 1.0 MPa).

The metal-supported material of the present invention can be obtained by reducing a thermally stable composite oxide supporting a Co catalyst, at a high temperature. The technology for reducing the Ru-supported Ce oxide has been known for some time, but until now it has been understood that the ammonia synthesis rate of the catalyst decreases when the reduction temperature exceeds 500° C. (Non Patent Literature 1). Further, this literature does not describe that Co instead of Ru is supported.

On the other hand, the inventors have found that the ammonia synthesis rate of a Co-supported material on a composite oxide, including a metal-supported material in a state in which $La_{0.95}Ba_{0.05}O_x$ supporting Co is reduced, was improved by reduction treatment at a high temperature exceeding 500° C. and reached a peak at a reduction treatment temperature of about 700° C.

In the present specification, for the sake of brevity of expression, a metal-supported material represented by "$La_n$-$Ba_yO_x$ supporting Co" is represented as "Co/$La_nBa_yO_x$", and the metal oxide that has been reduced is described as "Co/$La_nBa_yO_x$ __ oo° C. reduction" with its reduction temperature. Similar expressions will be used for other supported materials.

For example, the composite oxide $La_nBa_yO_x$ of the present invention is a composite oxide of $La_2O_3$ and BaO, which has been reduced at an unprecedented 700° C. high temperature, and the composite oxide is in a mixed state of $La_2O_3$ and BaO. The Co catalyst supported on the composite oxide exhibits a high ammonia synthesis activity. Such a structure and state of the catalyst due to the action of the reduction temperature was elucidated by a combination of various characterization methods including scanning transmission electron microscope (STEM) image processing and chemical adsorption amount measurement.

Figure 15:
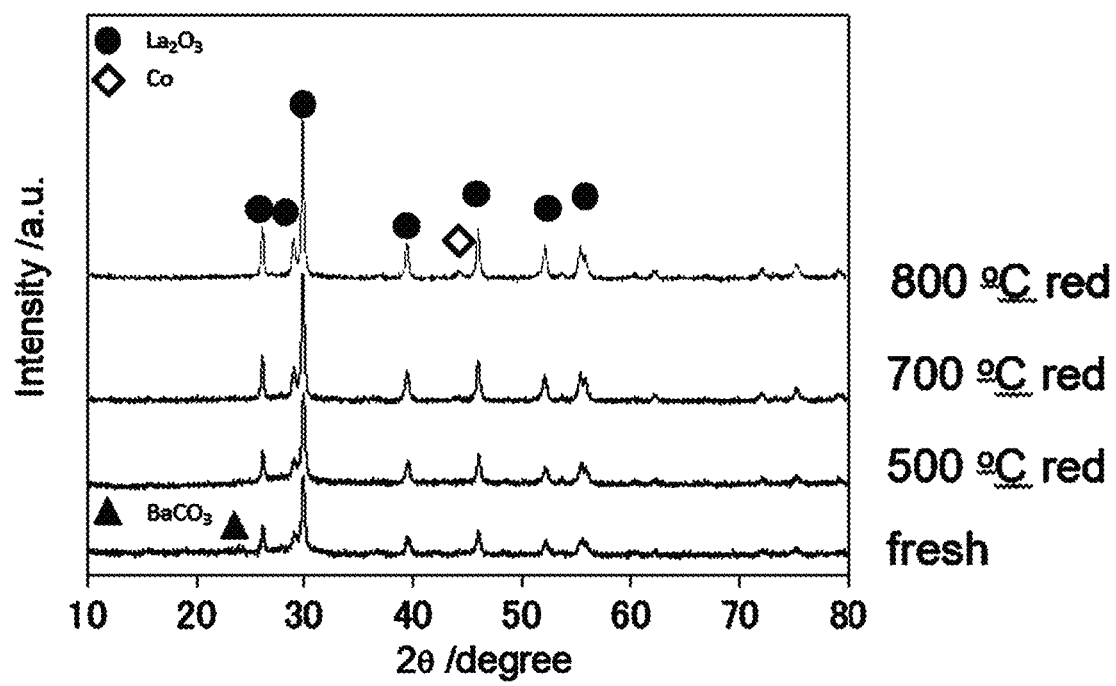
FIG. 15 is an XRD pattern of Co-supported oxides produced at different reduction temperatures.

FIG. 15 shows an XRD pattern for Co/$La_{0.95}Ba_{0.05}O_x$ in Examples described later. As can be seen from this FIG., before the reduction, peaks due to $La_2O_3$, Co, and $BaCO_3$ were observed. It is found that when the reduction temperature is increased, the $BaCO_3$ peak disappears, indicating that $BaCO_3$ is decomposed. It can also be seen that the Co peak increases as the reduction temperature is increased.

Figure 16:
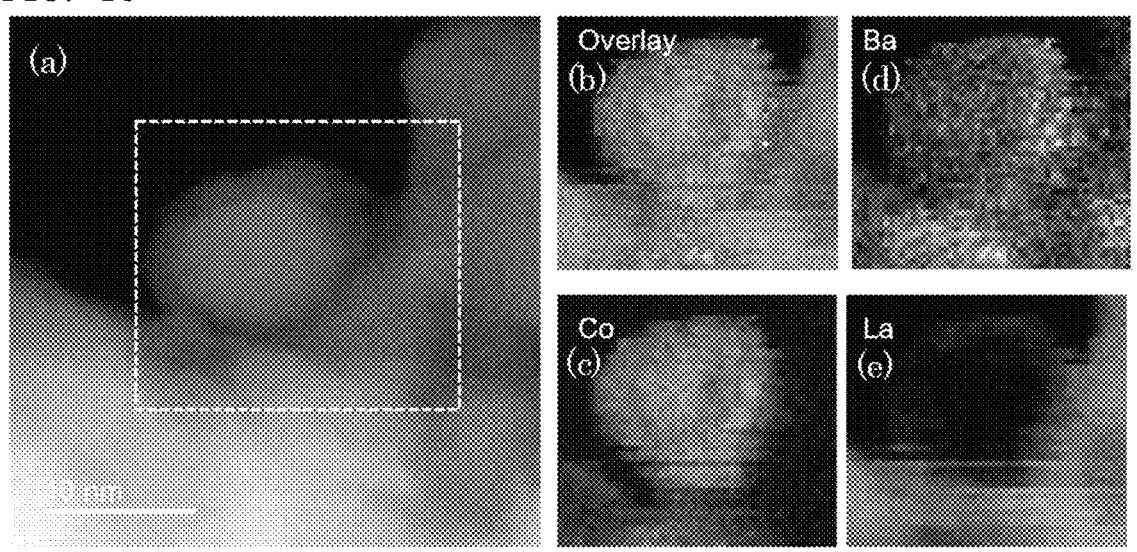
FIG. 16 is an HR-TEM image and an EDX mapping image of Co-supported oxide exposed to air after reduction of Co/Ba$_{0.05}$La$_{0.95}$O$_x$.

FIG. 16 shows a STEM-EELS image of Co/$La_{0.95}Ba_{0.05}O_x$ in Examples described later. As can be seen from this image, in the composite oxide (support), La and Ba are not in a state of solid solution but in a mixed state. More specifically, the composite oxide has a structure in which an oxide of La and an oxide of Ba are laminated, and both are not in solid solution. Further, the cobalt particles supported on the support have a structure in which Ba is laminated on the surface. Furthermore, it is also found that in the cobalt particles, a small amount of La is laminated. For this reason, when cobalt particles are in direct contact with the oxides of these elements, the number of specific active sites that have received electron donation increases, thereby to increase the ammonia synthesis activity. The oxide of La and the oxide of Ba are laminated as fine particles having a smaller particle diameter than the cobalt particles.

<Effect of Reduction Temperature on Ammonia Synthesis Activity>

The catalyst of the present invention is activated by hydrogen pre-reduction treatment at a high temperature. This is because Co is reduced and the electron donating ability is increased. At this time, an SMSI in which a part of the support coats Co is developed. In general, when the pre-reduction is performed at a high temperature, the specific surface area is reduced with the sintering of the support, and the metal particle diameter is enlarged, causing a decrease in catalytic activity.

Figure 8:
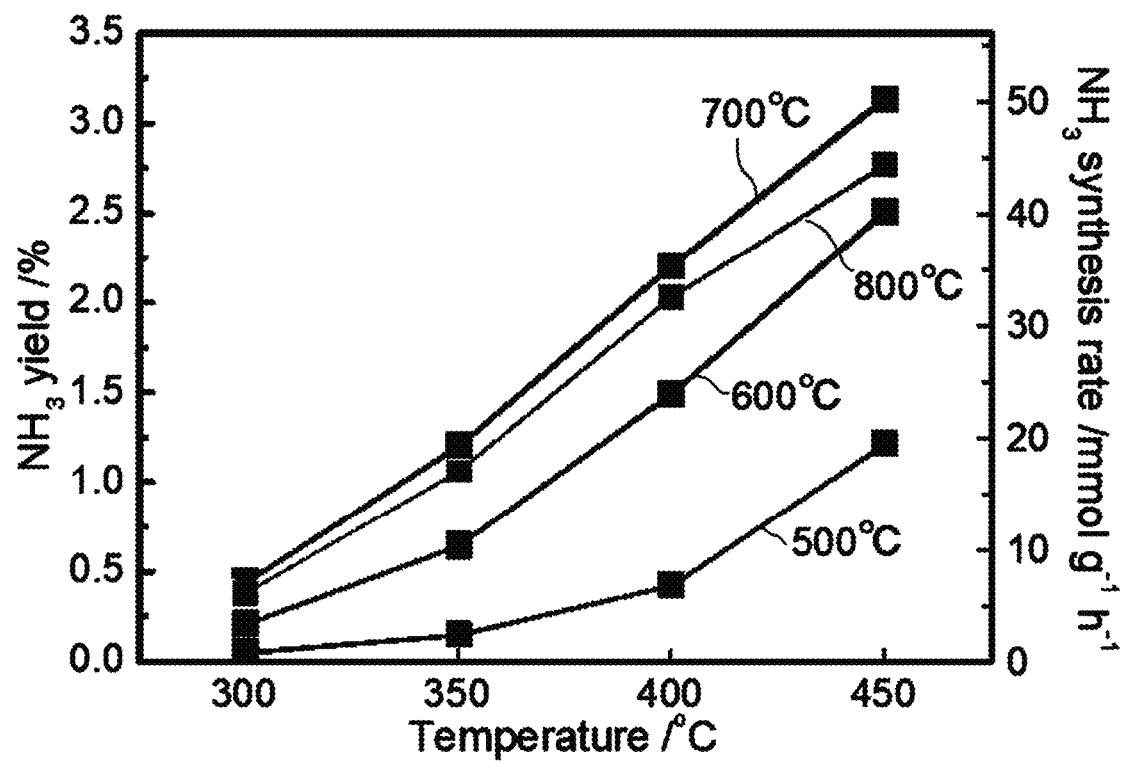
FIG. 8 is a graph showing the reaction temperature and ammonia synthesis activity (reaction pressure 1.0 MPa) of $Co/Ba_{0.05}La_{0.95}O_x$.
Figure 14:
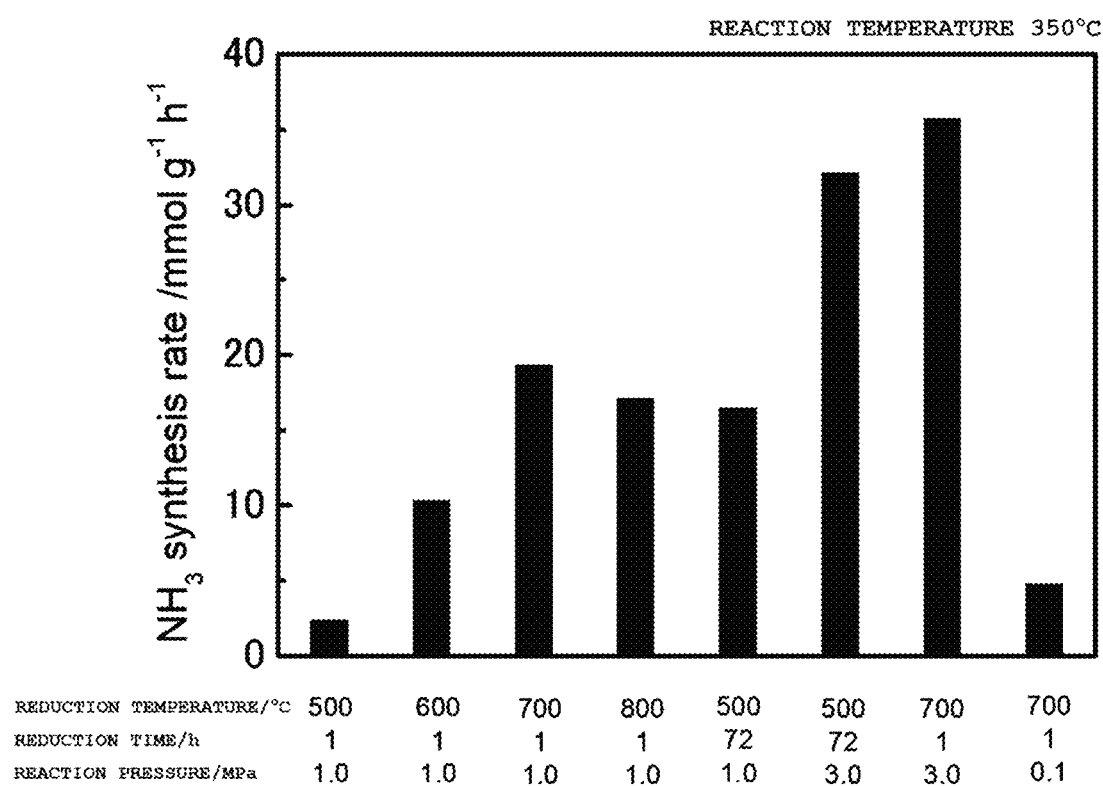
FIG. 14 is a graph showing an ammonia synthesis activity of a Co/Ba$_{0.05}$La$_{0.95}$O$_x$ catalyst produced by changing the reduction temperature and the reduction time.

FIG. 8 is a graph showing ammonia synthesis activity under a reaction pressure of 1.0 MPa at a reaction temperature of 300 to 450° C. in a catalyst manufactured by changing the reduction temperature in Examples ($La_{0.95}Ba_{0.05}O_x$) described later. From this graph, it is understood that the ammonia synthesis activity increases as the reduction temperature increases, and the ammonia synthesis rate is greatest when reduced at 700° C., and when reduced at 800° C., the ammonia production rate is slightly reduced compared to the case of 700° C. Moreover, as shown in FIG. 14, it was found that the catalyst reduced at 500° C. for 72 hours shows higher activity than the catalyst reduced at 500° C. for 1 hour and shows performance comparable to the catalyst reduced at 700° C. for 1 hour. From this, the catalyst having a high activity according to the present invention can be obtained by the reduction for a long time if reduced at a low temperature or by the reduction for a short time if reduced at a high temperature.

Figure 12:
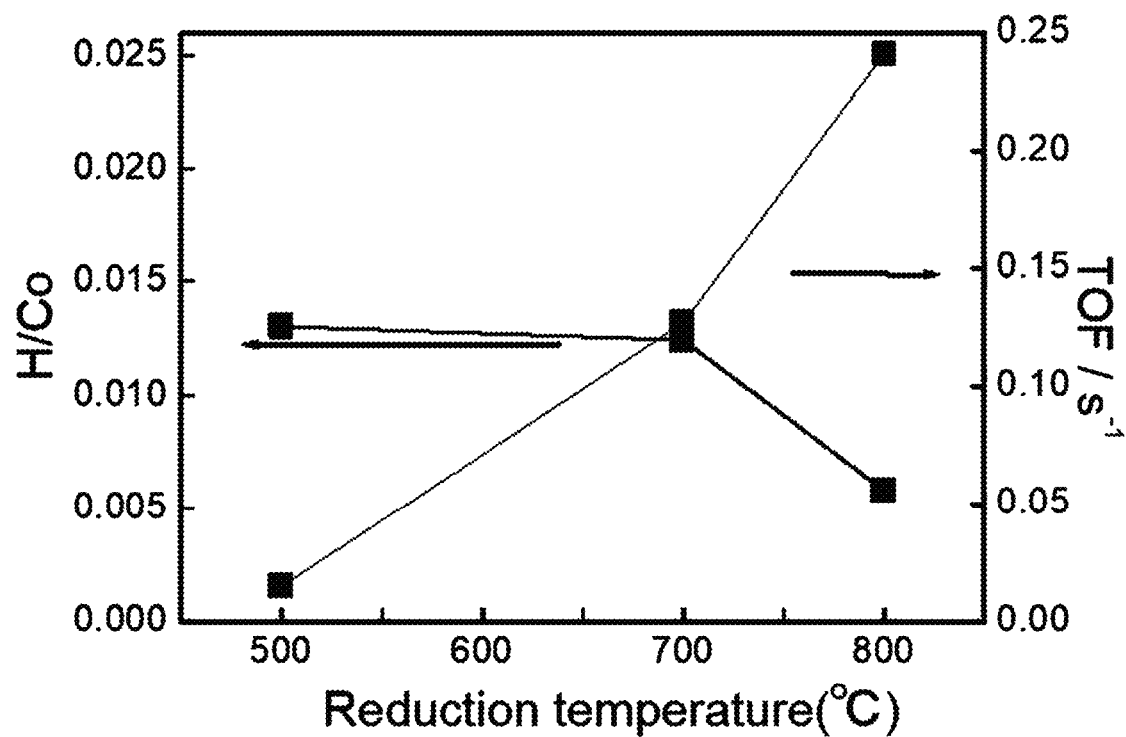
FIG. 12 is a graph showing the reduction temperature of $Co/Ba_{0.05}La_{0.95}O_x$, H/Co, and TOF (catalyst turnover frequency) in ammonia synthesis (reaction pressure 1.0 MPa).

FIG. 12 is a graph showing changes of H/Co and TOF in Examples at this time. When the reduction temperature was increased, TOF increased, but H/Co was almost flat and decreased at 800° C. of the reduction temperature. This is thought to be because a catalyst having a low support calcination temperature and insufficient structural stability was reduced at a temperature higher than the support calcination temperature.

That is, as the reduction temperature increases, the ammonia production rate decreases because it is considered that the specific surface area decreases due to the sintering enlargement of the support particles to progress the Co sintering, and the instability of the support surface causes an excessive development of SMSI, so that the surface of the Co particles was covered and the number of active sites was reduced.

By using the metal-supported material supporting Co as a catalyst according to the present invention, ammonia can be produced by reacting nitrogen and hydrogen. Although the ammonia synthesis method itself is not particularly limited, for example, ammonia can be produced by supplying a raw material gas composed of hydrogen gas and nitrogen gas into a reaction vessel charged with a catalyst. The reaction temperature is preferably from 300 to 550° C., more preferably from 300 to 500° C., still more preferably from 300 to 450° C.

Figure 13:
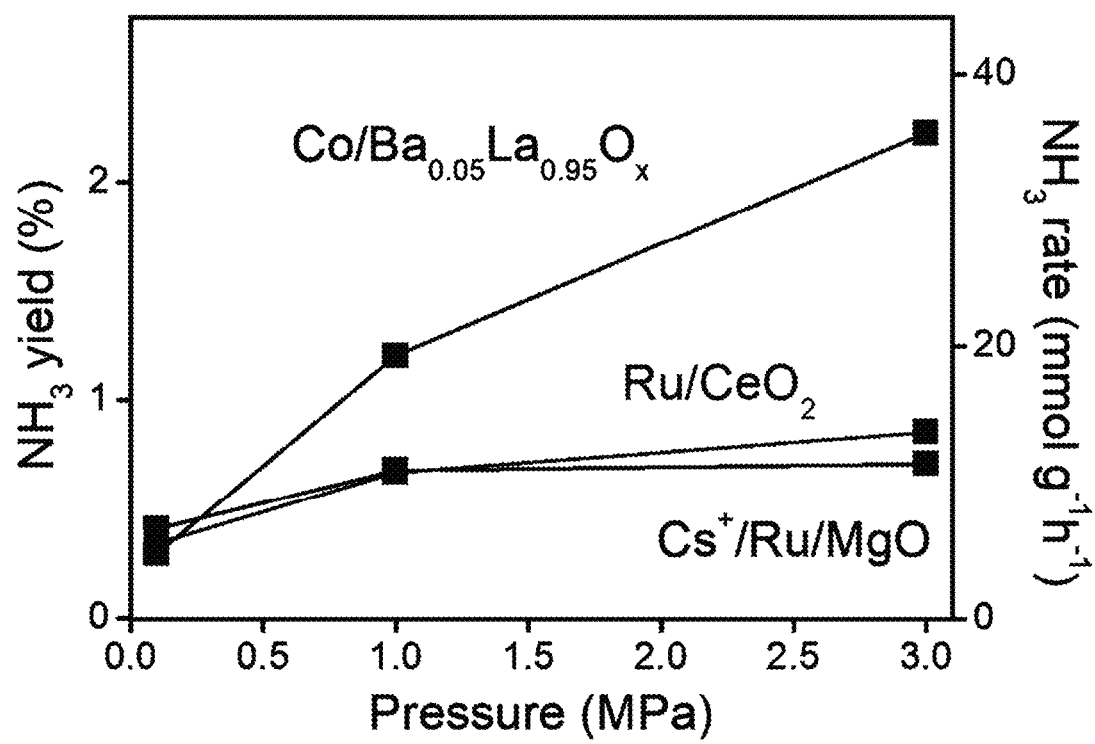
FIG. 13 is a graph showing ammonia synthesis pressure and ammonia synthesis activity at a reaction temperature of 350° C.
Figure 17:
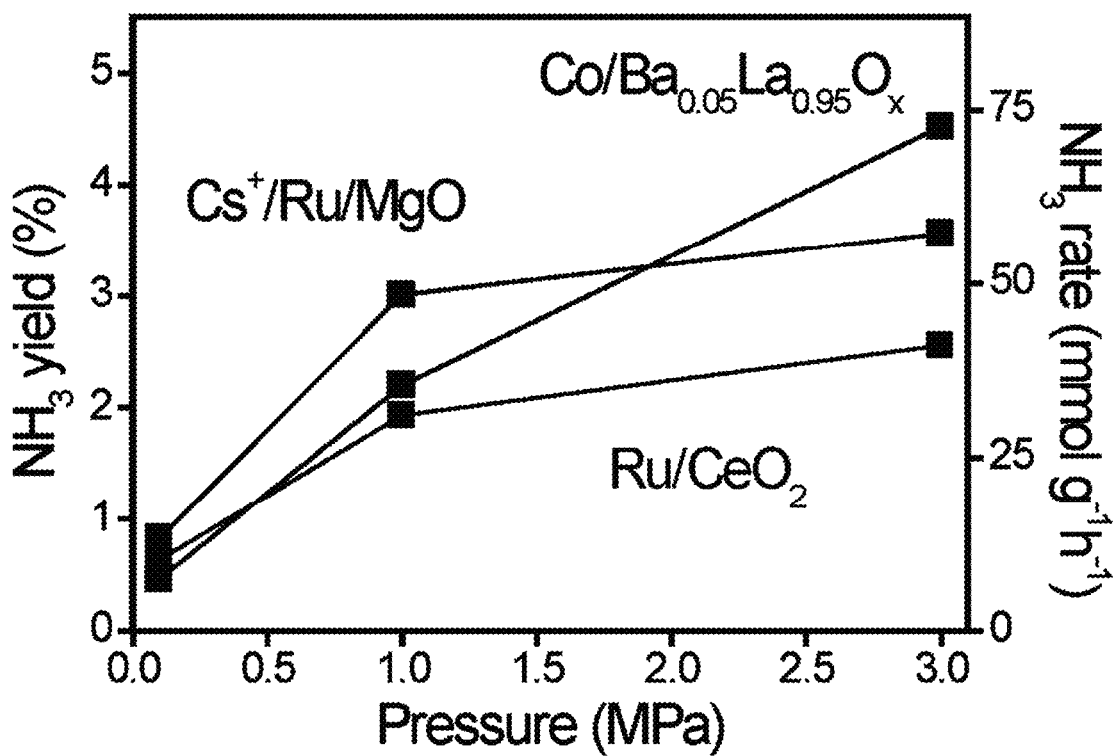
FIG. 17 is a graph showing an ammonia synthesis pressure and an ammonia synthesis activity at a reaction temperature of 400° C.

When carrying out ammonia synthesis using the catalyst of the present invention, the reaction pressure is a low pressure of preferably 0.1 to 20 MPa, more preferably 0.1 to 15 MPa, and still more preferably 0.1 to 10 MPa. Particularly, as shown in FIGS. 13 and 17, it is understood that the activity of the catalyst of the present invention is improved even under high-pressure reaction conditions as compared with the conventional catalyst supporting Ru. This is because Co is less susceptible to hydrogen poisoning than Ru, and therefore its activity is less likely to decrease even under high pressure. That is, in Ru, the interaction between the hydrogen atom adsorbed on the surface and Ru under high pressure becomes stronger, and the desorption of the hydrogen atom becomes extremely difficult. As a result, the active site on the Ru surface is blocked, so that the ammonia synthesis reaction hardly occurs. Since Co has less interaction with hydrogen than Ru, such a phenomenon is unlikely to occur, and ammonia synthesis activity does not easily decrease even at high pressure. The ammonia synthesis reaction generally tends to increase the ammonia yield as the pressure is increased due to thermodynamic equilibrium. Therefore, by using the ammonia synthesis catalyst according to the present invention, it is expected that a higher yield can be obtained under a high-pressure condition of, for example, about 10 MPa. In addition, Co is widely present and has a crustal abundance of 10,000 times or more as compared with Ru, so that Co can become more versatile and less expensive than Ru.

In the case where the metal-supported material supporting Co according to the present invention is used as a catalyst, it is preferable from the viewpoint of catalytic activity that the composite oxide serving as a support contains Ba. With this combination, even if Co, which is cheaper than Ru, is used, the Co catalyst exhibits a sufficient-ammonia synthesis activity. Even when the reaction pressure is high, the Co catalyst is less susceptible to hydrogen poisoning than Ru. Accordingly, the reaction pressure is most preferably 1 to 10 MPa.

Figure 18:
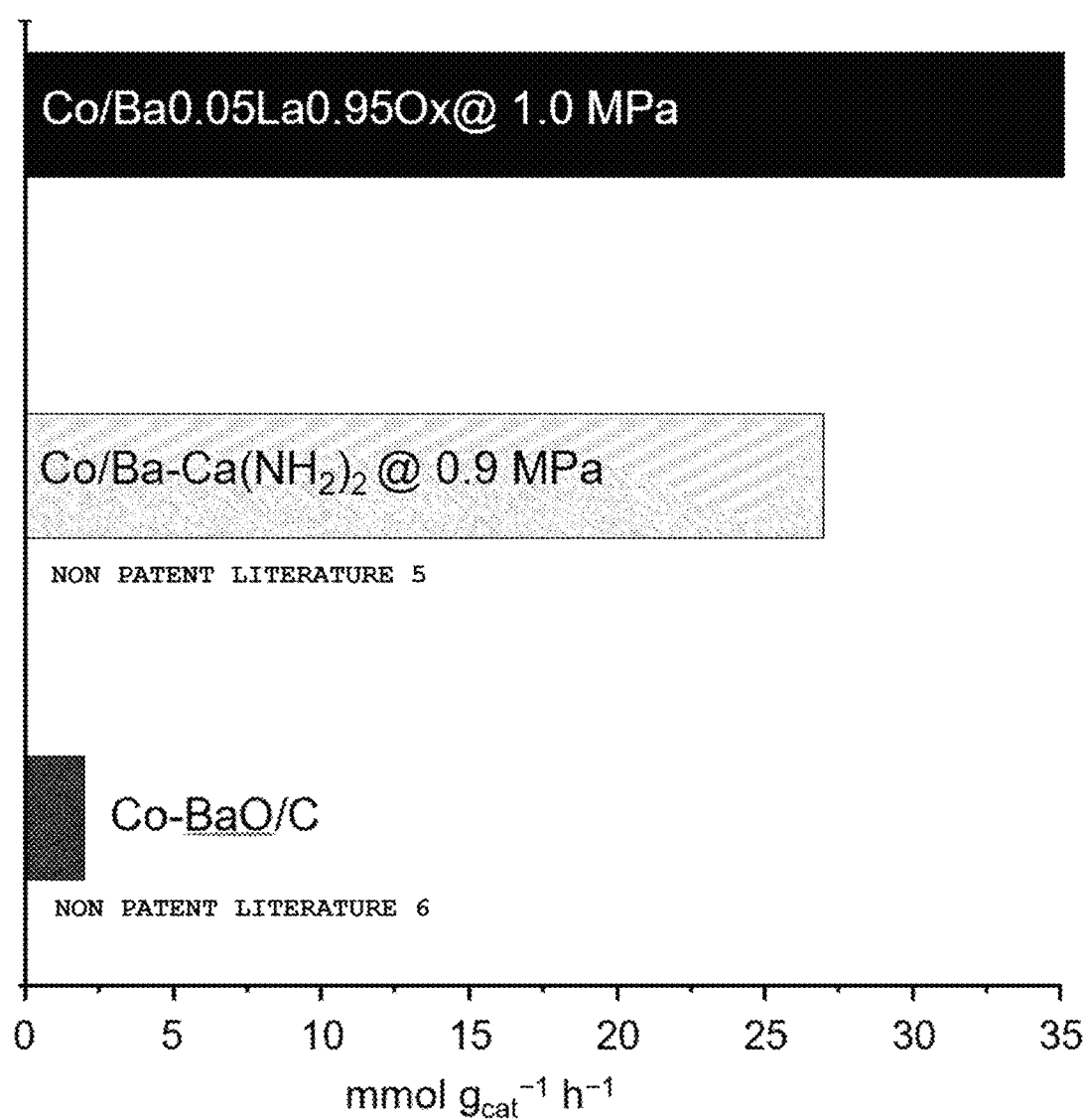
FIG. 18 is a graph comparing ammonia synthesis activities of Co/Ba$_{0.05}$La$_{0.95}$O$_x$ and cobalt-based catalysts of Non Patent Literature 5 and Non Patent Literature 6.

FIG. 18 shows a graph which compared ammonia synthesis activities among $Co/B_{0.05}La_{0.95}O_x$, $Co/Ba—Ca(NH_2)_2$)(Non Patent Literature 5), and (Co—BaO/C)(Non Patent Literature 6) catalysts. As can be seen from this graph, it is found that $Co/Ba_{0.05}La_{0.95}O_x$ of the present application has a high ammonia synthesis activity.

Figure 19:
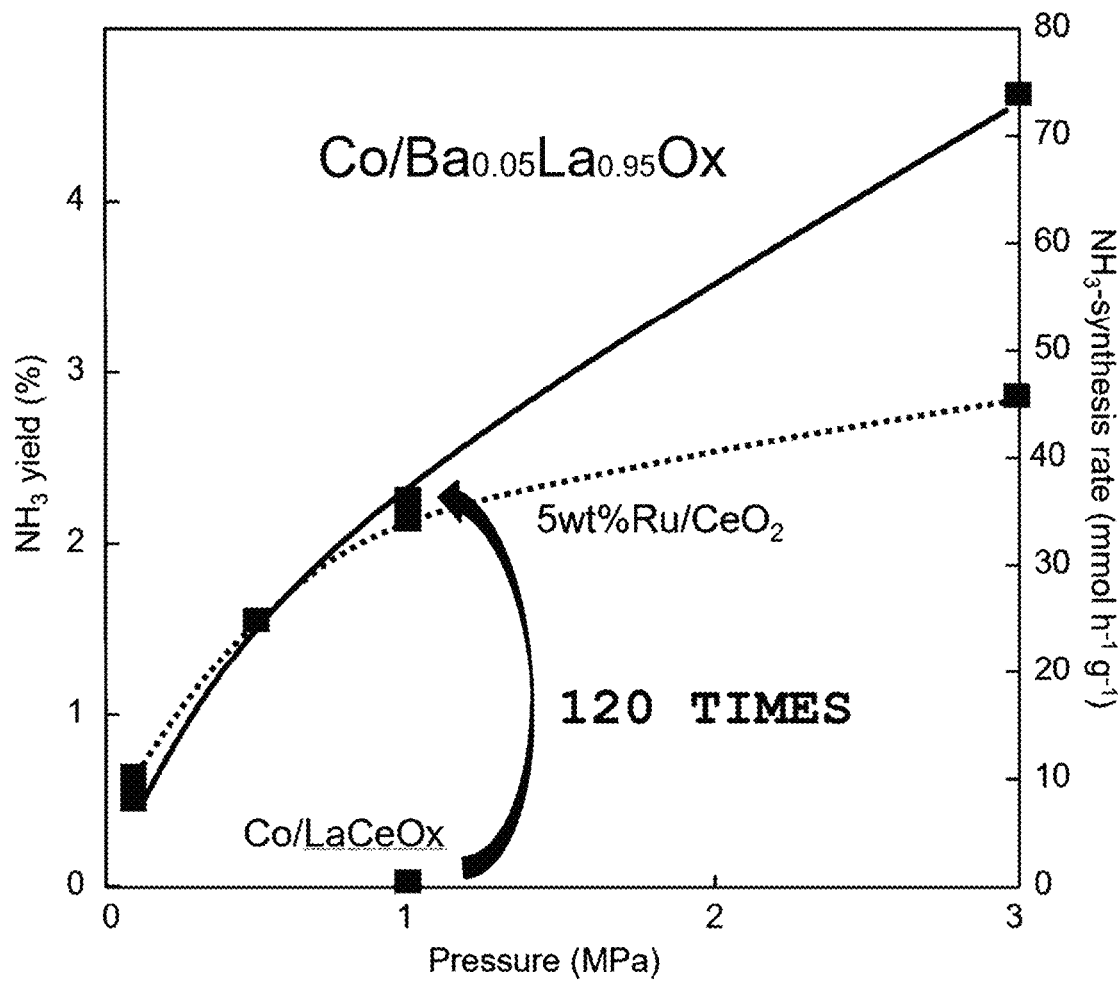
FIG. 19 is a graph showing the dependence of reaction pressure and yield on Co/Ba$_{0.05}$La$_{0.95}$O$_x$ and an example of a Ru-based catalyst.

FIG. 19 is a graph comparing the ammonia synthesis activities between $Co/Ba_{0.05}La_{0.95}O_x$ and other catalysts. As can be seen from this graph, it is found that the $Co/Ba_{0.05}La_{0.95}O_x$ of the present application has a higher ammonia synthesis activity especially on the high-pressure side than an Ru-based catalyst. Moreover, it can be seen that the catalytic activity of $Co/Ba_{0.05}La_{0.95}O_x$ is greatly improved when the catalyst contains Ba which is an element having higher basicity than Ce, compared to a catalyst such as $Co/LaCeO_x$ even if it is the same cobalt-based catalyst.

<Production Method of Metal Oxide/Metal-Supported Material>

Next, a method for producing the composite oxide and metal-supported material of the present invention will be described. The composite oxide of the present invention can be produced by the following method including:
 (a) a mixing step of mixing an A precursor containing an element A and an X precursor containing an element X to obtain a mixture; and
 (b) a calcination step of calcining the mixture.

The metal-supported material of the present invention can be further produced by the following method with respect to the composite oxide obtained in the above steps of (a) and (b), the method including:
 (c) a supporting step of preparing a supported material before pre-reduction treatment, by supporting a compound containing a transition metal on the composite oxide; and
 (d) a reduction step of reducing the supported material before pre-reduction treatment.

Hereinafter, the step (a) will be described. The step (a) corresponds to the method for producing a composite oxide of the present invention. The composite oxide is obtained by a step of mixing an A precursor containing A and an X precursor containing X to obtain a mixture (a precursor of the composite oxide).

The precursor of the composite oxide can be prepared by various methods such as a precipitation method and a complex polymerization method. For example, it is possible to use a neutralization precipitation method in which a precipitation agent such as ammonia, sodium hydroxide, or cesium hydroxide is reacted with a nitrate, chloride, acetate, carbonate, or sulfate of A or X to obtain hydroxides.

Preferably, first, a composite hydroxide that is a precursor of the composite oxide is prepared by mixing ammonia water and an aqueous nitrate solution. The mixing molar ratio of ammonia and nitrate is preferably about 5:1 to 2:1, and more preferably about 3:1. The concentrations of ammonia and nitrate in the ammonia water and aqueous nitrate solution are preferably about 4 to 32 mol/liter and about 0.1 to 1 mol/liter, respectively, and more preferably about 8 to 16 mol/liter and about 0.25 to 0.5 mol/liter, respectively.

Such mixing can be performed at a normal temperature. The precursor of the composite oxide can also be obtained by individually preparing a compound including one or more elements of A and X and mixing them. In this way, the compound containing A and the compound containing X are mixed to obtain a mixture.

Next, the step (b) will be described. This step is a step of calcining the mixture obtained in the step (a). Thereby, the produced mixture (composite oxide precursor) is changed into a composite oxide having a high specific surface area by calcination.

The calcination is performed at a low temperature of about 200 to 400° C. for about 1 to 10 hours, at an intermediate temperature of about 400 to 60(0° C. for about 1 to 10 hours, or at a high temperature of about 600 to 700° C. for about 1 to 10 hours. The calcination temperature in the final step is most preferably 700° C. This calcination can be performed at any oxygen concentration so long as in an atmosphere containing oxygen, such as air or a mixed gas of oxygen with an inert gas.

Hereinafter, the step (c) will be described. In the step (c), the composite oxide obtained in the step (b) is stirred together with the solvent in which a cobalt supply source is dissolved, to impregnate the cobalt supply source into the composite oxide, and then the solvent is removed by heating. After that, subsequent decomposition of the cobalt supply source is carried out, so that a supported material before pre-reduction treatment in which cobalt is supported in fine particles on the composite oxide support is obtained.

As the cobalt supply source, various compounds containing Co can be used. Preferably, an organometallic compound such as acetylacetonatocobalt(II) can be used. Other cobalt supply sources capable of supporting cobalt on the composite oxide, such as cobalt chloride and cobalt nitrosyl nitrate, can also be used.

When an organometallic compound such as acetylacetonatocobalt(II) is used as a cobalt supply source, it is advantageous to use an organic solvent as the solvent. Examples of the organic solvent include tetrahydrofuran (THF), methanol, ethanol, hexane, toluene, and the like. These solvents can be used without any pre-treatment so long as they are general commercial products, and it is more preferable to use those that have been purified, dehydrated, and the like. The solid content concentrations of the composite oxide and the cobalt supply source with respect to 1 liter of the solvent are generally preferably about 1 to 30 g/liter and about 0.1 to 3 g/liter, respectively, and more preferably about 10 to 30 g/liter and about 0.1 to 0.3 g/liter, respectively. Stirring can be performed at room temperature, and the stirring time is preferably 1 to 24 hours, and more preferably 6 to 12 hours. The removal of the solvent can be carried out by various methods under heating. For example, such solvent removal is preferably carried out under reduced pressure or in a low-temperature atmosphere using an evaporator or the like. The decomposition of the cobalt supply source is performed by heating in an inert atmosphere such as a helium, argon, or nitrogen atmosphere. Such decomposition of the cobalt supply source can be carried out even in an atmosphere containing hydrogen. The heating is performed at a temperature of about 200 to 600° C. for about 1 to 12 hours. A more preferred heating temperature is about 300 to 500° C., and a more preferred heating time is about 3 to 6 hours.

Hereinafter, the step (d) will be described. Next, a reduction treatment is performed on the resulting supported material before pre-reduction treatment. The reduction treatment is performed for the purpose of, for example, reduction of cobalt and reduction for decomposition of a carbonate described later. The reduction temperature is 400° C. to 800° C., and preferably 600 to 700° C. When the reduction temperature is a high temperature higher than 500° C. the reduction time is usually 10 minutes to 40 hours, and preferably about 30 minutes to 5 hours. When the reduction temperature is low, the reduction time is 48 hours to 120 hours, and preferably 60 hours to 100 hours. The reduction treatment is performed in the presence of a reducing gas such as hydrogen gas.

In the case of containing a strongly basic Ba, it is known that BaO reacts with carbon dioxide in the air and easily forms barium carbonate ($Ba(CO_3)$) or barium hydroxide ($Ba(OH)_2$). When carbonates or hydroxides are formed in this way, the partial negative charge of oxygen in BaO is remarkably reduced, and thus high basicity cannot be obtained. Therefore, in order to express high ammonia synthesis activity, it is necessary to decompose this carbonate and hydroxide by an appropriate treatment. For example, as a method for decomposing Ba carbonate into BaO, heat treatment (reduction treatment) under hydrogen gas circulation is effective. This reaction is represented by the following formula:

$$BaCO_3 + 4H_2 \rightarrow BaO + CH_4 + 2H_2O \quad (5).$$

When the catalyst is heated in a hydrogen atmosphere, hydrogen is dissociated on the surface of the supported metal species, thereby to generate a hydrogen species having a strong reducing power. By the action of this hydrogen species, Ba carbonate is decomposed to change into BaO.

The method for decomposing Ba carbonate includes, for example, a method that can hold a catalyst under a hydrogen flow at a temperature of 550° C. or higher for about 1 hour. Preferred conditions are about 600° C. to 800° C.

Also, such Ba carbonate can be decomposed by holding a catalyst under a hydrogen flow for a long time at a low temperature. Preferred conditions are 500° C. for about 48 hours, 450° C. for about 72 hours, or 400° C. for 120 hours or more.

By using such a method, Ba carbonate can be decomposed. In order to develop the basic properties of Ba, it is desirable to reduce the proportion of Ba present as carbonate as much as possible. The proportion of Ba present as a carbonate in the catalyst is preferably 10 mol % or less, more preferably 1 mol % or less, still more preferably 0.1 mol % or less, and particularly preferably 0.01 mol % or less, with respect to the total amount of Ba contained in the catalyst.

The calcination temperature in the calcination step is most preferably 700 to 800° C. If the calcination temperature in this step is too low, excessive sintering of the support and the active metal proceeds during the reduction treatment, and the particle size increases, thereby reducing the number of active sites and lowering the catalyst performance.

On the other hand, if the calcination temperature in this step is too high, the specific surface area of the support becomes small, so that the active metal is in a poorly dispersed state and the particle size becomes large, thereby reducing the number of active sites and lowering the catalyst performance.

Regarding the relationship between the calcination temperature and the reduction temperature, as described above, it is preferable to calcine the support at a temperature higher than the reduction treatment temperature from the viewpoint of ammonia synthesis activity.

The metal-supported material thus obtained according to the present invention has better handleability and stability during the reaction than the conventional metal-supported material used as an ammonia synthesis catalyst.

In addition, in the case where Ba etc. are contained in a composite oxide, even if a catalyst is an oxidation state at the time of manufacture, the catalyst will absorb $CO_2$ to easily become a carbonate when exposed to air.

For this reason, after decomposing Ba carbonate by the above reduction treatment, it is preferable to handle the catalyst so that it is not exposed to $CO_2$ until its use. For example, the catalyst is preferably stored in a sealed container filled with an inert gas. However, even if a part of the support is converted to a carbonate, hydrogenation followed by decomposition can reduce the carbonate and restore ammonia synthesis activity.

The metal-supported material used as a catalyst after being loaded into the synthesis reactor is inevitable to replace periodically, and since such a catalyst is assumed that it will be used for a long period of time. Thus, a metal-supported material being easy to handle and having an excellent stability is required. The metal-supported material of the present invention is advantageous in this respect.

EXAMPLES

Next, the present invention will be further described with reference to Examples. It goes without saying that the present invention is not limited to these Examples.

<Measurement of Ammonia Synthesis Activity>

The ammonia synthesis activity of the metal-supported material was measured with a fixed bed flow type reactor. While flowing Ar through the metal-supported material pre-treated by the method described in Examples and Comparative Examples, such material was left to cool to 300° C. With maintaining the temperature of the metal-supported material at 300° C. the pressure was increased to 1.0 MPa or 3.0 MPa with a back-pressure valve at the outlet of a reaction tube while supplying Ar. The supply of Ar was stopped, and $H_2$ and $N_2$ were circulated at 90 mL min$^{-1}$ and 30 mL min$^{-1}$ (space velocity 72 L h$^{-1}$ g$^{-1}$), respectively, while maintaining the pressure, and transferred to the reaction atmosphere. Depending on the height of the $NH_3$ synthesis activity, 200 mL of 1 to 100 mM (1, 5, 10, 25, 100 mM) aqueous sulfuric acid solution was added to a three-necked flask connected to an electric conductivity meter, and a mixed gas containing hydrogen (purity, 99.995%, manufactured by Fukuoka Oxygen Co., Ltd.), nitrogen (purity, 99.995%, manufactured by Fukuoka Oxygen Co., Ltd.), and $NH_3$ flowing out of the reaction tube outlet was bubbled into the aqueous sulfuric acid solution. Further, when removing impurities such as moisture and oxygen, a gas purifier (gas purification filter MC50-904F, manufactured by SAES) was used, and the purity of the gas was increased to 99.99999999 or more. At this time, the amount of ammonia produced in the outlet gas was quantified by measuring the change in conductivity caused by the reaction between $NH_3$ and sulfuric acid. Next, the metal-supported material layer was heated up to 350° C. or 400° C. When the temperature of the metal-supported material layer was stabilized at 350° C. or 400° C., the layer was left to stand for 10 minutes, and then the amount of ammonia produced was quantified by the same method as described above.

<Powder X-Ray Diffraction>

The powder X-ray diffraction pattern of the metal-supported material (catalyst) was measured with a SmartLab x-ray diffractometer (Rigaku Corporation).

<Specific Surface Area Measurement>

The specific surface area of the metal-supported material was determined by the BET method from the amount of nitrogen adsorbed at 77 K using a BEL-sorp mini (Nippon Bell KK). Before the measurement, vacuum heating at 300° C. was performed for 2 hours as a pre-treatment.

<Infrared Absorption Spectrum Measurement>

The infrared absorption spectrum was measured using a Fast Fourier Transform Infrared Spectrophotometer (FT/IR-6600, JASCO). A catalyst formed into a disk shape having a diameter of 10 mm was placed in a glass cell encapsulating $H_2$ of 80 kPa and heated to 500° C. while circulating $H_2$. After allowing to cool to room temperature, the cell was evacuated, and the infrared absorption spectrum was measured and used as the background. Thereafter, $^{14}N_2$ and $^{15}N_2$ were each introduced at 8 kPa and adsorbed onto the catalyst, and an infrared absorption spectrum was measured to obtain a difference spectrum from the background.

<Observation of Transmission Electron Microscope Image>

A high-angle annular dark field scanning transmission electron microscope (HAADF-STEM) image and a high-resolution scanning transmission electron microscope (HR-STEM) image were obtained with a JEM-ARM200F atomic resolution microscope (JEOL). A sample for observation was prepared by reducing a metal-supported material at 700° C. with hydrogen and setting it on a specially structured TEM holder in a glove box so as not to be exposed to the atmosphere.

<Measurement of Co Dispersity>

The Co dispersity of the metal-supported material was determined by the $H_2$ pulse chemisorption method. The metal-supported material was heated to 500 to 800° C. under a $H_2$ flow of 60 mL min$^{-1}$ and subjected to a reduction treatment for 1 hour. The flow of $H_2$ was stopped, and Ar was circulated at 30 mL min$^{-1}$ for 0.5 hours. Thereafter, the mixture was cooled to 25° C., a predetermined amount of $H_2$ was supplied in a pulse shape, and the amount of decrease in hydrogen derived from the adsorption of the metal-supported material was measured.

<Measurement of Amount of Catalytic Reduction>

The amount of reduction of the catalyst was determined from the amount of $O_2$ pulse absorption. The catalyst was heated to 500 to 800° C. under a flow of 60 mL min$^{-1}$ $H_2$ and heated at 500° C. for 1 hour. The flow of $H_2$ was stopped, and Ar was circulated at 30 mL min$^{-1}$ for 0.5 hours. Thereafter, a predetermined amount of $O_2$ was supplied in a pulse form at room temperature, 450° C. and 800° C., respectively, and the amount of $O_2$ absorbed from the oxidation of the catalyst, that is, the amount of $O_2$ consumed to oxidize Co in a metallic form to $CoO_2$ and the amount of $O_2$ required when $Ce^3$ was oxidized to Ce were measured. Here, assuming that Co in a metallic state is oxidized to $CoO_2$, the value obtained by subtracting the amount of $O_2$ consumed for Co oxidation is the amount of $O_2$ absorbed by the composite oxide of the support. The degree of reduction of $Ce^{4+}$ (that is, the ratio of $Ce^{4+}$) was determined by converting this O2 absorption amount. In addition, it is possible to obtain the degree of reduction of elements other than Ce, said elements being able to cause changes in valence of +3 and +4, such as $Pr^{4+}$ and $Tb^{4+}$ of Pr and Tb, by the same method.

<Partial Negative Charge of Oxygen>

The partial negative charge of oxygen contained in the composite oxide (support) was calculated. First, the composition ratio of each element (Mg, Ba, Zr, La, Ce, Pr) other than oxygen contained in the support is determined so that the sum of the compositions of these elements is 1. For example, in the case of $Ru/Ba_{0.1}La_{0.45}Ce_{0.45}O_x$, the composition ratio of each element is Ba=0.1, La=0.45, and Ce=0.45. Oxygen is treated as O=1.675 (Ba is treated as II valence, La is treated as III valence, and Ce is treated as between III valence which is completely reduced and IV valence which is completely oxidized). Let this value be ni (i=Mg, Ba, Zr, La, Ce, Pr, O).

Next, the value of the electronegativity xi of each element (Mg, Ba, Zr, La, Ce, Pr, C, O) is determined. As the values of electronegativity, the values in Table 6 and Table 7 on page 122 of Sanderson "Inorganic Chemistry (Volume One)" Hirokawa Shoten (1967) were used (this electronegativity is called "Sanderson electronegativity").

Then, the geometric mean of the electronegativity is determined. This is calculated by the equation: $(\Pi(\chi i\hat{\ }ni))\hat{\ }(1/\Sigma ni)$.

Subsequently, the change in electronegativity of oxygen in the support is determined. This is calculated by the difference between the geometric mean of the electronegativities of the composite oxide and the electronegativity of oxygen (5.21). Note that the geometric mean of the electronegativities changes due to the change in the composition of the oxide accompanying the valence fluctuation of the atoms. For this reason, the calculation method of the metal oxide containing a valence variable element such as Pr or Ce was changed depending on whether the content ratio of the element containing each valence was quantified or not. Specifically, when the ratios of elements having respective valences could be quantified, the electronegativity was calculated according to the ratio. On the other hand, if the ratio of elements with each valence in the valence-variable elements has not been quantified, the case where the element was completely oxidized and the case where the element was completely reduced were calculated independently. Further, when a strongly basic Ba is contained, it is assumed that Ba reacts with carbon dioxide in the atmosphere to become $BaCO_3$, and this case is defined as the case where the partial negative charge of oxygen is the smallest.

Finally, the partial negative charge "$-\delta_o$" of a support oxygen is determined. This is a value obtained by dividing the change in electronegativity of oxygen by "−4.75". This −4.75 is a change in electronegativity when one atom of oxygen acquires one electron, and the value was extracted from Tables 6 and 7 of the above-mentioned Sanderson "Inorganic Chemistry (Volume One)". If the numerical value has a range, this is a case where the ratio of elements with each valence in the valence variable elements is not quantified. The smaller value indicates a case of not being reduced at all, and the larger value indicates a case of being completely reduced. The $-\delta_o$ corresponds to a partial negative charge of the support oxygen. There is a correlation between this value and $NH_3$ synthesis activity of the catalyst.

Example 1

<Ru/$Ce_{0.5}La_{0.5}O_x$_500° C. Reduction>
<Preparation of Composite Oxide>

$Ce_{0.5}La_{0.5}O_x$ composite oxide was synthesized using a reverse homogeneous precipitation method as follows. $La(NO_3)_3 \cdot 6H_2O$ (Wako Pure Chemical Industries, Ltd.) was dissolved in purified water (Takasugi Pharmaceutical Co., Ltd.) to obtain an aqueous $La(NO_3)_3$ solution. $Ce(NO_3)_3 \cdot 6H_2O$ (Kanto Kagaku) was dissolved in purified water to obtain an aqueous $Ce(NO_3)_3$ solution. The aqueous $La(NO_3)_3$ solution and the aqueous $Ce(NO_3)_3$ solution were mixed to prepare 250 mL of a support precursor solution containing 0.0625 mol of La and Ce in total. A 28% $NH_3$ aqueous solution (250 mL)(Wako Pure Chemical Industries, Ltd.) was added to a 1000 mL beaker, and the support precursor solution obtained above was added thereto all at once while stirring at 320 rpm with a magnetic stirrer and stirring was continued for 1 hour. Thereafter, the mixture was left to stand for 30 minutes, 350 mL of the supernatant was removed, and 350 mL of ion exchange water was added, followed by stirring for 30 minutes. A series of operations was performed four times, and the precipitate was filtered and dried at 80° C. for 15 hours using an oven. The dried precipitate was pulverized with a mortar, and the obtained powder was heated in an air atmosphere at 700° C. for 5 hours using an electric furnace to obtain $Ce_{0.5}La_{0.5}O_{1.75}$.
<Supporting of Ru>

Ru was supported on $Ce_{0.5}La_{0.5}O_x$ y the impregnation method. A tetrahydrofuran (THF) (Wako Pure Chemical Industries, Ltd.) solution in which $Ru_3(CO)_{12}$ (Furuya Metal Co., Ltd.), a Ru precursor, was dissolved was prepared in a 200 mL eggplant flask and a support (5 g) was added thereto, followed by stirring for 18 hours or longer. The amounts of $Ru_3(CO)_{12}$ and the support used were appropriately adjusted so that the amount of Ru contained in the catalyst after heating in an argon atmosphere was 5% by weight. The suspension after stirring was evaporated to dryness under reduced pressure using a rotary evaporator with the conditions of 35° C. and 0.3 atm, and then dried at 80° C. for 18 hours using an oven. The obtained powder was heated at 500° C. for 5 hours under a 25 mL min$^{-1}$ argon flow using a tubular electric furnace to remove the carbonyl ligand in the precursor. By the above operation, a Ru/$Ce_{0.5}La_{0.5}O_x$ metal-supported material was obtained.
<Hydrogen Pre-reduction Treatment>

The Ru/$Ce_{0.5}La_{0.5}O_{1.75}$ obtained above was subjected to hydrogen pre-reduction treatment (also simply referred to as "pre-treatment") by the following method, and a part of Ce was changed to a III-valence. After a metal-supported material powder was pressed at 20 MPa for 5 minutes to produce a disk, which was pulverized in a mortar and classified with a sieve to produce a pellet. The size of the pellet was adjusted to 250 to 500 μm in diameter. An INCONEL (trademark) catalyst reaction tube having a diameter of 7 mm was filled with 100 mg of pellets, and the front and back of the catalyst layer were fixed with quartz wool. This reaction tube was installed in a fixed bed flow type reactor for measuring ammonia synthesis activity, and 60 mL min$^{-1}$ $H_2$ was circulated through the reaction tube filled with pellets. The reaction tube was heated at 500° C. for 1 hour to obtain a Ru/$Ce_{0.5}La_{0.5}O_x$_500° C. reduction.

Example 2

<Ru/$Ce_{0.5}La_{0.5}O_x$_650° C. Reduction>

A Ru/$Ce_{0.5}La_{0.5}O_x$_650° C. reduction was obtained by performing the same operation as in Example 1 except that the holding temperature in the pre-treatment was set to 650° C.

Example 3

<Ru/$Ce_{0.5}La_{0.5}O_x$_800° C. Reduction>

A Ru/$Ce_{0.5}La_{0.5}O_x$_800° C. reduction was obtained by performing the same operation as in Example 1 except that the holding temperature in the pre-treatment was set to 800° C.

Example 4

<Ru/$Ce_{0.5}Zr_{0.5}O_x$_700° C. Reduction>
<Composite Oxide>

$Ce_{0.5}Zr_{0.5}O_x$ was synthesized using a reverse homogeneous precipitation method as follows. $ZrO(NO_3)_2 \cdot 2H_2O$ (Wako Pure Chemical Industries, Ltd.) was dissolved in purified water to obtain an aqueous $ZrO(NO_3)_2$ solution. $Ce(NO_3)_3 \cdot 6H_2O$ (Kanto Kagaku) was dissolved in purified water to obtain an aqueous $Ce(NO_3)_3$ solution. The aqueous $La(NO_3)_3$ solution and the aqueous $Ce(NO_3)_3$ solution were mixed to prepare 300 mL of a support precursor solution containing 0.15 mol of Zr and Ce in total. 300 mL of 28% $NH_3$ aqueous solution (Wako Pure Chemical Industries, Ltd.) was added to a 1000 mL beaker, and the support precursor solution was added dropwise at 2 mL per minute using a pump while stirring with a magnetic stirrer at 320 rpm, and stirring was continued for 18 hours. Thereafter, the mixture was left to stand for 1 hour and then filtered. Ion exchange water (800 mL) was added to the slurry remaining on the filter paper, and the mixture was stirred for 2 hours and left to stand for 1 hour. This operation was repeated three times, and the resulting slurry was dried in an oven at 80° C. for 15 hours. Then, $Ce_{0.5}Zr_{0.5}O_2$ was obtained by heating the dried powder at 700° C. for 5 hours in an air atmosphere.
<Supporting of Ru>

Supporting of Ru was carried out in the same manner as in Example 1 to obtain a Ru/$Ce_{0.5}Zr_{0.5}O_2$ metal-supported material.
<Hydrogen Pre-reduction Treatment>

A Ru/$Ce_{0.5}Zr_{0.5}O_{1.75}$ 700° C. reduction was obtained by performing the same operation as in Example 1 except that the holding temperature was set to 700° C.

Example 5

<Ru/Pr$_{0.5}$La$_{0.5}$O$_x$_600° C. Reduction>
<Composite Oxide>

Pr$_{0.5}$La$_{0.5}$O$_{1.675}$ was synthesized using a reverse homogeneous precipitation method as follows. La(NO$_3$)$_3$·6H$_2$O (Wako Pure Chemical Industries. Ltd.) was dissolved in purified water to obtain an aqueous La(NO$_3$)$_3$ solution. Pr(NO$_3$)$_3$·6H$_2$O (Kanto Kagaku) was dissolved in purified water to obtain an aqueous Pr(NO$_3$)$_3$ solution. The aqueous La(NO$_3$)$_3$ solution and the aqueous Pr(NO$_3$)$_3$ solution were mixed to prepare 250 mL of a support precursor solution containing 0.0625 mol of La and Pr in total. A 28% NH$_3$ aqueous solution (250 mL) (Wako Pure Chemical Industries, Ltd.) was added to a 1000 mL beaker, and the support precursor solution was added thereto all at once while stirring at 320 rpm with a magnetic stirrer and stirring was continued for 11 hours. Thereafter, the mixture was left to stand for 30 minutes, 350 mL of the supernatant was removed, and 350 mL of ion exchange water was added. Then, stirring for 30 minutes was performed 6 times, and the precipitate was filtered and then dried at 80° C. for 15 hours using an oven. The dried precipitate was pulverized in a mortar, and the obtained powder was heated in an air atmosphere at 700° C. for 5 hours using an electric furnace to obtain Pr$_{0.5}$La$_{0.5}$O$_{1.675}$.
<Supporting of Ru>

Ru was supported in the same manner as in Example 1 to obtain a Ru/Pr$_{0.5}$La$_{0.5}$O$_x$ metal-supported material.
<Hydrogen Pre-reduction Treatment>

A Ru/Pr$_{0.5}$La$_{0.5}$O$_x$_800° C. reduction was obtained by performing the same operation as in Example 1 except that the holding temperature in the pre-treatment was set to 600° C.

Example 6

<Ru/Ba$_{0.1}$La$_{0.45}$Ce$_{0.45}$O$_x$_650° C. Reduction>
<Preparation of Composite Oxide>

Ba$_{0.1}$La$_{0.45}$Ce$_{0.45}$O$_{1.675}$ was synthesized using a reverse homogeneous precipitation method as follows. La(NO$_3$)$_3$·6H$_2$O (Wako Pure Chemical Industries, Ltd.) was dissolved in purified water to obtain an aqueous La(NO$_3$)$_3$ solution. Ce(NO$_3$)$_3$·6H$_2$O (Kanto Kagaku) was dissolved in purified water to obtain an aqueous Ce(NO$_3$)$_3$ solution. Ba(NO$_3$)$_2$·6H$_2$O (Wako Pure Chemical Industries. Ltd.) was dissolved in purified water to obtain an aqueous Ba(NO$_3$)$_2$ solution. The aqueous La(NO$_3$)$_3$ solution, the aqueous Ce(NO$_3$)$_3$ solution, and the Ba(NO$_3$)$_2$ aqueous solution were mixed to prepare 250 mL of a support precursor solution containing 0.0625 mol of La, Ce, and Ba in total. A 28% NH$_3$ aqueous solution (250 mL) (Wako Pure Chemical Industries, Ltd.) was added to a 1000 mL beaker, and the support precursor solution was added thereto all at once while stirring at 320 rpm with a magnetic stirrer and stirring was continued for 1 hour. Thereafter, the mixture was left to stand for 12 hours, and precipitate (1) was separated by suction filtration. The separated filtrate was collected in a 2 L beaker. Ion exchange water (350 mL) was added to the separated precipitate (1), and the mixture was stirred for 30 minutes to wash the precipitate, and the precipitate (1) was separated by suction filtration. This washing operation was performed three times. All the ion exchange water used for washing was collected, and the filtrate and washing solution were added to a 2 L beaker and mixed. The mixed solution was left to stand for 12 hours to generate a white precipitate (2), and the generated precipitate (2) was collected by suction filtration. The precipitate (1) and the precipitate (2) were mixed and dried at 80° C. for 15 hours using an oven. Ba$_{0.1}$La$_{0.45}$Ce$_{0.45}$O$_{1.675}$ was obtained by pulverizing the dried precipitate in a mortar and heating the resulting powder at 700° C. in an air atmosphere for 5 hours.
<Supporting of Ru>

Ru was supported in the same manner as in Example 1 to obtain a Ru/Ba$_{0.1}$La$_{0.45}$Ce$_{0.45}$O$_x$ metal-supported material.
<Hydrogen Pre-reduction Treatment>

Ru/Ba$_{0.1}$La$_{0.45}$Ce$_{0.45}$O$_x$_650° C. reduction was obtained by performing the same operation as in Example 1 except that the holding temperature in the pre-treatment was set to 650° C.

Example 7

<Ru/Ba$_{0.1}$Pr$_{0.45}$Ce$_{0.45}$O$_x$_650° C. Reduction>
<Preparation of Composite Oxide>

Aqueous solutions were mixed in the same manner as in Example 6 except that in Example 6, instead of using the aqueous La(NO$_3$)$_3$ solution, Pr(NO$_3$)$_3$·6H$_2$O (Wako Pure Chemical Industries, Ltd.) was dissolved in purified water and used as the aqueous Pr(NO$_3$)$_3$ solution. Then, 250 mL of a support precursor solution containing 0.0625 mol of Pr, Ce, and Ba in total was prepared, and the same operation as in Example 6 was performed to obtain Ba$_{0.1}$Pr$_{0.45}$Ce$_{0.45}$O$_{1.9}$.
<Supporting of Ru>

Ru was supported in the same manner as in Example 1 to obtain a Ru/Ba$_{0.1}$Pr$_{0.45}$Ce$_{0.45}$O$_{1.9}$ metal-supported material.
<Hydrogen Pre-reduction Treatment>

Ru/Ba$_{0.1}$Pr$_{0.45}$Ce$_{0.45}$O$_x$_650° C. reduction was obtained by performing the same operation as in Example 1 except that the holding temperature in the pre-treatment was set to 650° C.

Example 8

<Ru/Ba$_{0.3}$Pr$_{0.35}$Ce$_{0.35}$O$_x$_650° C. Reduction>
<Preparation of Composite Oxide>

Ba$_{0.3}$Pr$_{0.35}$Ce$_{0.35}$O$_{1.7}$ was obtained in the same manner as in Example 6 except that 250 mL of a support precursor solution containing 0.0625 mol of Pr, Ce, and Ba in total was prepared.
<Supporting of Ru>

Ru was supported in the same manner as in Example 1 to obtain a Ru/Ba$_{0.3}$Pr$_{0.35}$Ce$_{0.35}$O$_{1.7}$ metal-supported material.
<Hydrogen Pre-reduction Treatment>

Ru/Ba$_{0.3}$Pr$_{0.35}$Ce$_{0.35}$O$_x$_650° C. reduction was obtained by performing the same operation as in Example 1 except that the holding temperature in the pre-treatment was set to 650° C.

Example 9

<Ru/La$_{0.5}$Pr$_{0.5}$O$_x$_650° C. Reduction>
<Preparation of Composite Oxide>

Aqueous solutions were mixed in the same manner as in Example 1 except that in Example 1, instead of using the aqueous Ce(NO$_3$)$_3$ solution, Pr(NO$_3$)$_3$·6H$_2$O (Wako Pure Chemical Industries, Ltd.) was dissolved in purified water and used as an aqueous Pr(NO$_3$)$_3$ solution. Then, 250 mL of a support precursor solution containing 0.0625 mol of La and Pr in total was prepared, and the same operation as in Example 1 was performed to obtain La$_{0.5}$Pr$_{0.5}$O$_{1.75}$.
<Supporting of Ru>

Ru was supported in the same manner as in Example 1 to obtain a Ru/La$_{0.5}$Pr$_{0.5}$O$_{1.75}$ metal-supported material.

<Hydrogen Pre-reduction Treatment>

Ru/La$_{0.5}$Pr$_{0.5}$O$_x$_650° C. reduction was obtained by performing the same operation as in Example 1 except that the holding temperature in the pre-treatment was set to 650° C.

Example 10

<Co/Ba$_{0.3}$Ce$_{0.35}$Pr$_{0.35}$O$_x$_650° C. Reduction>
<Preparation of Composite Oxide>

Aqueous solutions were mixed in the same manner as in Example 6 except that in Example 6, instead of using the aqueous La(NO$_3$)$_3$ solution, Pr(NO$_3$)$_3$·6H$_2$O (Wako Pure Chemical Industries, Ltd.) was dissolved in purified water and used as an aqueous Pr(NO$_3$)$_3$ solution. Then. 250 mL of a support precursor solution containing 0.0625 mol of Pr, Ce, and Ba in total was prepared, and the same operation was performed to obtain Ba$_{0.3}$Ce$_{0.35}$Pr$_{0.35}$O$_{1.7}$.

<Supporting of Co>

Co was supported by a method of evaporation to dryness. Co(NO$_3$)$_2$·6H$_2$O (Wako Pure Chemical Industries, Ltd.) was used as a Co precursor and dissolved in purified water to prepare a 250 mL aqueous solution. After adding Ba$_{0.3}$Ce$_{0.35}$Pr$_{0.35}$O$_x$ thereto and stirring for 12 hours, the aqueous solution was stirred under heating using a hot stirrer to remove moisture. The amounts of Co(NO$_3$)$_2$·6H$_2$O and support used were adjusted as appropriate so that the amount of Co contained in the catalyst after heating in an air atmosphere was 10% by weight. The dried powder was collected and dried in a dryer at 70° C. for 12 hours. Thereafter, nitrates were removed by holding at 500° C. for 5 hours under an air flow of 300 mL min$^{-1}$ to obtain Co/Ba$_{0.3}$Ce$_{0.35}$Pr$_{0.35}$O$_{1.7}$.

<Hydrogen Pre-reduction Treatment>

A Co/Ba$_{0.3}$Ce$_{0.35}$Pr$_{0.35}$O$_x$_650° C. reduction was obtained by performing the same operation as in Example 1 except that the holding temperature in the pre-treatment was set to 650° C.

Example 11

<Co/Ba$_{0.3}$Ce$_{0.35}$Pr$_{0.35}$O_650° C. Reduction>

A Co/Ba$_{0.3}$Ce$_{0.5}$Pr$_{0.35}$O$_x$_650° C. reduction was obtained in the same operation as in Example 10, except that the amount of Co precursor used was doubled in Example 10.

Example 12

<Co/Ba$_{0.3}$Ce$_{0.35}$Pr$_{0.35}$O$_x$_500° C. Reduction>
<Hydrogen Pre-reduction Treatment>

A Co/Ba$_{0.3}$Ce$_{0.35}$Pr$_{0.35}$O$_x$_500° C. reduction was obtained in the same operation as in Example 10 except that the holding temperature in the pre-treatment was set to 500° C. in Example 10.

Example 13

<Co/Ba$_{0.3}$Ce$_{0.35}$Pr$_{0.35}$O$_x$_600° C. Reduction>
<Hydrogen Pre-reduction Treatment>

A Co/Ba$_{0.3}$Ce$_{0.35}$Pr$_{0.35}$O$_x$_600° C. reduction was obtained in the same operation as in Example 10 except that the holding temperature in the pre-treatment was set to 600° C. in Example 10.

Example 14

<Co/Ba$_{0.3}$Ce$_{0.35}$Pr$_{0.35}$O$_x$_700° C. Reduction>
<Hydrogen Pre-reduction Treatment>

A CoBa$_{0.3}$Ce$_{0.35}$Pr$_{0.35}$O$_x$_700° C. reduction was obtained in the same operation as in Example 10 except that the holding temperature in the pre-treatment was set to 700° C. in Example 10.

Example 15

<Co/Ba$_{0.3}$Ce$_{0.35}$Pr$_{0.35}$O$_x$_750° C. Reduction>
<Hydrogen Pre-reduction Treatment>

A CoBa$_{0.3}$Ce$_{0.35}$Pr$_{0.35}$O$_x$_750° C. reduction was obtained in the same operation as in Example 10 except that the holding temperature in the pre-treatment was set to 750° C. in Example 10.

Example 17

<Co/Ba$_{0.3}$Ce$_{0.35}$Pr$_{0.35}$O$_x$_700° C. Reduction>
<Preparation of Composite Oxide and Hydrogen Pre-reduction Treatment>

A Co/Ba$_{0.3}$Ce$_{0.5}$Pr$_{0.35}$O$_x$_700° C. reduction was obtained in the same operation as in Example 10 except that the holding temperature in the pre-treatment was set to 700° C. in Example 10.

Example 18

<Co/Ba$_{0.3}$Ce$_{0.35}$Pr$_{0.35}$O$_x$_650° C. Reduction>
<Hydrogen Pre-reduction Treatment>

A Co/Ba$_{0.3}$Ce$_{0.35}$Pr$_{0.35}$O$_x$_650° C. reduction was obtained in the same operation as in Example 10 except that the amount of Co precursor used was tripled and the holding temperature in the pre-treatment was set to 650° C. in Example 10.

Example 19

<Co/Ba$_{0.3}$La$_{0.35}$Pr$_{0.35}$O$_x$_650° C. Reduction>
<Hydrogen Pre-reduction Treatment>

A Co/Ba$_{0.3}$La$_{0.35}$Pr$_{0.35}$O$_x$_650° C. reduction was obtained in the same operation as in Example 10 except that instead of using the aqueous Ce(NO$_3$)$_3$ solution. La(NO$_3$)$_3$·6H$_2$O (Wako Pure Chemical Industries, Ltd.) was dissolved in purified water and used as an aqueous La(NO$_3$)$_3$ solution, the precursor used was doubled, and the holding temperature in the pre-treatment was set to 650° C. in Example 10.

Example 20

<Ru/Ba$_{0.1}$La$_{0.45}$Ce$_{0.45}$O$_x$_500° C. Reduction>
<Preparation of Composite Oxide>

La(NO$_3$)$_3$·6H$_2$O (Wako Pure Chemical Industries, Ltd.) was dissolved in purified water to obtain an aqueous La(NO$_3$)$_3$ solution. Ce(NO$_3$)$_3$·6H$_2$O (Kanto Kagaku) was dissolved in purified water to obtain an aqueous Ce(NO$_3$)$_3$ solution. The aqueous La(NO$_3$)$_3$ solution and the aqueous Ce(NO$_3$)$_3$ solution were mixed to prepare 250 mL of a support precursor solution containing 0.0625 mol of La and Ce in total. A 28% NH$_3$ aqueous solution (250 mL) (Wako Pure Chemical Industries, Ltd.) was added to a 1000 mL beaker, and the support precursor solution was added thereto all at once while stirring at 320 rpm with a magnetic stirrer and stirring was continued for 1 hour. Thereafter, the mixture was left to stand for 30 minutes, and then 350 ml of the supernatant was removed. After addition of 350 ml of ion exchange water, stirring for 30 minutes was performed four times and the precipitate was collected by filtration. Ba(OH)$_2$ (Wako Pure Chemical Industries, Ltd.) was dissolved in purified water to obtain an aqueous Ba(OH)$_2$ solution. The precipitate obtained above was added to this aqueous Ba(OH)$_2$ solution and stirred with a magnetic stirrer for 5 minutes. The suspension after stirring was evaporated to dryness under reduced pressure at 35° C. and 0.3 atm using a rotary evaporator, and then dried at 80° C. for 15 hours using an oven. The dried precipitate was pulverized in a mortar and the resulting powder was heated at 700° C. in an air atmosphere for 5 hours using an electric furnace to obtain $Ba_{0.1}La_{0.45}Ce_{0.45}O_{1.675}$.

<Supporting of Ru>

Ru was supported in the same operation as in Example 6 to obtain a $Ru/Ba_{0.1}La_{0.45}Ce_{0.45}O_{1.675}$ metal-supported material.

<Hydrogen Pre-reduction Treatment>

A $Ru/Ba_{0.1}La_{0.45}Ce_{0.45}O_x$_500° C. reduction was obtained in the same operation as in Example 6 except that the holding temperature in the pre-treatment was set to 500° C. in Example 6.

Example 21

<$Ru/Ba_{0.1}La_{0.45}Ce_{0.45}O_x$_600° C. Reduction>
<Hydrogen Pre-reduction Treatment>

A $Ru/Ba_{0.1}La_{0.45}Ce_{0.45}O_x$_600° C. reduction was obtained in the same operation as in Example 20 except that the holding temperature in the pre-treatment was set to 600° C. in Example 20.

Example 22

<$Ru/Ba_{0.1}La_{0.45}Ce_{0.45}O_x$_650° C. Reduction>
<Hydrogen Pre-reduction Treatment>

A $Ru/Ba_{0.1}La_{0.45}Ce_{0.45}O_x$_650° C. reduction was obtained in the same operation as in Example 20 except that the holding temperature in the pre-treatment was set to 650° C. in Example 20.

Example 23

<$Ru/Ba_{0.1}La_{0.45}Ce_{0.45}O_x$_700° C. Reduction>
<Hydrogen Pre-reduction Treatment>

A $Ru/Ba_{0.1}La_{0.45}Ce_{0.45}O_x$_700° C. reduction was obtained in the same operation as in Example 20 except that the holding temperature in the pre-treatment was set to 700° C. in Example 20.

Example 24

<$Ru/Ba_{0.1}La_{0.45}Ce_{0.45}O_x$_750° C. Reduction>
<Hydrogen Pre-reduction Treatment>

A $Ru/Ba_{0.1}La_{0.45}Ce_{0.45}O_x$_750° C. reduction was obtained in the same operation as in Example 20 except that the holding temperature in the pre-treatment was set to 750° C. in Example 20.

Comparative Example 1

<$Ru/Ce_{0.9}La_{0.1}O_x$_450° C. Reduction Prepared by Conventional Method>

As a comparative example, a catalyst was prepared by the method described in Non Patent Literature 2. Specifically, first, $RuCl_3/3H_2O$. $Ce(NO_3)_3/6H_2O$, and $La(NO_3)/6H_2O$ were dissolved in an aqueous solution to prepare a mixed aqueous solution (300 mL in total). A hydrogen peroxide aqueous solution was added thereto and mixed so that the molar ratio of $H_2O_2$ and $Ce^{3+}$ was 1:3. This mixed aqueous solution was stirred for 30 minutes while maintaining at 60° C. and an aqueous solution of KOH was gradually added thereto to produce a precipitate, followed by further stirring for 60 minutes. Thereafter, the mixed solution containing the precipitate was cooled to room temperature, and the precipitate was separated by a centrifugal separation method. The separated precipitate was washed with ion exchange water and then dried at 120° C. for 24 hours. A $Ru/Ce_{0.9}La_{0.1}O_x$_450° C. reduction prepared in a conventional manner by the same operation as in Example 1 except that 45 mL min$^{-1}$ $H_2$ and 15 mL min$^{-1}N_2$ were simultaneously circulated through the reaction tube during pre-treatment and the holding temperature was set to 450° C. was obtained.

Comparative Example 2

<$Ru/Ce_{0.9}La_{0.1}O_x$_500° C. Reduction Prepared by Conventional Method>

A $Ru/Ce_{0.9}La_{0.1}O_x$_500° C. reduction was prepared by a conventional method through the same operation as in Comparative Example 1 except that the holding temperature in the pre-treatment was set to 500° C.

The ammonia synthesis activity of the metal-supported materials obtained in each Example and Comparative Example was examined. The results are shown in Tables 2 to 3. In addition, Table 4 shows the results of measuring the physical properties of each composite oxide. In the table, when the presence/absence of use of a gas purifier is indicated by the symbol "o", the reaction gas was treated in advance with a gas purification filter (MC50-904F) manufactured by SAES and was supplied after impurities such as $H_2O$ and $O_2$ being decreased to less than 100 ppt.

TABLE 2

|  | Metal-supported material | Calcinating temperature ° C. | Reducing process temperature ° C. | Ammonia yield | Ammonia generation rate mmol g − 1 h − 1 | Gas purifier used/ unused | Partial negative charge of oxygen | Note |
| --- | --- | --- | --- | --- | --- | --- | --- | --- |
| Example 1 | Ru/Ce0.5La0.5Ox | 700 | 500 | 1.37 | 22 | – | 0.53 | Ru supporting quantity: 5 wt %, activity at 350° C. |
| Example 2 | Ru/Ce0.5La0.5Ox | 700 | 650 | 1.94 | 31.3 | – | 0.53 | Ru supporting quantity: 5 wt %, activity at 350° C. |

TABLE 2-continued

| | Metal-supported material | Calcinating temperature ° C. | Reducing process temperature ° C. | Ammonia yield | Ammonia generation rate mmol g−1 h−1 | Gas purifier used/ unused | Partial negative charge of oxygen | Note |
|---|---|---|---|---|---|---|---|---|
| Example 3 | Ru/Ce0.5La0.5Ox | 700 | 800 | 1.28 | 20.6 | − | 0.54 | Ru supporting quantity: 5 wt %, activity at 350° C. |
| Example 4 | Ru/Ce0.5Zr0.5Ox | 700 | 700 | 1.78 | 28.6 | − | 0.47-0.50 | Ru supporting quantity: 5 wt %, activity at 350° C. |
| Example 5 | Ru/Pr0.5La0.5Ox | 700 | 600 | 1.42 | 22.8 | + | 0.55 | Ru supporting quantity: 5 wt %, activity at 350° C. |
| Example 6 | Ru/Ba0.1La0.45 Ce0.45Ox | 700 | 650 | 2.72 | 43.7 | − | 0.50-0.57 | Ru supporting quantity: 5 wt %, activity at 350° C. |
| Example 7 | Ru/Ba0.1Pr0.45 Ce0.45Ox | 700 | 650 | 2.78 | 44.7 | − | 0.47-0.56 | Ru supporting quantity: 5 wt %, activity at 350° C. |
| Example 8 | Ru/Ba0.1Pr0.45 Ce0.45Ox | 700 | 650 | 2.5 | 39.3 | − | 0.45-0.59 | Ru supporting quantity: 5 wt %, activity at 350° C. |
| Example 9 | Ru/La0.5Pr0.5Ox | 700 | 650 | 1.67 | 26.8 | − | 0.55 | Ru supporting quantity: 5 wt %, activity at 350° C. |
| Example 10 | Co/Ba0.3Ce0.35 Pr0.35Ox | 700 | 650 | 0.52 @400 | 8.31 @400 | − | 0.45-0.59 | Co supporting quantity: 10 wt %, activity at 400° C. |
| Example 11 | Co/Ba0.3Ce0.35 Pr0.35Ox | 700 | 650 | 0.85 @400 | 13.6 @400 | − | 0.45-0.59 | Co supporting quantity: 20 wt %, activity at 400° C. |
| Example 12 | Co/Ba0.3Ce0.35 Pr0.35Ox | 700 | 500 | 0.07 @400 | 1.14 @400 | − | 0.45-0.59 | Co supporting quantity: 10 wt %, activity at 400° C. |
| Example 13 | Co/Ba0.3Ce0.35 Pr0.35Ox | 700 | 600 | 0.35 @400 | 5.58 @400 | − | 0.45-0.59 | Co supporting quantity: 10 wt %, activity at 400° C. |
| Example 14 | Co/Ba0.3Ce0.35 Pr0.35Ox | 700 | 700 | 0.76 @400 | 12.2 @400 | − | 0.45-0.59 | Co supporting quantity: 10 wt %, activity at 400° C. |

TABLE 3

| | Metal-supported material | Calcinating temperature ° C. | Reducing process temperature ° C. | Ammonia yield | Ammonia generation rate mmol g−1 h−1 | Gas purifier used/ unused | Partial negative charge of oxygen | Note |
|---|---|---|---|---|---|---|---|---|
| Example 15 | Co/Ba0.3Ce0.35 Pr0.35Ox | 700 | 750 | 0.84 @400 | 13.4 @400 | − | 0.45-0.59 | Co supporting quantity: 10 wt %, activity at 400° C. |
| Example 17 | Co/Ba0.3Ce0.35 Pr0.35Ox | 700 | 700 | 0.89 @400 | 14.3 @400 | − | 0.45-0.59 | Co supporting quantity: 20 wt %, activity at 400° C. |
| Example 18 | Co/Ba0.3Ce0.35 Pr0.35Ox | 700 | 650 | 0.68 @400 | 11.0 @400 | − | 0.45-0.59 | Co supporting quantity: 30 wt %, activity at 400° C. |

TABLE 3-continued

| | Metal-supported material | Calcinating temperature ° C. | Reducing process temperature ° C. | Ammonia yield | Ammonia generation rate mmol g − 1 h − 1 | Gas purifier used/ unused | Partial negative charge of oxygen | Note |
|---|---|---|---|---|---|---|---|---|
| Example 19 | Co/Ba0.3Ce0.35 Pr0.35Ox | 700 | 650 | 0.64 @400 | 10.4 @400 | − | 0.47-0.59 | Co supporting quantity: 20 wt %, activity at 400° C. |
| Example 20 | Ru/Ba0.1La0.45 Ce0.45Ox | 700 | 500 | 1.16 | 18.6 | + | 0.50-0.57 | Ru supporting quantity: 5 wt %, activity at 350° C. |
| Example 21 | Ru/Ba0.1La0.45 Ce0.45Ox | 700 | 600 | 2.63 | 42.21 | + | 0.50-0.57 | Ru supporting quantity: 5 wt %, activity at 350° C. |
| Example 22 | Ru/Ba0.1La0.45 Ce0.45Ox | 700 | 650 | 3.13 | 50.28 | + | 0.50-0.57 | Ru supporting quantity: 5 wt %, activity at 350° C. |
| Example 23 | Ru/Ba0.1La0.45 Ce0.45Ox | 700 | 700 | 3.25 | 52.3 | + | 0.50-0.57 | Ru supporting quantity: 5 wt %, activity at 350° C. |
| Example 24 | Ru/Ba0.1La0.45 Ce0.45Ox | 700 | 750 | 2.88 | 46.26 | + | 0.50-0.57 | Ru supporting quantity: 5 wt %, activity at 350° C. |
| Example 25 | Ru/Ba0.1La0.45 Ce0.45Ox | 700 | 800 | 1.88 | 30.17 | + | 0.50-0.57 | Ru supporting quantity: 5 wt %, activity at 350° C. |
| Example 26 | Ru/Ba0.05La0.475 Ce0.475Ox | 700 | 700 | 3.13 | 50.28 | + | 0.51-0.56 | Ru supporting quantity: 5 wt %, activity at 350° C. |
| Example 27 | Ru/Ba0.15La0.42.5 Ce0.425Ox | 700 | 700 | 2 | 32.18 | + | 0.49-0.57 | Ru supporting quantity: 5 wt %, activity at 350° C. |
| Comparative example 1 | Ru/Ce0.9La0.1 O1,9185 | | 450 | 0.379 | 6.1 | + | 0.50 | Prepared by method according to Non-Patent Literature 2 |
| Comparative example 2 | | | 500 | 0.518 | 8.3 | + | 0.50 | Prepared by method according to Non-Patent Literature 2 |

TABLE 4

| | Metal-supported material | Specific surface area m$^2$ g$^{-1}$ | Ru dispersion degree ($D_{ads}$) | Ru average particle diameter (d) nm | Ru dispersion degree ($D_{TEM}$) | $D_{ads}/D_{TEM}$ | TOF S$^{-1}$ | Reducing degree of Ce$^{4+}$ ratio of Ce$^{3+}$) % |
|---|---|---|---|---|---|---|---|---|
| Example 1 | Ru/Ce0.5La0.5Ox | 47 | 0.46 | 1.8 | 0.62 | 0.74 | 0.027 | 23 |
| Example 2 | Ru/Ce0.5La0.5Ox | 42 | 0.35 | 1.7 | 0.65 | 0.54 | 0.051 | 43 |
| Example 3 | Ru/Ce0.5La0.5Ox | 21 | 0.11 | 2.7 | 0.41 | 0.27 | 0.108 | 63 |
| Example 4 | Ru/Ce0.5La0.5Ox | | | | | | | |
| Example 5 | Ru/Pr0.5La0.5Ox | | | | | | | 100 |
| Example 6 | Ru/Ba0.1La0.45 Ce0.45Ox | | | | | | | |
| Example 7 | Ru/Ba0.1Pr0.45 Ce0.45Ox | 25 | 0.14 | | | | | |
| Example 8 | Ru/Ba0.3Pr0.35 Ce0.35Ox | | | | | | | |
| Example 9 | Ru/La0.5Pr0.5Ox | 30 | 0.19 | | | | | 100 |
| Example 10 | Co/Ba0.3Ce0.35 Pr0.35Ox | | | | | | | |

TABLE 4-continued

| | Metal-supported material | Specific surface area $m^2 g^{-1}$ | Ru dispersion degree ($D_{ads}$) | Ru average particle diameter (d) nm | Ru dispersion degree ($D_{TEM}$) | $D_{ads}/D_{TEM}$ | TOF $S^{-1}$ | Reducing degree of $Ce^{4+}$ ratio of $Ce^{3+}$) % |
|---|---|---|---|---|---|---|---|---|
| Example 11 | Co/Ba0.3Ce0.35Pr0.35Ox | | | | | | | |
| Example 12 | Co/Ba0.3Ce0.35Pr0.35Ox | | | | | | | |
| Example 13 | Co/Ba0.3Ce0.35Pr0.35Ox | | | | | | | |
| Example 14 | Co/Ba0.3Ce0.35Pr0.35Ox | | | | | | | |
| Example 15 | Co/Ba0.3Ce0.35Pr0.35Ox | | | | | | | |
| Example 16 | Co/Ba0.3Ce0.35Pr0.35Ox | | | | | | | |
| Example 17 | Co/Ba0.3Ce0.35Pr0.35Ox | | | | | | | |
| Example 18 | Co/Ba0.3Ce0.35Pr0.35Ox | | | | | | | |
| Example 19 | Co/Ba0.3Ce0.35Pr0.35Ox | | | | | | | |
| Example 20 | Ru/Ba0.1La0.45Ce0.45Ox | 25 | | | | | | 24 |
| Example 21 | Ru/Ba0.1La0.45Ce0.45Ox | | | | | | | |
| Example 22 | Ru/Ba0.1La0.45Ce0.45Ox | | | | | | | |
| Example 23 | Ru/Ba0.1La0.45Ce0.45Ox | 21 | 0.08 | | | 0.386 | | 47 |
| Example 24 | Ru/Ba0.1La0.45Ce0.45Ox | 16 | | | | | | |
| Example 25 | Ru/Ba0.1La0.45Ce0.45Ox | 11 | | | | | | 65 |
| Example 26 | Ru/Ba0.05La0.475Ce0.475Ox | | | | | | | |
| Example 27 | Ru/Ba0.15La0.425Ce0.425Ox | | | | | | | |
| Comparative example 1 | Ru/Ce0.9La0.1O1.9185 | | | | | | | 5 |
| Comparative example 2 | Ru/Ce0.9La0.1O1.9185 | | | | | | | 7 |

From this result, comparing Examples and Comparative Examples, it was understood that in the Comparative Examples in which the calcination at a high temperature was not performed and the ratio of the III valence is small, the ammonia synthesis activity (ammonia yield and ammonia production rate) was inferior.

Note that, in the catalysts of Comparative Examples 1 and 2 prepared by the method described in Non Patent Literature 2, the ratios of III-valent Ce are 5% and 7%, respectively, according to the measurement of catalytic reduction amount. In Non Patent Literature 2, the ratio of the III-valent Ce in the composite oxide is determined by X-ray photoelectron spectroscopy, but only the very surface can be analyzed by such X-ray photoelectron spectroscopy in principle to the extent of about several atomic layers in which X-rays can penetrate. Usually, the reduction of the catalyst proceeds from the vicinity of the surface of the catalyst particles due to the problem of contact with the reducing agent (for example, hydrogen gas used in the present invention). Therefore, the value described in Non Patent Literature 2 evaluates only the ratio of the trivalent Ce on the surface, and it is considered that the ratio of the trivalent Ce is excessively evaluated in the whole catalyst.

Example 25

<Ru/$Ba_{0.1}La_{0.45}Ce_{0.45}O_x$_800° C. Reduction>

A Ru/$Ba_{0.1}La_{0.45}Ce_{0.45}O_x$_800° C. reduction was obtained in the same operation as in Example 20, except that the pre-treatment holding temperature in the pre-treatment was set to 800° C. in Example 20.

Example 26

<Ru/$Ba_{0.05}La_{0.475}C_{0.475}O_x$_700° C. Reduction>

A Ru/$Ba_{0.1}La_{0.45}Ce_{0.45}O_x$_700° C. reduction was obtained in the same operation as in Example 20 except that the amount of Ba precursor used was reduced to a half amount in Example 20.

Example 27

<Ru/$Ba_{0.15}La_{0.425}Ce_{0.425}O_x$_700° C. Reduction>

Ru/$Ba_{0.15}La_{0.425}Ce_{0.425}O_x$_700° C. reduction was obtained by the same operation as in Example 20 except that the amount of Ba precursor used was 1.5 times the amount in Example 20.

Example 28

<10 Mol % Ba/Ru/La$_{0.5}$Ce$_{0.5}$O$_x$_700° C. Reduction>
<Preparation of Catalyst>

After preparing Ru/Ce$_{0.5}$La$_{0.5}$O$_x$ by the method described in Example 1. Ba(NO$_3$)$_2$·6H$_2$O was used as a raw material for supporting Ba by evaporation to dryness so that the amount of Ba was 10 mol % with respect to Ru. Further, the same operation as in Example 1 was carried out except that the holding temperature in the pre-treatment was set to 700° C., thereby to obtain a 10 mol % Ba/Ru/La$_{0.5}$Ce$_{0.5}$Ce$_{0.5}$O$_x$_700° C. reduction.

<Hydrogen Pre-reduction Treatment>

A 10 mol % Ba/Ru/La$_{0.5}$Ce$_{0.5}$O$_x$_700° C. reduction was obtained by the same operation as in Example 1 except that the holding temperature in the pre-treatment was set to 700° C. in Example 1.

Example 29

<10 Mol % Ba/Ru/La$_{0.5}$Ce$_{0.5}$O$_x$_500° C. Reduction>

A 10 mol % Ba/Ru/La$_{0.5}$Ce$_{0.5}$O$_x$_500° C. reduction was obtained by the same operation as in Example 28 except that Ba(OH)$_2$ was used as a raw material instead of Ba(NO$_3$)$_2$·6H$_2$O. and the holding temperature in the pre-treatment was set to 500° C. in Example 28.

Example 30

<10 Mol % Ba/Ru/La$_{0.5}$Ce$_{0.5}$O$_x$_650° C. Reduction>

A 10 mol % Ba/Ru/La$_{0.5}$Ce$_{0.5}$O$_x$_650° C. reduction was obtained by the same operation as in Example 29 except that the holding temperature in the pre-treatment was set to 650° C. in Example 29.

Example 31

<10 Mol % Ba/Ru/La$_{0.5}$Ce$_{0.5}$O$_x$_700° C. Reduction>

A 10 mol % Ba/Ru/La$_{0.5}$Ce$_{0.5}$O$_x$_700° C. reduction was obtained by the same operation as in Example 29 except that the holding temperature in the pre-treatment was set to 700° C. in Example 29.

Example 32

<10 Mol % Ba/Ru/La$_{0.5}$Ce$_{0.5}$O$_x$_800° C. Reduction>

A 10 mol % Ba/Ru/La$_{0.5}$Ce$_{0.5}$O$_x$_800° C. reduction was obtained by the same operation as in Example 29 except that the holding temperature in the pre-treatment was set to 800° C. in Example 29.

Example 33

<5 Mol % Ba/Ru/La$_{0.5}$Ce$_{0.5}$O$_x$_450° C. Reduction>

A 5 mol % Ba/Ru/La$_{0.5}$Ce$_{0.5}$O$_x$_450° C. reduction was obtained by the same operation as in Example 29 except that the amount of Ba precursor was reduced to a half amount, and the holding temperature in the pre-treatment was set to 450° C. in Example 29.

Example 34

<5 Mol % Ba/Ru/La$_{0.5}$Ce$_{0.5}$O$_x$_650° C. Reduction>

A 5 mol % Ba/Ru/La$_{0.5}$Ce$_{0.5}$O$_x$_650° C. reduction was obtained by the same operation as in Example 33 except that the holding temperature in the pre-treatment was set to 650° C. in Example 33.

Example 35

<5 Mol % Ba/Ru/La$_{0.5}$Ce$_{0.5}$O$_x$_700° C. Reduction>

A 5 mol % Ba/Ru/La$_{0.5}$Ce$_{0.5}$O$_x$_700° C. reduction was obtained by the same operation as in Example 33 except that the holding temperature in the pre-treatment was set to 700° C. in Example 33.

Example 36

<5 Mol % Ba/Ru/La$_{0.5}$Ce$_{0.5}$O$_x$_800° C. Reduction>

A 5 mol % Ba/Ru/La$_{0.5}$Ce$_{0.5}$O$_x$_800° C. reduction was obtained by the same operation as in Example 33 except that the holding temperature in the pre-treatment was set to 800° C. in Example 33.

Example 37

<1 Mol % Ba/Ru/La$_{0.5}$Ce$_{0.5}$O$_x$_700° C. Reduction>

A 1 mol % Ba/Ru/La$_{0.5}$Ce$_{0.5}$O$_x$_700° C. reduction was obtained by the same operation as in Example 29 except that the amount of Ba precursor used was reduced to a 1/10 amount and the holding temperature in the pre-treatment was set to 700° C. in Example 29.

Example 39

<Ru/Ba$_{0.1}$La$_{0.9}$O$_x$_700° C. Reduction>

A Ru/Ba$_{0.1}$La$_{0.9}$O$_x$_700° C. Reduction> was obtained by the same operation as in Example 1 except that Ba(NO$_3$)$_2$·6H$_2$O was used instead of Ce(NO$_3$)$_3$·6H$_2$O as a raw material and the holding temperature in the pre-treatment was set to 700° C. in Example 1.

Example 40

<Ru/Ba$_{0.1}$La$_{0.9}$O$_x$_500° C. Reduction>

A Ru/Ba$_{0.1}$La$_{0.9}$O$_x$_500° C. reduction was obtained by the same operation as in Example 29 except that the holding temperature in the pre-treatment was set to 500° C. in Example 39.

Example 41

<Ru/Ba$_{0.1}$La$_{0.9}$O$_x$_800° C. Reduction>

A Ru/Ba$_{0.1}$La$_{0.9}$O$_x$_800° C. reduction was obtained by the same operation as in Example 29 except that the holding temperature in the pre-treatment was set to 800° C. in Example 39.

Example 42

<Ru/Ba$_{0.1}$La$_{0.9}$O$_x$_900° C. Reduction>

A Ru/Ba$_{0.1}$La$_{0.9}$O$_x$_900° C. reduction was obtained by the same operation as in Example 29 except that the holding temperature in the pre-treatment was set to 900° C. in Example 39.

Example 43

<Ru/Ba$_{0.1}$Ce$_{0.9}$O$_x$_500° C. Reduction>

A Ru/Ba$_{0.1}$Ce$_{0.9}$O$_x$_500° C. reduction was obtained by the same operation as in Example 39 except that Ce(NO$_3$)$_3$·6H$_2$O was used instead of La(NO$_3$)$_3$·6H$_2$O as a raw material and the holding temperature in the pre-treatment was set to 500° C. in Example 39.

Example 44

<Ru/Ba$_{0.1}$Ce$_{0.9}$O$_x$_700° C. Reduction>

A Ru/Ba$_{0.1}$Ce$_{0.9}$O$_x$_700° C. reduction was obtained by the same operation as in Example 43 except that the holding temperature in the pre-treatment was set to 700° C. in Example 43.

The ammonia synthesis activity and physical properties of the metal-supported materials obtained in each Example were measured. The results are shown in the table below.

TABLE 5

| | Metal-supported material | Calcinating temperature ° C. | Reducing process temperature ° C. | Ammonia yield % | Ammonia generation rate mmol g − 1 h − 1 | Gas purifier used/ unused | Partial negative charge of oxygen | Note |
|---|---|---|---|---|---|---|---|---|
| Example 28 | 10 mol % Ba/Ru/La0.5Ce0.5Ox | 700 | 700 | 2.6 | 41.83 | + | 0.50-0.57 | Ba precursor is Ba nitrate, and Ba nitrate is added successively |
| Example 29 | 10 mol % Ba/Ru/La0.5Ce0.5Ox | 700 | 500 | 0.91 | 14.63 | + | 0.50-0.57 | Ru supporting quantity is 4.5 wt %, and yield. etc., are per 50 mg of Ru |
| Example 30 | 10 mol % Ba/Ru/La0.5Ce0.5Ox | 700 | 650 | 2.22 | 35.75 | + | 0.50-0.57 | Ba precursor is BaOH, and BaOH is added successively |
| Example 31 | 10 mol % Ba/Ru/La0.5Ce0.5Ox | 700 | 700 | 2.78 | 44.75 | + | 0.50-0.57 | Ru supporting quantity is 4.5 wt %, and yield. etc., are per 50 mg of Ru |
| Example 32 | 10 mol % Ba/Ru/La0.5Ce0.5Ox | 700 | 800 | 2.53 | 40.41 | + | 0.50-0.57 | Ba precursor is BaOH, and BaOH is added successively |
| Example 33 | 5 mol % Ba/Ru/La0.5Ce0.5Ox | 700 | 450 | 0.79 | 12.67 | + | 0.51-0.56 | Ru supporting quantity is 4.5 wt %, and yield. etc., are per 50 mg of Ru |
| Example 34 | 5 mol % Ba/Ru/La0.5Ce0.5Ox | 700 | 650 | 2.14 | 34.29 | + | 0.51-0.56 | Ba precursor is BaOH, and BaOH is added successively |
| Example 35 | 5 mol % Ba/Ru/La0.5Ce0.5Ox | 700 | 700 | 3.01 | 48.54 | + | 0.51-0.56 | Ru supporting quantity is 4.5 wt %, and yield. etc., are per 50 mg of Ru |
| Example 36 | 5 mol % Ba/Ru/La0.5Ce0.5Ox | 700 | 800 | 2.64 | 42.31 | +- | 0.51-0.56 | Ba precursor is BaOH, and BaOH is added successively |
| Example 37 | 1 mol % Ba/Ru/La0.5Ce0.5Ox | 700 | 650 | 1.50 | 24.16 | + | 0.52-0.56 | Ru supporting quantity is 4.5 wt %, and yield. etc., are per 50 mg of Ru |
| Example 39 | Ru/Ba0.1La0.9Ox | 700 | 700 | 2.5 | 40.22 | + | 0.53-0.57 | Precursor is BaOH |
| Example 40 | Ru/Ba0.1La0.9Ox | 700 | 500 | 0.91 | 14.63 | + | 0.53-0.57 | Precursor is BaOH |
| Example 41 | Ru/Ba0.1La0.9Ox | 700 | 800 | 3.26 | 52.29 | + | 0.53-0.57 | Precursor is BaOH |
| Example 42 | Ru/Ba0.1La0.9Ox | 700 | 900 | 2.5 | 40.22 | + | 0.53-0.57 | Precursor is BaOH |
| Example 43 | Ru/Ba0.1Ce0.9Ox | 700 | 500 | 1.12 | 18.02 | + | 0.47-0.56 | Precursor is BaOH |
| Example 44 | Ru/Ba0.1Ce0.9Ox | 700 | 700 | 2.13 | 34.19 | + | 0.47-0.56 | Precursor is BaOH |

Example 45

<Co/Ba$_{0.1}$La$_{0.45}$Ce$_{0.45}$O$_x$_700° C. Reduction (Co loading: 20 wt %)>

A Co/Ba$_{0.1}$La$_{0.45}$Ce$_{0.45}$O$_x$_700° C. reduction (Co loading: 20 wt %) was obtained by the same operation as in Example 20 except that Co(NO$_3$)$_2$·6H$_2$O was used instead of Ru in Example 20.

Example 46

<Co/Ba$_{0.1}$La$_{0.45}$Ce$_{0.45}$O$_x$_700° C. Reduction (Co Loading: 20 wt %)>

A Co/Ba$_{0.1}$La$_{0.45}$Ce$_{0.45}$O$_x$_700° C. reduction (Co loading: 20 wt %) was obtained by the same operation as in Example 45 except that Co(II)acetylacetonate: Co(CH$_3$COCHCOCH$_3$)$_2$·2H$_2$O (Wako Pure Chemical Industries, Ltd.) was used instead of Co(NO$_3$)$_2$·6H$_2$O in Example 45.

Example 47

<Co/Ba$_{0.1}$La$_{0.45}$Ce$_{0.45}$O$_x$_700° C. Reduction (Co Loading: 10 wt %)>

A Co/Ba$_{0.1}$La$_{0.45}$Ce$_{0.45}$O$_x$_700° C. reduction (Co loading: 10 wt %) was obtained by the same operation as in Example 46 except that Co used was reduced to a half amount in Example 46.

Example 48

<Co/Ba$_{0.1}$La$_{0.45}$Ce$_{0.45}$O$_x$_700° C. Reduction (Co Loading: 30 wt %)>

A Co/Ba$_{0.1}$La$_{0.45}$Ce$_{0.45}$O$_x$_700° C. reduction (Co loading: 30 wt %) was obtained by the same operation as in Example 46 except that Co used was changed to 1.5 times the amount in Example 46.

Example 49

<Co/Ba$_{0.1}$La$_{0.45}$Ce$_{0.45}$O$_x$_500° C. Reduction (Co Loading: 20 wt %)>

A Co/Ba$_{0.1}$La$_{0.45}$Ce$_{0.450}$O$_x$_500° C. reduction (Co loading: 20 wt %) was obtained by the same operation as in Example 45 except that Co(II)acetylacetonate: Co(CH$_3$COCHCOCH$_3$)$_2$·2H$_2$O (Wako Pure Chemical Industries, Ltd.) was used instead of Co(NO$_3$)$_2$·6H$_2$O in Example 45.

Example 50

<Co/Ba$_{0.1}$La$_{0.45}$Ce$_{0.45}$O$_x$_650° C. Reduction (Co Loading: 20 wt %)>

A Co/Ba$_{0.1}$La$_{0.45}$Ce$_{0.45}$O$_x$_650° C. reduction (Co loading: 20 wt %) was obtained by the same operation as in Example 46 except that the holding temperature in the pre-treatment was set to 650° C. in Example 46.

Example 51

<Co/Ba$_{0.1}$La$_{0.45}$Ce$_{0.45}$O$_x$_750° C. Reduction (Co Loading: 20 wt %)>

A Co/Ba$_{0.1}$La$_{0.45}$Ce$_{0.45}$O$_x$_750° C. reduction (Co loading: 20 wt %) was obtained by the same operation as in Example 46 except that the holding temperature in the pre-treatment was set to 750° C. in Example 46.

Example 52

<Co/Ba$_{0.1}$Ce$_{0.45}$Pr$_{0.45}$O$_x$_700° C. Reduction (Co Loading: 20 wt %)>

A Co/Ba$_{0.1}$Ce$_{0.45}$Pr$_{0.45}$O$_x$_700° C. reduction (Co Loading: 20 wt %) was obtained by the same operation as in Example 10 except that Co(NO$_3$)$_2$·6H$_2$O was used instead of Ru and the holding temperature in the pre-treatment was set to 700° C. in Example 10.

Example 53

<Ru/Ce$_{0.85}$La$_{0.15}$O$_x$_500° C. Reduction>

A Ru/Ce$_{0.85}$La$_{0.15}$O$_x$_500° C. reduction was obtained by the same operation as in Example 1 except that the ratio of the raw materials Ce and La was changed in Example 1.

Example 54

<Ru/Ce$_{0.85}$La$_{0.15}$O$_x$_600° C. Reduction>

A Ru/Ce$_{0.85}$La$_{0.15}$O$_x$_600° C. reduction was obtained by the same operation as in Example 54 except that the holding temperature in the pre-treatment was set to 600° C. in Example 53.

Example 55

<Ru/Ce$_{0.85}$La$_{0.15}$O$_x$_650° C. Reduction>

A Ru/Ce$_{0.85}$La$_{0.15}$O$_x$_650° C. reduction was obtained by the same operation as in Example 54 except that the holding temperature in the pre-treatment was set to 650° C. in Example 53.

Example 56

<Ru/Ce$_{0.85}$La$_{0.15}$O$_x$_700° C. Reduction>

A Ru/Ce$_{0.85}$La$_{0.15}$O$_x$_700° C. reduction was obtained by the same operation as in Example 54 except that the holding temperature in the pre-treatment was set to 700° C. in Example 53.

Example 57

<Ru/Ce$_{0.67}$La$_{0.33}$O$_x$_500° C. Reduction>

A Ru/Ce$_{0.67}$La$_{0.33}$O$_x$_500° C. reduction was obtained by the same operation as in Example 53 except that the ratio of the raw material Ce and La was changed in Example 53.

Example 58

<Ru/Ce$_{0.67}$La$_{0.33}$O$_x$_600° C. Reduction>

A Ru/Ce$_{0.67}$La$_{0.33}$O$_x$_600° C. reduction was obtained by the same operation as in Example 57 except that the holding temperature in the pre-treatment was set to 600° C. in Example 57.

Example 59

<Ru/Ce$_{0.67}$La$_{0.33}$O$_x$_650° C. Reduction>

A Ru/Ce$_{0.67}$La$_{0.33}$O$_x$_650° C. reduction was obtained by the same operation as in Example 57 except that the holding temperature in the pre-treatment was set to 650° C. in Example 57.

Example 60

<Ru/Ce$_{0.67}$La$_{0.33}$O$_x$_700° C. Reduction>

A Ru/Ce$_{0.67}$La$_{0.33}$O$_x$_700° C. reduction was obtained by the same operation as in Example 57 except that the holding temperature in the pre-treatment was set to 700° C. in Example 57.

Example 61

<Ru/Ce$_{0.33}$La$_{0.67}$O$_x$_500° C. Reduction>

A Ru/Ce$_{0.33}$La$_{0.67}$O$_x$_500° C. reduction was obtained by the same operation as in Example 53 except that the ratio of the raw material Ce and La was changed in Example 53.

Example 62

<Ru/Ce$_{0.33}$La$_{0.67}$O$_x$_600° C. Reduction>

A Ru/Ce$_{0.33}$La$_{0.67}$O$_x$_600° C. reduction was obtained by the same operation as in Example 61 except that the holding temperature in the pre-treatment was set to 600° C. in Example 61.

Example 63

<Ru/Ce$_{0.33}$La$_{0.67}$O$_x$_650° C. Reduction>

A Ru/Ce$_{0.33}$La$_{0.67}$O$_x$_650° C. reduction was obtained by the same operation as in Example 61 except that the holding temperature in the pre-treatment was set to 650° C. in Example 61.

Example 64

<Ru/Ce$_{0.33}$La$_{0.67}$O$_x$_700° C. Reduction>

A Ru/Ce$_{0.33}$La$_{0.67}$O$_x$_700° C. reduction was obtained by the same operation as in Example 61 except that the holding temperature in the pre-treatment was set to 700° C. in Example 61.

Example 65

<Ru/Ce$_{0.15}$La$_{0.85}$O$_x$_500° C. Reduction>

A Ru/Ce$_{0.15}$La$_{0.85}$O$_x$_500° C. reduction was obtained by the same operation as in Example 53 except that the ratio of the raw material Ce and La was changed in Example 53.

Example 66

<Ru/Ce$_{0.15}$La$_{0.85}$O$_x$_600° C. Reduction>

A Ru/Ce$_{0.15}$La$_{0.85}$O$_x$_600° C. reduction was obtained by the same operation as in Example 65 except that the holding temperature in the pre-treatment was set to 600° C. in Example 65.

Example 67

<Ru/Ce$_{0.15}$La$_{0.85}$O$_x$_650° C. Reduction>

A Ru/Ce$_{0.15}$La$_{0.85}$O$_x$_650° C. reduction was obtained by the same operation as in Example 65 except that the holding temperature in the pre-treatment was set to 650° C. in Example 65.

Example 68

<Ru/Ce$_{0.5}$La$_{0.5}$O$_x$_700° C. Reduction>

A Ru/Ce$_{0.5}$La$_{0.85}$O$_x$_700° C. reduction was obtained by the same operation as in Example 65 except that the holding temperature in the pre-treatment was set to 700° C. in Example 65.

Example 69

<Ru/Ce$_{0.5}$La$_{0.5}$O$_x$_500° C. Reduction>

A Ru/Ce$_{0.5}$La$_{0.5}$O$_x$_500° C. reduction was obtained by the same operation as in Example 53 except that the ratio of the raw material Ce and La was changed and the heating (calcination) temperature was set to 500° C. in the preparation stage of the composite oxide in Example 53.

Example 70

<Ru/Ce$_{0.5}$La$_{0.5}$O$_x$_650° C. Reduction>

A Ru/Ce$_{0.5}$La$_{0.5}$O$_x$_650° C. reduction was obtained by the same operation as in Example 69 except that the holding temperature in the pre-treatment was set to 650° C. in Example 69.

Example 71

<Ru/Ce$_{0.5}$La$_{0.5}$O$_x$_800° C. Reduction>

A Ru/Ce$_{0.5}$La$_{0.5}$O$_x$_800° C. reduction was obtained by the same operation as in Example 69 except that the holding temperature in the pre-treatment was set to 800° C. in Example 69.

The ammonia synthesis activity and physical properties of the metal-supported materials obtained in each Example and Comparative Example were measured. The results are shown in the table below.

TABLE 6

| | Metal-supported material | Calcinating temperature ° C. | Reducing process temperature ° C. | Ammonia yield % | Ammonia generation rate mmol g−1 h−1 | Gas purifier used/unused | Partial negative charge of oxygen | Note |
|---|---|---|---|---|---|---|---|---|
| Example 45 | Co/Ba0.1La0.45Ce0.45Ox | 700 | 700 | 0.75 @400 | 12.0 @400 | + | 0.50-0.57 | Precursor is BaOH, Co precursor is Co nitrate, and Co supporting quantity is 20 wt % |
| Example 46 | Co/Ba0.1La0.45Ce0.45Ox | 700 | 700 | 1.39 @400 | 22.3 @400 | + | 0.50-0.57 | Precursor is BaOH, Co precursor is Co acetylacetonato(II), and Co supporting quantity is 20 wt % |

TABLE 6-continued

| | Metal-supported material | Calcinating temperature ° C. | Reducing process temperature ° C. | Ammonia yield % | Ammonia generation rate mmol g − 1 h − 1 | Gas purifier used/ unused | Partial negative charge of oxygen | Note |
|---|---|---|---|---|---|---|---|---|
| Example 47 | Co/Ba0.1La0.45Ce0.45Ox | 700 | 700 | 1.24 @400 | 19.9 @400 | + | 0.50-0.57 | Precursor is BaOH, Co precursor is Co acetylacetonato(II), and Co supporting quantity is 10 wt % |
| Example 48 | Co/Ba0.1La0.45Ce0.45Ox | 700 | 700 | 1.23 @400 | 19.7 @400 | + | 0.50-0.57 | Precursor is BaOH, Co precursor is Co acetylacetonato(II), and Co supporting quantity is 30 wt % |
| Example 49 | Co/Ba0.1La0.45Ce0.45Ox | 700 | 500 | 0.64 @400 | 10.4 @400 | + | 0.50-0.57 | Precursor is BaOH, Co precursor is Co acetylacetonato(II), and Co supporting quantity is 20 wt % |
| Example 50 | Co/Ba0.1La0.45Ce0.45Ox | 700 | 650 | 1.24 @400 | 19.9 @400 | + | 0.50-0.57 | Precursor is BaOH, Co precursor is Co acetylacetonato(II), and Co supporting quantity is 20 wt % |
| Example 51 | Co/Ba0.1La0.45Ce0.45Ox | 700 | 750 | 1.16 @400 | 18.7 @400 | + | 0.50-0.57 | Precursor is BaOH, Co precursor is Co acetylacetonato(II), and Co supporting quantity is 20 wt % |
| Example 52 | Co/Ba0.1La0.45Pr0.45Ox | 700 | 700 | 1.40 @400 | 22.5 @400 | + | 0.47-0.56 | Precursor is BaOH, Co precursor is Co acetylacetonato(II), and Co supporting quantity is 20 wt % |

TABLE 7

| | Metal-supported material | Calcinating temperature ° C. | Reducing process temperature ° C. | Ammonia yield % | Ammonia generation rate mmol g − 1 h − 1 | Gas purifier used/ unused | Partial negative charge of oxygen | Note |
|---|---|---|---|---|---|---|---|---|
| Example 53 | Ru/Ce0.85La0.15Ox | 700 | 500 | 0.7 | 11.3 | − | 0.50-0.55 | Ru supporting quantity: 5 wt % |
| Example 54 | Ru/Ce0.85La0.15Ox | 700 | 600 | 1.48 | 23.6 | − | 0.50-0.55 | Ru supporting quantity: 5 wt % |
| Example 55 | Ru/Ce0.85La0.15Ox | 700 | 650 | 1.58 | 25.4 | − | 0.50-0.55 | Ru supporting quantity: 5 wt % |
| Example 56 | Ru/Ce0.85La0.15Ox | 700 | 700 | 1.40 | 22.4 | − | 0.50-0.55 | Ru supporting quantity: 5 wt % |
| Example 57 | Ru/Ce0.67La0.33Ox | 700 | 500 | 1.30 | 20.9 | − | 0.52 | Ru supporting quantity: 5 wt % |
| Example 58 | Ru/Ce0.67La0.33Ox | 700 | 600 | 1.74 | 28.1 | − | 0.51-0.56 | Ru supporting quantity: 5 wt % |
| Example 59 | Ru/Ce0.67La0.33Ox | 700 | 650 | 1.93 | 31.1 | − | 0.53 | Ru supporting quantity: 5 wt % |
| Example 60 | Ru/Ce0.67La0.33Ox | 700 | 700 | 1.67 | 26.9 | − | 0.51-0.56 | Ru supporting quantity: 5 wt % |
| Example 61 | Ru/Ce0.33La0.67Ox | 700 | 500 | 1.52 | 24.4 | − | 0.54 | Ru supporting quantity: 5 wt % |
| Example 62 | Ru/Ce0.33La0.67Ox | 700 | 600 | 1.78 | 28.6 | − | 0.53-0.56 | Ru supporting quantity: 5 wt % |

TABLE 7-continued

| | Metal-supported material | Calcinating temperature ° C. | Reducing process temperature ° C. | Ammonia yield % | Ammonia generation rate mmol g−1 h−1 | Gas purifier used/unused | Partial negative charge of oxygen | Note |
|---|---|---|---|---|---|---|---|---|
| Example 63 | Ru/Ce0.33La0.67Ox | 700 | 650 | 2.02 | 32.4 | − | 0.54 | Ru supporting quantity: 5 wt % |
| Example 64 | Ru/Ce0.33La0.67Ox | 700 | 700 | 1.67 | 26.8 | − | 0.53-0.56 | Ru supporting quantity: 5 wt % |
| Example 65 | Ru/Ce0.15La0.85Ox | 700 | 500 | 1.31 | 21.0 | − | 0.55-0.56 | Ru supporting quantity: 5 wt % |
| Example 66 | Ru/Ce0.15La0.85Ox | 700 | 600 | 1.67 | 26.7 | − | 0.55-0.56 | Ru supporting quantity: 5 wt % |
| Example 67 | Ru/Ce0.15La0.85Ox | 700 | 650 | 1.82 | 29.3 | − | 0.55-0.56 | Ru supporting quantity: 5 wt % |
| Example 68 | Ru/Ce0.15La0.85Ox | 700 | 700 | 1.72 | 2.45 | − | 0.55-0.56 | Ru supporting quantity: 5 wt % |
| Example 69 | Ru/Ce0.5La0.5Ox | 600 | 500 | 1.55 | 24.8 | + | 0.52-0.56 | Ru supporting quantity: 5 wt % |
| Example 70 | Ru/Ce0.5La0.5Ox | 600 | 650 | 1.63 | 26.0 | + | 0.52-0.56 | Ru supporting quantity: 5 wt % |
| Example 71 | Ru/Ce0.5La0.5Ox | 600 | 800 | 1.06 | 17.1 | + | 0.52-0.56 | Ru supporting quantity: 5 wt % |

TABLE 8

| | Metal-supported material | Specific surface area m² g−1 | Ru dispersion degree ($D_{ads}$) | Ru average particle diameter (d) nm | Ru dispersion degree ($D_{TEM}$) | $D_{ads}/D_{TEM}$ | TOF S−1 | Reducing degree of $Ce^{4+}$ ratio of $Ce^{3+}$) % |
|---|---|---|---|---|---|---|---|---|
| Example 45 | Co/Ba0.1La0.45Ce0.45Ox | | | | | | | |
| Example 46 | Co/Ba0.1La0.45Ce0.45Ox | 19.3 | | | | | | |
| Example 47 | Co/Ba0.1La0.45Ce0.45Ox | | | | | | | |
| Example 48 | Co/Ba0.1La0.45Ce0.45Ox | | | | | | | |
| Example 49 | Co/Ba0.1La0.45Ce0.45Ox | | | | | | | |
| Example 50 | Co/Ba0.1La0.45Ce0.45Ox | | | | | | | |
| Example 51 | Co/Ba0.1La0.45Ce0.45Ox | | | | | | | |
| Example 52 | Co/Ba0.1La0.45Ce0.45Ox | 15.3 | | | | | | |
| Example 53 | Ru/Ce0.85La0.15Ox | | | | | | | |
| Example 54 | Ru/Ce0.85La0.15Ox | | | | | | | |
| Example 55 | Ru/Ce0.85La0.15Ox | | | | | | | |
| Example 56 | Ru/Ce0.85La0.15Ox | | | | | | | |
| Example 57 | Ru/Ce0.67La0.33Ox | | 0.45 | | | | 0.026 | 27 |
| Example 58 | Ru/Ce0.67La0.33Ox | | | | | | | |
| Example 59 | Ru/Ce0.67La0.33Ox | | 0.35 | | | | 0.05 | 43 |
| Example 60 | Ru/Ce0.67La0.33Ox | | | | | | | |
| Example 61 | Ru/Ce0.33La0.67Ox | | 0.30 | | | | 0.046 | 23 |
| Example 62 | Ru/Ce0.33La0.67Ox | | | | | | | |
| Example 63 | Ru/Ce0.33La0.67Ox | | 0.37 | | | | 0.049 | 47 |
| Example 64 | Ru/Ce0.33La0.67Ox | | | | | | | |
| Example 65 | Ru/Ce0.15La0.85Ox | | | | | | | |
| Example 66 | Ru/Ce0.15La0.85Ox | | | | | | | |

TABLE 8-continued

| Metal-supported material | Specific surface area $m^2 g^{-1}$ | Ru dispersion degree ($D_{ads}$) | Ru average particle diameter (d) nm | Ru dispersion degree ($D_{TEM}$) | $D_{ads}/D_{TEM}$ | TOF $S^{-1}$ | Reducing degree of $Ce^{4+}$ ratio of $Ce^{3+}$) % |
|---|---|---|---|---|---|---|---|
| Example 67 | Ru/Ce0.15La0.85Ox | | | | | | |
| Example 68 | Ru/Ce0.15La0.85Ox | | | | | | |
| Example 69 | Ru/Ce0.5La0.5Ox | 0.40 | | | | 0.035 | |
| Example 70 | Ru/Ce0.5La0.5Ox | 0.24 | | | | 0.061 | |
| Example 71 | Ru/Ce0.5La0.5Ox | 0.04 | | | | 0.240 | |

Comparative Example 4

<Ru/La$_2$O$_3$_500° C. Reduction>

La$_2$O$_3$ was synthesized using a reverse homogeneous precipitation method as follows. La(NO$_3$)$_3$·6H$_2$O (Wako Pure Chemical Industries, Ltd.) was dissolved in purified water (Takasugi Pharmaceutical Co., Ltd.) to obtain an aqueous La(NO$_3$)$_3$ solution. Then, 250 mL of a support precursor solution containing 0.0625 mol of La in total was prepared. A 28% NH$_3$ aqueous solution (250 mL) (Wako Pure Chemical Industries. Ltd.) was added to a 1000 mL beaker, and the support precursor solution was added thereto all at once while stirring at 320 rpm with a magnetic stirrer and stirring was continued for 1 hour. Thereafter, the mixture was left to stand for 30 minutes. 350 mL of the supernatant was removed, and 350 mL of ion exchange water was added, followed by stirring for 30 minutes. A series of operations was performed four times, the precipitate was filtered and dried at 80° C. for 15 hours using an oven. The dried precipitate was pulverized in a mortar, and the obtained powder was heated in an air atmosphere at 700° C. for 5 hours using an electric furnace to obtain La$_2$O$_3$. Ru was supported by the same operation as in Example 1, and a reduction treatment was performed by the same operation as in Example 1, thereby to obtain Ru/La$_2$O$_3$_500° C. reduction.

Comparative Example 5

<Ru/CeO$_x$_500° C. Reduction>

CeO$_2$ composite oxide was synthesized using a reverse homogeneous precipitation method as follows. Ce(NO$_3$)$_3$·6H$_2$O (Kanto Kagaku) was dissolved in purified water to obtain an aqueous Ce(NO$_3$)$_3$ solution. The aqueous Ce(NO$_3$)$_3$ solution was mixed to prepare 250 mL of a support precursor solution containing 0.0625 mol of Ce in total. A 28% NH$_3$ aqueous solution (250 mL) (Wako Pure Chemical Industries. Ltd.) was added to a 1000 mL beaker, and the support precursor solution was added thereto all at once while stirring at 320 rpm with a magnetic stirrer and stirring was continued for 1 hour. Thereafter, the mixture was left to stand for 30 minutes, 350 mL of the supernatant was removed. 350 mL of ion exchange water was added and stirring was performed for 30 minutes. A series of operations was carried out four times and the precipitates were filtered and dried at 80° C. for 15 hours using an oven. The dried precipitate was pulverized in a mortar, and the obtained powder was heated in an air atmosphere at 700° C. for 5 hours using an electric furnace to obtain CeO$_2$. Ru was supported by the same operation as in Example 1, and a reduction treatment was performed by the same operation as in Example 1 to obtain a Ru/CeO$_x$_500° C. reduction.

Comparative Example 6

<Ru/CeO$_2$_650° C. Reduction>

A Ru/CeO$_2$_650° C. reduction was obtained by the same operation as in Comparative Example 5 except that the holding temperature in the pre-treatment was set to 650° C. in Comparative Example 5.

Example 75

<Ru/La$_{0.5}$Pr$_{0.5}$O$_x$_450° C. Reduction>

A Ru/La$_{0.5}$Pr$_{0.5}$O$_x$_450° C. reduction was obtained by the same operation as in Example 5 except that the holding temperature in the pre-treatment was set to 450° C. in Example 5.

Example 76

<Ru/La$_{0.5}$Pr$_{0.5}$O$_{1.75}$_500° C. Reduction>

A Ru/La$_{0.5}$Pr$_{0.5}$O$_x$_500° C. reduction was obtained by the same operation as in Example 5 except that the holding temperature in the pre-treatment was set to 500° C. in Example 5.

Example 78

<Ru/La$_{0.5}$Pr$_{0.5}$O$_x$_700° C. Reduction>

A Ru/La$_{0.5}$Pr$_{0.5}$O$_x$_700° C. reduction was obtained by the same operation as in Example 5 except that the holding temperature in the pre-treatment was set to 70° C. in Example 5.

Comparative Example 8

<Ru/MgO_700° C. Reduction>

A Ru/MgO_700° C. reduction was obtained by a reduction treatment which was performed by the same operation as in Example 1 except that a high-purity MgO (500A, Ube Industries, Ltd.) was calcined in air at 700° C. for 5 hours, and used for Ru to be supported thereon by the same operation as Example 1, and the holding temperature was set to 700° C.

Example 80

<8.4 wt % Ba/4.5 wt % Ru/MgO_500° C. Reduction>
<Preparation of Catalyst>

After obtaining Ru/MgO by the method described in Comparative Example 8, Ba(OH)$_2$8H$_2$O was used as a raw material to the Ru/MgO metal-supported material and Ba was supported by the evaporation to dryness method so that the amount of the material was 1.37 times the amount of Ru.

<Hydrogen Pre-reduction Treatment>

An 8.4 wt % Ba/4.5 wt % Ru/MgO_500° C. reduction was obtained by the same operation as in Example 1 except that the holding temperature in the pre-treatment was set to 500° C. in Example 1.

Example 81

<8.4 wt % Ba/4.5 wt % Ru/MgO_700° C. Reduction>

An 8.4 wt % Ba/4.5 wt % Ru/MgO_700° C. reduction was obtained by the same operation as in Example 80 except that the holding temperature in the pre-treatment was set to 700° C. in Example 80.

Example 82

<Ru/$Ce_{0.5}Pr_{0.5}O_x$_500° C. Reduction>

A Ru/$Ce_{0.5}Pr_{0.5}O_x$_500° C. reduction was obtained by the same operation as in Example 1 except that $Pr(NO_3)_3 \cdot 6H_2O$ was used instead of the raw material $La(NO_3)_3 \cdot 6H_2O$ in Example 1.

Example 83

<Ru/$Ce_{0.5}Pr_{0.5}O_x$_600° C. Reduction>

A Ru/$Ce_{0.5}Pr_{0.5}O_x$_600° C. reduction was obtained by the same operation as in Example 82 except that the holding temperature in the pre-treatment was set to 600° C. in Example 82.

Example 84

<Ru/$Ce_{0.5}Pr_{0.5}O_x$_650° C. Reduction>

A Ru/$Ce_{0.5}Pr_{0.5}O_2$_650° C. reduction was obtained by the same operation as in Example 82 except that the holding temperature in the pre-treatment was set to 650° C. in Example 82.

Example 85

<Ru/$Ce_{0.5}Pr_{0.5}O_x$_700° C. Reduction>

A Ru/$Ce_{0.5}Pr_{0.5}O_x$_700° C. reduction was obtained by the same operation as in Example 82 except that the holding temperature in the pre-treatment was set to 700° C. in Example 82.

Example 86

<Ru/$Ce_{0.5}Pr_{0.5}O_x$_800° C. Reduction>

A Ru/$Ce_{0.5}Pr_{0.5}O_x$_800° C. reduction was obtained by the same operation as in Example 82 except that the holding temperature in the pre-treatment was set to 800° C. in Example 82.

Example 87

<Ru/$Ce_{0.5}Pr_{0.5}O_x$_500° C. Reduction>

A Ru/$Ce_{0.5}Pr_{0.5}O_x$_500° C. reduction was obtained by the same operation as in Example 1 except that the heating (calcination) temperature was set to 800° C. in the preparation stage of the composite oxide in Example 1 and a gas purifier was used in the same operation as in Example 20.

Example 88

<Ru/$Ce_{0.5}La_{0.5}O_x$_650° C. Reduction>

A Ru/$Ce_{0.5}La_{0.5}O_x$_650° C. reduction was obtained by the same operation as in Example 87 except that the holding temperature in the pre-treatment was set to 650° C. in Example 87.

Example 89

<Ru/$Ce_{0.5}La_{0.5}O_x$_800° C. Reduction>

A Ru/$Ce_{0.5}La_{0.5}O_x$_800° C. reduction was obtained by the same operation as in Example 87 except that the holding temperature in the pre-treatment was set to 800° C. in Example 87.

Example 90

<Fe/$Ba_{0.1}La_{0.45}Ce_{0.45}O_x$_700° C. Reduction>

A Fe/$Ba_{0.1}La_{0.45}Ce_{0.45}O_x$_700° C. reduction was obtained by the same operation as in Example 20 except that tris(2,4-pentanedionato)iron(III)($Fe(acac)_3$) was used instead of Ru as a raw material, and the holding temperature in the pre-treatment was set to 700° C. in Example 20.

Example 91

<Fe/$Ba_{0.1}La_{0.45}Ce_{0.45}O_x$_700° C. Reduction>

A Fe/$Ba_{0.1}La_{0.45}Ce_{0.45}O_x$_700° C. reduction was obtained by the same operation as in Example 90 except that dodecacarbonyl iron ($Fe_3(CO)_{12}$) was used instead of $Fe(acac)_3$ as the raw material in Example 90.

Example 92

<Co-Fe/$Ba_{0.1}La_{0.45}Ce_{0.45}O_x$_700° C. Reduction>

A Co—Fe/$Ba_{0.1}La_{0.45}Ce_{0.45}O_x$_700° C. reduction was obtained by the same operation as in Example 90 except that $Co(NO_3)_2 \cdot 6H_2O$ was used as the raw material in addition to $Fe(acac)_3$ in Example 90.

Example 93

<Co-Fe/$Ba_{0.1}La_{0.45}Ce_{0.45}O_x$_750° C. Reduction>

A Co—Fe/$Ba_{0.1}La_{0.45}Ce_{0.45}O_x$_750° C. reduction was obtained by the same operation as in Example 92 except that the holding temperature in the pre-treatment was set to 750° C. in Example 92.

Example 94

<Ru/$Ba_{0.1}La_{0.3}Ce_{0.6}O_x$_700° C. Reduction>

A Ru/$Ba_{0.1}La_{0.3}Ce_{0.6}O_x$_700° C. reduction was obtained by the same operation as in Example 23 except that the blending amounts of La and Ce were changed in Example 23.

Example 95

<Ru/$Ba_{0.1}La_{0.6}Ce_{0.3}O_x$_700° C. Reduction>

A Ru/$Ba_{0.1}La_{0.6}Ce_{0.3}O_x$_700° C. reduction was obtained by the same operation as in Example 94 except that the blending amounts of La and Ce were changed in Example 94.

Example 96

<Ru/Ba$_{0.1}$La$_{0.5}$Ce$_{0.1}$O$_x$_700° C. Reduction>

A Ru/Ba$_{0.1}$La$_{0.5}$Ce$_{0.1}$O$_x$_700° C. reduction was obtained by the same operation as in Example 94 except that the blending amounts of La and Ce were changed in Example 94.

Example 97

<Ru/Ba$_{0.1}$La$_{0.45}$Ce$_{0.45}$O$_x$_500° C. Reduction>
<Hydrogen Pre-reduction Treatment>

A Ru/Ba$_{0.1}$La$_{0.45}$Ce$_{0.45}$O$_x$_500° C. reduction was obtained by the same operation as in Example 20 except that the holding time in the pre-treatment was set to 48 hours in Example 20.

Example 98

<Ru/Ba$_{0.1}$La$_{0.45}$Ce$_{0.45}$O$_x$_450° C._72 Hours Reduction>
<Hydrogen Pre-Reduction Treatment>

A Ru/Ba$_{0.1}$La$_{0.45}$Ce$_{0.450}$O$_x$_450° C._72 hours reduction was obtained by the same operation as in Example 20 except that the holding temperature in the pre-treatment was set to 450° C. and the holding time was set to 72 hours in Example 20.

Example 99

<Ru/Ce$_{0.5}$La0.5O$_x$_500° C._48 Hours Reduction>
<Hydrogen Pre-reduction Treatment>

A Ru/Ce$_{0.5}$La$_{0.5}$O$_x$_500° C._48 hours reduction was obtained by the same operation as in Example 1 except that a gas generator was used and the holding time in the pre-treatment was set to 48 hours in Example 1.

The ammonia synthesis activity and physical properties of the metal-supported materials obtained in each Example and Comparative Example were measured. The results are shown in the table below.

TABLE 9

| | Metal-supported material | Calcinating temperature ° C. | Reducing process temperature ° C. | Ammonia yield % | Ammonia generation rate mmol g − 1 h − 1 | Gas purifier used/ unused | Partial negative charge of oxygen | Note |
|---|---|---|---|---|---|---|---|---|
| Comparative example 4 | Ru/La2O3 | 700 | 500 | 0.66 | 10.6 | − | 0.56 | Ru supporting quantity: 5 wt % |
| Comparative example 5 | Ru/CeOx | 700 | 500 | 0.80 | 12.8 | − | 0.49-0.55 | Ru supporting quantity: 5 wt % |
| Comparative example 6 | Ru/CeOx | 700 | 650 | 1.07 | 17.2 | − | 0.49-0.55 | Ru supporting quantity: 5 wt % |
| Example 75 | Ru/La0.5Pr0.5Ox | 700 | 450 | 0.43 | 6.9 | − | 0.52-0.55 | Ru supporting quantity: 5 wt % |
| Example 76 | Ru/La0.5Pr0.5Ox | 700 | 500 | 1.20 | 19.3 | − | 0.55 | Ru supporting quantity: 5 wt % |
| Example 78 | Ru/La0.5Pr0.5Ox | 700 | 700 | 1.22 | 19.7 | − | 0.55 | Ru supporting quantity: 5 wt % |
| Comparative example 6 | Ru/MgO | 700 | 500 | 0.06 | 0.9 | + | 0.42 | Ru supporting quantity: 5 wt % |
| Example 80 | 8.4 wt % Ba/4.5 wt % Ru/MgO | 700 | 500 | 0.52 | 8.3 | + | 0.42-0.43 | Ru supporting quantity: 5 wt % |
| Example 81 | 8.4 wt % Ba/4.5 wt % Ru/MgO | 700 | 700 | 1.62 | 25.9 | + | 0.42-0.43 | Ru supporting quantity: 5 wt % |
| Example 82 | Ru/Ce0.5Pr0.5Ox | 700 | 500 | 1.29 | 20.7 | + | | Ru supporting quantity: 5 wt % |
| Example 83 | Ru/Ce0.5Pr0.5Ox | 700 | 500 | 1.63 | 26.2 | + | | Ru supporting quantity: 5 wt % |
| Example 84 | Ru/Ce0.5Pr0.5Ox | 700 | 650 | 1.76 | 28.2 | + | | Ru supporting quantity: 5 wt % |
| Example 85 | Ru/Ce0.5Pr0.5Ox | 700 | 700 | 1.69 | 27.2 | + | | Ru supporting quantity: 5 wt % |
| Example 86 | Ru/Ce0.5Pr0.5Ox | 700 | 800 | 1.35 | 21.7 | + | | Ru supporting quantity: 5 wt % |
| Example 87 | Ru/Ce0.5La0.5Ox | 800 | 500 | 1.55 | 24.8 | + | | Ru supporting quantity: 5 wt % |

TABLE 9-continued

| | Metal-supported material | Calcinating temperature °C. | Reducing process temperature °C. | Ammonia yield % | Ammonia generation rate mmol g−1 h−1 | Gas purifier used/ unused | Partial negative charge of oxygen | Note |
|---|---|---|---|---|---|---|---|---|
| Example 88 | Ru/Ce0.5La0.5Ox | 800 | 550 | 1.86 | 29.7 | + | | Ru supporting quantity: 5 wt % |
| Example 89 | Ru/Ce0.5La0.5Ox | 800 | 300 | 1.46 | 23.3 | + | | Ru supporting quantity: 5 wt % |

TABLE 10

| | Metal-supported material | Calcinating temperature °C. | Reducing process temperature °C. | Ammonia yield % | Ammonia generation rate mmol g−1 h−1 | Gas purifier used/ unused | Partial negative charge of oxygen | Note |
|---|---|---|---|---|---|---|---|---|
| Example 90 | Fe/Ba0.1La0.45Ce0.45Ox | 700 | 700 | 0.605 @400 | 9.72 @400 | + | | Precursor is BaOH, Fe precursor is Fe(acac)$_3$, and Fe supporting quantity is 20 wt % |
| Example 91 | Fe/Ba0.1La0.45Ce0.45Ox | 700 | 700 | 0.173 @400 | 2.77 @400 | + | | Precursor is BaOH, Fe precursor is Fe$_3$(CO)$_{12}$, and Fe supporting quantity is 20 wt % |
| Example 92 | Co-Fe/Ba0.1La0.45Ce0.45Ox | 700 | 700 | 0.90 @400 | 14.4 @400 | + | | Precursor is BaOH, Co and Fe precursor is Fe(acac)$_3$, and Co and Fe supporting quantity is 10 wt % each |
| Example 93 | Co-Fe/Ba0.1La0.45Ce0.45Ox | 700 | 750 | 1.02 @400 | 16.4 @400 | + | | Precursor is BaOH, Co and Fe precursor is Fe(acac)$_3$, and Co and Fe supporting quantity is 10 wt % each |
| Example 94 | Ru/Ba0.1La0.3Ce0.6Ox | 700 | 700 | 2.38 | 38.2 | + | | Ru supporting quantity is 5 wt %, and precursor is BaOH |
| Example 95 | Ru/Ba0.1La0.6Ce0.6Ox | 700 | 700 | 2.88 | 46.3 | + | | Ru supporting quantity is 5 wt %, and precursor is BaOH |
| Example 96 | Ru/Ba0.1La0.8Ce0.6Ox | 700 | 700 | 2.5 | 40.2 | + | | Ru supporting quantity is 5 wt %, and precursor is BaOH |
| Example 97 | Ru/Ba0.1/La0.45Ce0.45Ox | 700 | 500 (48 h) | 3.26 | 52.3 | + | 0.50-0.57 | Ru supporting quantity: 5 wt %, activity at 350° C. |
| Example 98 | Ru/Ba0.1/La0.45Ce0.45Ox | 700 | 450 (72 h) | 2.75 | 44.3 | | 0.50-0.57 | Ru supporting quantity: 5 wt %, activity at 350° C. |

TABLE 10-continued

| Metal-supported material | Calcinating temperature ° C. | Reducing process temperature ° C. | Ammonia yield % | Ammonia generation rate mmol g − 1 h − 1 | Gas purifier used/ unused | Partial negative charge of oxygen | Note |
|---|---|---|---|---|---|---|---|
| Example 99 | Ru/Ce0.5La0.5Ox | 700 | 500 (48 h) | 2.15 | 34.5 | + | 0.52-0.56 | Ru supporting quantity: 5 wt %, activity at 350° C. |

TABLE 11

| | Metal-supported material | Specific surface area m$^2$ g$^{-1}$ | Ru dispersion degree (D$_{ads}$) | Ru average particle diameter (d) nm | Ru dispersion degree (D$_{TEM}$) | D$_{ads}$/ D$_{TEM}$ | TOF S$^{-1}$ | Reducing degree of Ce$^{4+}$ ratio of Ce$^{3+}$) % |
|---|---|---|---|---|---|---|---|---|
| Comparative example 4 | Ru/La2O3 | 18 | 0.13 | | | | 0.046 | |
| Comparative example 5 | Ru/CeOx | 24 | 0.27 | | | | 0.027 | |
| Comparative example 6 | Ru/CeOx | 20 | 0.17 | | | | 0.057 | |
| Example 75 | Ru/La0.5Pr0.5Ox | | | | | | | |
| Example 76 | Ru/La0.5Pr0.5Ox | 30 | 0.22 | | | | 0.156 | 100 |
| Example 78 | Ru/La0.5Pr0.5Ox | | | | | | | 100 |
| Comparative example 8 | Ru/MgO | | | | | | | |
| Example 80 | 8.4 wt % Ba/4.5 wt % Ru/MgO | | | | | | | |
| Example 81 | 8.4 wt % Ba/4.5 wt % Ru/MgO | | | | | | | |
| Example 82 | Ru/Ce0.5Pr0.5Ox | | | | | | | |
| Example 83 | Ru/Ce0.5Pr0.5Ox | | | | | | | |
| Example 84 | Ru/Ce0.5Pr0.5Ox | | | | | | | |
| Example 85 | Ru/Ce0.5Pr0.5Ox | | | | | | | |
| Example 86 | Ru/Ce0.5Pr0.5Ox | | | | | | | |
| Example 87 | Ru/Ce0.5Pr0.5Ox | | | | | | | |
| Example 88 | Ru/Ce0.5Pr0.5Ox | | | | | | | |
| Example 89 | Ru/Ce0.5Pr0.5Ox | | | | | | | |
| Example 90 | Fe/Ba0.1La0.45Ce0.45Ox | | | | | | | |
| Example 91 | Fe/Ba0.1La0.45Ce0.45Ox | | | | | | | |
| Example 92 | Co-Fe/Ba0.1La0.45 Ce0.45Ox | | | | | | | |
| Example 93 | Co-Fe/Ba0.1La0.45 Ce0.45Ox | | | | | | | |
| Example 94 | Ru/Ba0.1La0.3Ce0.6Ox | | | | | | | |
| Example 95 | Ru/Ba0.1La0.6Ce0.3Ox | | | | | | | |
| Example 96 | Ru/Ba0.1La0.8Ce0.1Ox | | | | | | | |
| Example 97 | Ru/Ba0.1La0.45 Ce0.45Ox | | | | | | | |
| Example 98 | Ru/Ba0.1La0.45 Ce0.45Ox | | | | | | | |
| Example 99 | Ru/Ce0.5La0.5Ox | | | | | | | |

<Confirmation of Solid Solution State of Support>

Figure 6:
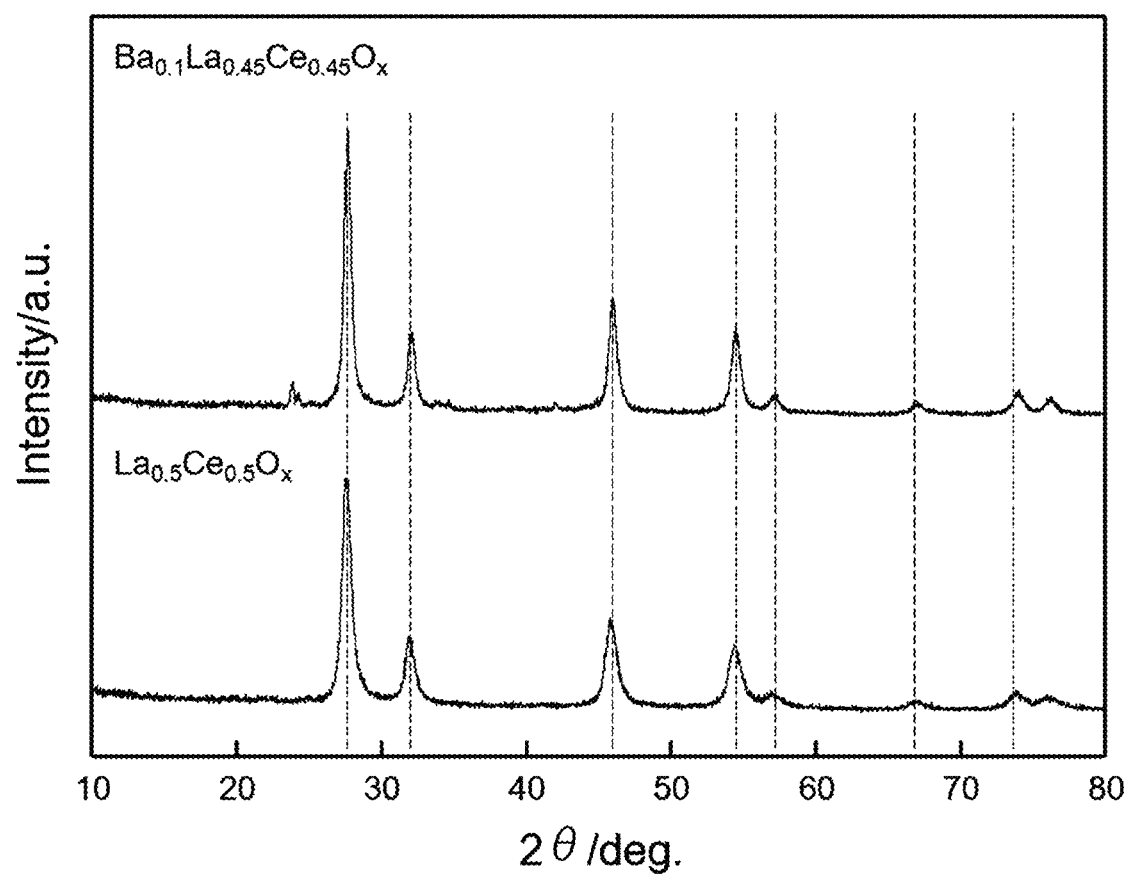
FIG. 6 is an XRD pattern of $Ru/Ba_{0.1}La_{0.45}Ce_{0.45}O$ and $Ru/La_{0.5}C_{0.5}O_x$.

FIG. 6 shows XRD patterns of Ru/Ba$_{0.1}$La$_{0.45}$Ce$_{0.45}$O$_x$ (Example 6) and Ru/La$_{0.5}$Ce$_{0.5}$O$_x$ (Example 2). As shown in the figure, the position of the main diffraction peak of Ba$_{0.1}$La$_{0.45}$Ce$_{0.45}$O$_x$ is completely the same as that of La$_{0.5}$Ce$_{0.5}$O$_x$. If part or all of Ba forms a solid solution with La and Ce, the position of the main diffraction peak of Ba$_{0.1}$La$_{0.45}$Ce$_{0.45}$O$_x$ should move to the low angle side because Ba with a large ionic radius exists in the lattice. Therefore, this means that Ba does not form a solid solution with La or Ce.

Figure 7:
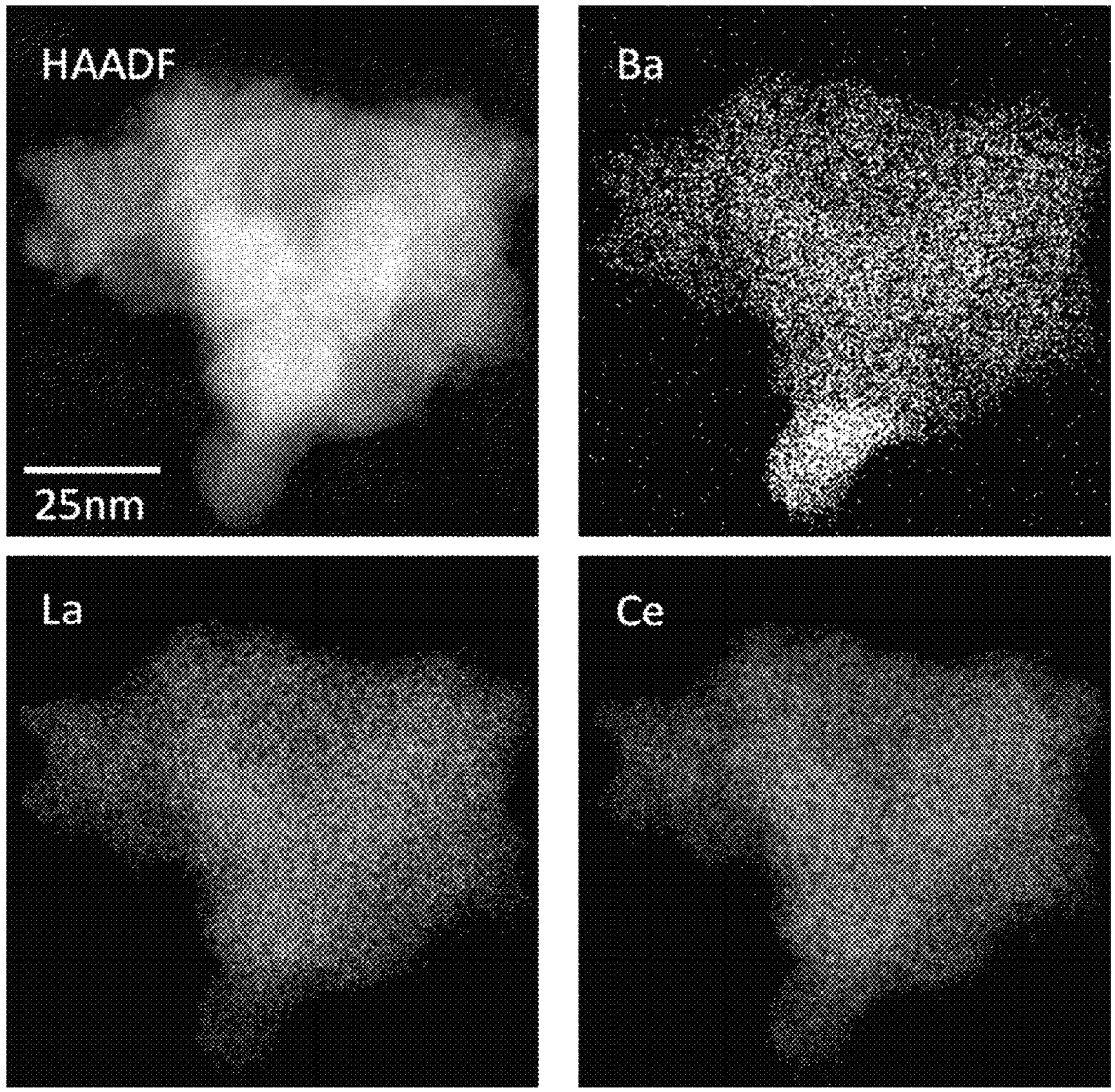
FIG. 7 is an image obtained by analyzing the surface of $Ru/Ba_{0.1}La_{0.45}Ce_{0.45}O_x$ by fluorescent X-ray analysis using a transmission electron aberration-corrected microscope.

FIG. 7 shows the result of analyzing the surface of the catalyst of Example 6 (Ru/Ba$_{0.1}$La$_{0.45}$*Ce$_{0.45}$O$_x$, reduced at 650° C.) by fluorescent X-ray analysis using a transmission electron aberration-corrected microscope. Here, the composition of Ba, La, and Ce on the catalyst surface is analyzed, and the shading is shown in light and dark. That is, the higher the concentration of each element is, the brighter it is displayed on the figure. As can be seen from the figure, catalyst particles of La and Ce have almost no shading, indicating that La and Ce are uniformly present in the catalyst particles.

On the other hand. Ba is clearly present with shading, and it is found that, for example, the central region under the analysis field is distributed at a particularly high concentration. From the above results, it is understood that Ba does not form a solid solution with La and Ce.

Example of Co/LaBaOx (Cobalt/Binary Support)
<Measurement of Ammonia Synthesis Activity>

The ammonia synthesis activity of the metal-supported material was measured using a fixed bed flow type reactor. $H_2$, $N_2$, and Ar (all are 99.995% pure, manufactured by Fukuoka Oxygen Co., Ltd.) to be used were all purified to a purity of 99.99999999% or more using a purifier (gas purification filter MC50-904F, manufactured by SAES) to remove impurities such as moisture and oxygen, and then purified gases were used. While Ar was circulated through the metal-supported material which was pre-treated by the method described in Examples described later, the metal-supported material was left to cool to 300° C. While maintaining the temperature of the metal-supported material at 300° C., the pressure was increased to 0.1 MPa, 1.0 MPa, or 3.0 MPa with a back pressure valve at the outlet of the reaction tube with supplying Ar. Each Example was performed at 1.0 MPa unless otherwise specified.

The circulation of Ar was stopped, and $H_2$ and $N_2$ were circulated at 90 mL min$^{-1}$ and 30 mL min$^{-1}$ (space velocity 72 L h$^{-1}$g$^{-1}$), respectively, while maintaining the pressure, and transferred to the reaction atmosphere. Depending on the height of the $NH_3$ synthesis activity, 200 mL of 1 to 100 mM (1, 5, 10, 25, 100 mM) aqueous sulfuric acid solution was added to a three-necked flask connected to an electric conductivity meter, and a mixed gas containing hydrogen, nitrogen, and $NH_3$ flowing out of the reaction tube outlet was bubbled into the aqueous sulfuric acid solution. At this time, the amount of ammonia produced in the outlet gas was quantified by measuring the change in conductivity caused by the reaction between $NH_3$ and sulfuric acid. Next, the metal-supported material layer was heated up to 350° C. or 400° C. When the temperature of the metal-supported material layer was stabilized at 350° C. or 400° C., such layer was left to stand for 10 minutes, and the amount of ammonia produced was quantified by the same method as described above. Using this amount of ammonia produced for 10 minutes and the amount of catalyst used, the ammonia production rate of per unit catalyst weight was determined.

<Powder X-ray Diffraction>

The powder X-ray diffraction pattern of the metal-supported material (catalyst) was measured with a SmartLab x-ray diffractometer (Rigaku Corporation).

<Observation of Transmission Electron Microscope Image>

A high-angle annular dark field scanning transmission electron microscope (HAADF-STEM) image with a high-resolution was obtained with a JEM-ARM200CF atomic resolution microscope (JEOL). Further, the electron energy loss (EEL) spectrum was measured for the same field of view, and the distribution of the elements on the catalyst surface was observed by mapping the EEL spectrum intensity specific to each element. The measurement was performed by using a holder that can be operated without exposing the sample to the atmosphere and preventing exposure to the atmosphere during from sample pre-treatment to introduction of the sample into the electron microscope lens barrel.

<Specific Surface Area>

The specific surface area of the metal-supported material was determined by the BET method from the amount of nitrogen adsorbed at 77K using a BEL-sorp mini (Nippon Bell KK). Before the measurement, vacuum heating at 300° C. was performed for 2 hours as a pre-treatment.

<Measurement of Chemical Adsorption Amount>

The Co dispersity of the metal-supported material was determined by the $H_2$ pulse chemisorption method. The metal-supported material was heated to 500 to 800° C. under a flow of 60 mL min$^{-1}$ $H_2$ and subjected to a reduction treatment for 1 hour. The flow of $H_2$ was stopped, and Ar was circulated at 30 mL min$^{-1}$ for 0.5 hours. Thereafter, the catalyst layer was cooled to 25° C. while supplying Ar, and a predetermined amount of $H_2$ was supplied in a pulse shape while maintaining this temperature, and the amount of decrease in hydrogen derived from the adsorption of the metal-supported material was measured. From this decreased amount, the ratio (H/Co) of the number H of hydrogen atoms corresponding to the number of Co exposed on the surface of the metal-supported material and the total number Co of cobalt atoms supported on the metal-supported material was determined. Based on this ratio. $D_{ads}$ was also determined.

<TOF>

Using H/Co obtained by the above method, a surface exposed Co number per unit weight of catalyst was determined as the number of active sites. The number of ammonia molecules produced per second per surface Co atom which is an active site was determined by dividing the production rate of ammonia per catalyst weight at 350° C. and 1.0 MPa by the surface exposed Co number.

Example 101: Compound in which Element A is La and Element X is Ba

<Co/Ba$_{0.05}$La$_{0.95}$O$_x$_700° C. reduction (synonymous with "Co/La$_{0.95}$Ba$_{0.05}$O$_x$_700° C. reduction")>
<Preparation of Composite Oxide>

Ba$_{0.05}$La$_{0.95}$O$_x$ was synthesized as follows using a precipitation method and an impregnation method. La(NO$_3$)$_3$·6H$_2$O (Wako Pure Chemical Industries. Ltd.) was dissolved in purified water to obtain an aqueous La(NO$_3$)$_3$ solution. A support precursor solution (250 mL) containing 0.0625 mol of La in total was prepared. A 28% $NH_3$ aqueous solution (250 mL) (Wako Pure Chemical Industries. Ltd.) was added to a 1000 mL beaker, and the support precursor solution was added thereto all at once while stirring at 320 rpm with a magnetic stirrer and stirring was continued for 1 hour. Thereafter, the mixture was left to stand for 12 hours, and precipitate (1) was separated by suction filtration. Ion exchange water (350 mL) was added to the separated precipitate (1), and the mixture was stirred for 30 minutes to wash the precipitate, and the precipitate (1) was separated by suction filtration. This washing operation was performed three times.

Ba(OH)$_2$ was dissolved in purified water to obtain an aqueous Ba(OH)$_2$ solution. A support precursor solution (250 mL) containing 0.0625 mol of Ba in total was prepared. The collected precipitate (1) was put into the aqueous Ba(OH)$_2$ solution and held for about 1 hour while stirring at 320 rpm using a magnetic stirrer. Then, after removing moisture using a rotary evaporator, the precipitate was dried at 80° C. for 15 hours using an oven. The dried precipitate was pulverized in a mortar, and the obtained powder was heated at 700° C. for 5 hours in an air atmosphere using an electric furnace to obtain a support Ba$_{0.05}$La$_{0.95}$O$_x$.

<Supporting of Co>

Co was supported on the support Ba$_{0.05}$La$_{0.95}$O$_x$ by the impregnation method. A tetrahydrofuran (THF) (Wako Pure Chemical Industries. Ltd.) solution in which a Co precursor acetylacetonatocobalt(II) (Wako Pure Chemical Industries. Ltd.) was dissolved was prepared in a 200 mL eggplant flask. To the flask was added 3 g of the support, and the mixture was stirred for 18 hours or more. Note that the amounts of acetylacetonatocobalt(II) and the support used were appropriately adjusted so that the amount of Co contained in the catalyst after heating in the following argon atmosphere was 20% by weight. The suspension after stirring was evaporated to dryness under reduced pressure using a rotary evaporator at 35° C. and 0.3 atm, and then dried at 80° C. for 18 hours using an oven. The obtained powder was heated at 500° C. for 5 hours using a tubular electric furnace under an argon flow of 25 mL min$^{-1}$ to remove the acetylacetonate ligand in the precursor. By the above operation, a $Co/Ba_{0.05}La_{0.95}O_x$ metal-supported material was obtained.

<Hydrogen Pre-reduction Treatment>

The $Co/Ba_{0.05}La_{0.95}O_x$ obtained above was subjected to hydrogen pre-reduction treatment (also simply referred to as "pre-treatment") by the following method. After the metal-supported material powder was pressed at 20 MPa for 5 minutes to prepare a disk, which was pulverized in a mortar and classified with a sieve to produce a pellet. The size of the pellet was adjusted to 250 to 500 μm in diameter. An INCONEL (trademark) catalyst reaction tube having a diameter of 7 mm was filled with 100 mg of pellets, and the front and back of the catalyst layer were fixed with quartz wool. This reaction tube was installed in a fixed bed flow type reactor for measuring ammonia synthesis activity, and 60 mL min$^{-1}$ $H_2$, which was treated with a gas purifier (gas purification filter MC50-904F, manufactured by SAES), was circulated through the reaction tube filled with pellets. The temperature was raised to 700° C. at 10° C. min$^{-1}$ and heated at 700° C. for 1 hour to obtain a $Co/Ce_{0.5}La_{0.5}O_x$_700° C. reduction.

Example 102

<$Co/Ba_{0.05}La_{0.95}O_x$_500° C. Reduction>

A $Co/Ba_{0.05}La_{0.95}O_x$_500° C. reduction was obtained by the same operation as in Example 101 except that the holding temperature in the pre-treatment was set to 500° C. in Example 101.

Example 103

<$Co/Ba_{0.05}La_{0.95}O_x$_800° C. Reduction>

A $Co/Ba_{0.05}La_{0.95}O_x$_800° C. reduction was obtained by the same operation as in Example 101 except that the holding temperature in the pre-treatment was set to 800° C. in Example 101.

Example 104

<$CoBa_{0.05}La_{0.95}O_x$_600° C. Reduction>

A $Co/Ba_{0.05}La_{0.95}O_x$_600° C. reduction was obtained by the same operation as in Example 101 except that the holding temperature in the pre-treatment was set to 600° C. in Example 101.

Example 105

<$Co/Ba_{0.01}La_{0.99}O_x$_700° C. Reduction>

A $Co/Ba_{0.01}La_{0.99}O_x$_700° C. reduction was obtained by the same operation as in Example 101 except that the holding temperature in the pre-treatment was set to 700° C. in Example 101.

Example 106

<$Co/Ba_{0.03}La_{0.97}O_x$_700° C. Reduction>

A $Co/Ba_{0.03}La_{0.97}O_x$_700° C. reduction was obtained by the same operation as in Example 101 except that the ratio of Ba and La raw materials was changed in Example 101.

Example 107

<$Co/Ba_{0.1}La0.9O_x$_700° C. Reduction>

A $Co/Ba_{0.1}La_{0.9}O_x$_700° C. reduction was obtained by the same operation as in Example 101 except that the ratio of Ba and La raw materials was changed in Example 101.

Example 108

<$Co/Ba_{0.05}La_{0.95}O_x$_500° C._72 Hours Reduction>

A $Co/Ba_{0.05}La_{0.95}O_x$_500° C._72 hours reduction was obtained by the same operation as in Example 101 except that the holding temperature was set to 500° C. and the holding time was set to 72 hours in the pre-treatment in Example 101.

With respect to the supported materials of Examples 101 to 103, the results of measuring the ammonia synthesis activity at 350° C. and 1.0 MPa are shown in Table 12, and the results of measuring the ammonia synthesis activity at 400° C. and 1.0 MPa are shown in Table 13. From these tables, it is revealed that the optimum reduction temperature in the pre-treatment is 700° C. It was also found that the specific surface area and the dispersity of the catalyst decreased with increasing reduction temperature.

TABLE 12

| Catalyst | $NH_3$ rate/mmol $g^{-1}h^{-1}$ | SSA/ $m^2g^{-1}$ | Disp · H/Co | TOF $(S^{-1})$ |
|---|---|---|---|---|
| 500° C. red. | 2.4 | 37.5 | 0.0130 | 0.015 |
| 700° C. red. | 19.3 | 24.9 | 0.0124 | 0.127 |
| 800° C. red. | 17.0 | 10.1 | 0.0058 | 0.241 |
| Ba none 700° C. red. | 5.3 | 25.8 | 0.0066 | 0.066 |

TABLE 13

| Catalyst | $NH_3$ rate/mmol $g^{-1}h^{-1}$ | SSA/ $m^2g^{-1}$ | Disp · H/Co | TOF $(S^{-1})$ |
|---|---|---|---|---|
| 500° C. red. | 6.8 | — | 0.0130 | 0.043 |
| 700° C. red. | 35.4 | — | 0.0124 | 0.233 |
| 800° C. red. | 32.6 | — | 0.0058 | 0.460 |
| Ba none 700° C. red. | 10.8 | — | 0.0066 | 0.092 |

(Ammonia Synthesis Activity: Dependence on Reduction Temperature)

Figure 9:
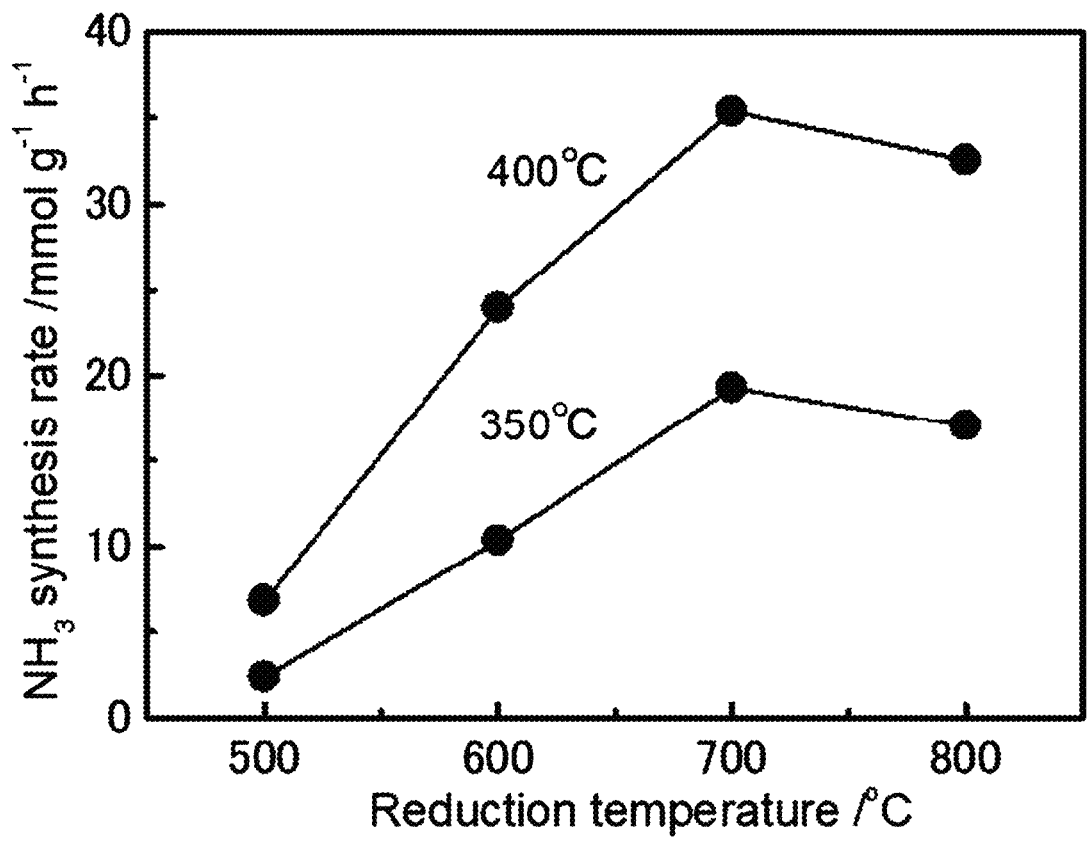
FIG. 9 is a graph showing the reduction temperature and ammonia synthesis activity (reaction pressure 1.0 MPa) of $Co/Ba_{0.05}La_{0.95}O_x$.

With respect to the supported materials of Examples 101 to 104, FIG. 8 and FIG. 9 show the results of measuring the ammonia synthesis activity after carrying out ammonia synthesis at various temperatures. The numerical values thereof are shown in Tables 14 and 15. From these figures, it can be understood that the ammonia synthesis activity improves as the reduction temperature in the pre-treatment increases and 700° C. is optimal.

TABLE 14

| Reaction temperature/° C. | 500° C. red. (yield) | 500° C. red. (rate) | 700° C. red. (yield) | 700° C. red. (rate) | 700° C. red. (yield) | 700° C. red. (rate) | 800° C. red. (yield) | 800° C. red. (rate) |
| --- | --- | --- | --- | --- | --- | --- | --- | --- |
| 300 | 0.049 | 0.792 | 0.206 | 3.307 | 0.437 | 7.028 | 0.379 | 6.091 |
| 350 | 0.148 | 2.376 | 0.643 | 10.335 | 1.201 | 19.29 | 1.062 | 17.055 |
| 400 | 0.423 | 6.788 | 1.491 | 23.954 | 2.203 | 35.401 | 2.027 | 32.573 |
| 450 | 1.211 | 19.45 | 2.503 | 40.224 | 3.129 | 50.28 | 2.763 | 44.387 |

TABLE 15

| Reduction temperature/° C. | 350° C. mmol h$^{-1}$g$^{-1}$ | 400° C. Mmol h$^{-1}$g$^{-1}$ |
| --- | --- | --- |
| 500 | 2.376 | 6.788 |
| 600 | 10.335 | 23.954 |
| 700 | 19.29 | 35.401 |
| 800 | 17.055 | 32.573 |

(Ammonia Synthesis Activity: Dependence on Barium Concentration)

Figure 10:
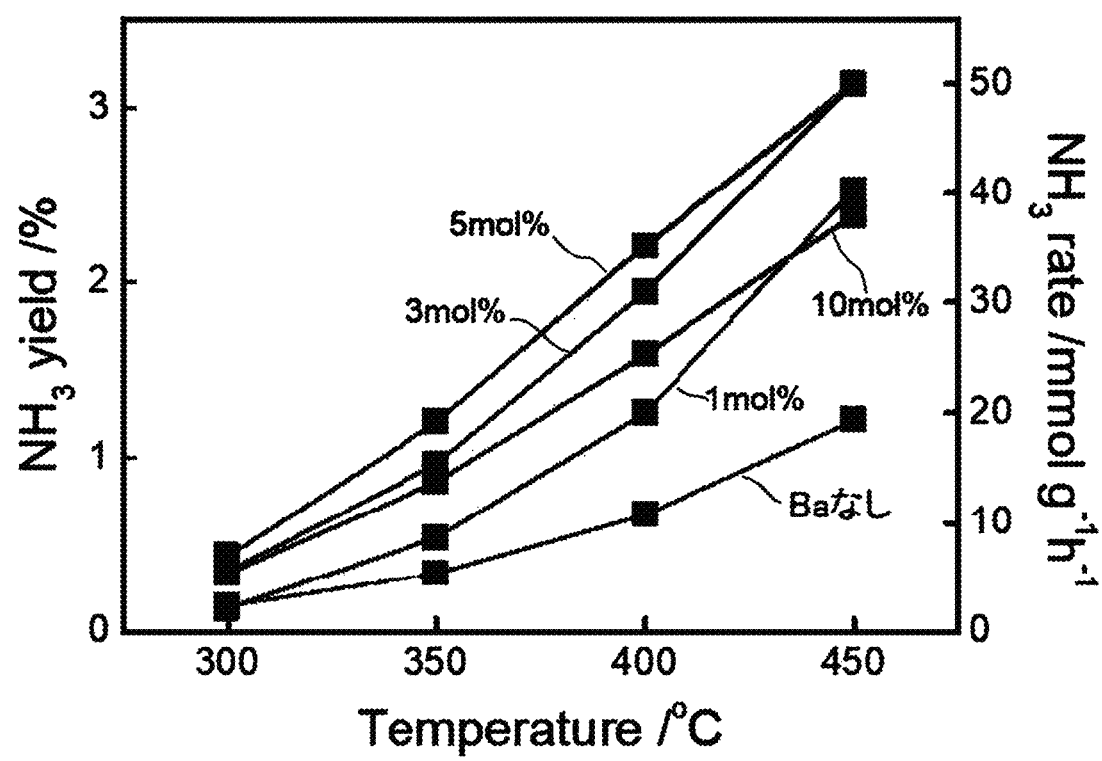
FIG. 10 is a graph showing the reaction temperature and ammonia synthesis activity (reaction pressure 1.0 MPa) of $Co/BaLaO_x$.
Figure 11:
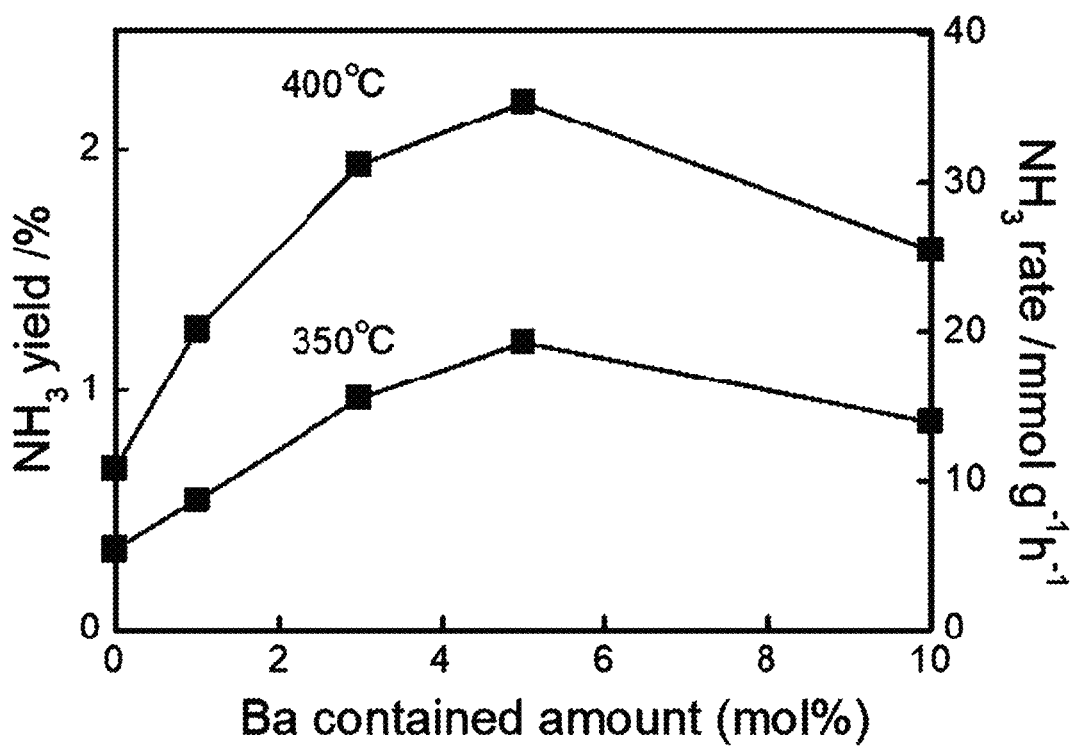
FIG. 11 is a graph showing the barium addition amount and ammonia synthesis activity (reaction pressure 1.0 MPa) of $Co/BaLaO_x$.

With respect to the supported materials of Example 101 and Examples 105 to 107, FIG. 10 and FIG. 11 show the results of measuring the ammonia synthesis activity after carrying out ammonia synthesis at various temperatures. The numerical values thereof are shown in Tables 16 and 17. Similarly, ammonia synthesis activity with no addition of barium (barium concentration=0) is also exhibited. From these figures, it is understood that as the amount of barium added increases, the ammonia synthesis activity improves, and the activity becomes maximum at the barium concentration of 5 mol %, but the ammonia synthesis activity decreases at the barium concentration of 10 mol %.

TABLE 16

| Reaction temperature/° C. | Ba none (yield) | Ba none (rate) | 1 mol % (yield) | 1 mol % (rate) | 3 mol % (yield) | 3 mol % (rate) | 5 mol % (yield) | 5 mol % (rate) | 10 mol % (yield) | 10 mol % (rate) |
| --- | --- | --- | --- | --- | --- | --- | --- | --- | --- | --- |
| 300 | 0.148 | 2.376 | 0.132 | 2.121 | 0.347 | 5.581 | 0.437 | 7.02 | 0.334 | 5.374 |
| 350 | 0.333 | 5.346 | 0.541 | 8.698 | 0.963 | 15.475 | 1.201 | 19.29 | 0.862 | 13.849 |
| 400 | 0.673 | 10.819 | 1.254 | 20.153 | 1.939 | 31.161 | 2.203 | 35.401 | 1.583 | 25.438 |
| 450 | 1.211 | 19.45 | 2.524 | 40.561 | 3.129 | 50.28 | 3.129 | 50.28 | 2.378 | 38.213 |

TABLE 17

| Ba addition amount/mol % | 350° C. (yield) | 350° C. (yield) | 400° C. (yield) | 400° C. (rate) |
| --- | --- | --- | --- | --- |
| 0 | 0.333 | 5.346 | 0.673 | 10.819 |
| 1 | 0.541 | 8.698 | 1.254 | 20.153 |
| 3 | 0.963 | 15.475 | 1.939 | 31.161 |
| 5 | 1.201 | 19.29 | 2.203 | 35.401 |
| 10 | 0.862 | 13.849 | 1.583 | 25.438 |

(H/Co and TOF)

With respect to the supported materials of Examples 101 to 104, FIG. 12 shows H/Co and TOF when ammonia synthesis was performed at 350° C. and 1 MPa. The numerical values thereof are shown in Table 18. From this figure, it was found that as the reduction temperature increases, the dispersity decreases and the TOF significantly improves.

TABLE 18

| Reduction temperature/° C. | H/Co | TOF/s$^{-1}$ |
|---|---|---|
| 500 | 0.01301 | 0.015 |
| 700 | 0.01243 | 0.127 |
| 800 | 0.0058 | 0.241 |

(Dependence on Reaction Pressure)

With respect to the supported material of Example 101, FIG. 13 shows the results of measuring the ammonia synthesis activity after carrying out ammonia synthesis at 350° C. under various pressures. For comparison, the results of measuring the ammonia synthesis activity with Ru/CeO$_2$ and Cs$^+$/Ru/MgO in the same operation are also shown in the figure. The numerical values thereof are shown in Table 19. From this figure, it is understood that the catalysts of Examples have a significantly increased activity under a pressure up to 3.0 MPa, whereas these comparative catalysts have almost a flat level of ammonia synthesis activity at higher pressures than 1.0 MPa. Moreover, for the supported material of Example 101, the ammonia synthesis was performed under various pressures at 400° C., and the result of measuring the ammonia synthesis activity is shown in FIG. 17.

TABLE 19

| Pressure/ Mpa | Co/Ba$_{0.5}$La$_{0.95}$O$_x$ (yield) | Co/Ba$_{0.5}$La$_{0.95}$O$_x$ (rate) | Co/CeO$_2$ (yield) | Co/CeO$_2$ (rate) | Cs/Ru/MgO (yield) | Cs/Ru/MgO (rate) |
|---|---|---|---|---|---|---|
| 0.1 | 0.296 | 4.754 | 0.343 | 5.516 | 0.41 | 6.595 |
| 1 | 1.201 | 19.29 | 0.669 | 10.748 | 0.678 | 10.814 |
| 3 | 2.223 | 35.718 | 0.853 | 13.703 | 0.708 | 11.37 |

(Reduction Treatment Time)

For the supported materials of Examples 101 to 104 and Example 108, ammonia synthesis was performed at a reaction temperature of 350° C. under pressures of 1.0 MPa and 3.0 MPa, and the results of measuring the ammonia synthesis activity are shown in FIG. 14. From this figure, it is found that, for example, under a pressure of 3.0 MPa, the ammonia synthesis activity is higher in the reducing condition of at 700° C. for 1 hour than in the reducing condition of at 500° C. for 72 hours.

(Residual Carbonate)

FIG. 15 shows the results of powder X-ray diffraction performed on the supported materials of Examples 101 to 103. Further, an example (fresh) in which the reduction process is not performed is also shown. From this figure, it is found that the peak of a crystalline BaCO$_3$ disappears when the reduction temperature is 500° C. or more. It can also be seen that the Co peak becomes higher as the reduction temperature increases. Note that since BaO is amorphous, no peak is observed.

(STEM-EELS)

FIG. 16 shows the results of observation of a transmission electron microscope image of the supported material of Example 101. In FIG. 16, (a) shows a STEM image of the supported material, and it can be confirmed that cobalt particles (region surrounded by a dotted square) are supported on the surface of the composite oxide. The right side of the figure is an image in which the EEL spectral intensity is mapped. (b) in the figure is an image (overlay) in which all elements are superimposed, (c) is an image (Co) of cobalt. (d) is an image (Ba) of barium and (e) is an image (La) of lanthanum.

From this figure, it is found that La and Ba can be individually observed for the composite oxide (support), and they are in a state of being mixed without forming a solid solution. Moreover, for cobalt particles, it is understood that Ba and a small amount of La can be observed on the particle surface and these are laminated on the particle surface.

The invention claimed is:

1. A composite oxide consisting of a composition of the following general formula:

the composite oxide comprising an oxide of A and an oxide of X in a mixed state without being solid-solved, where A represents an element selected from the group consisting of La, Nd, Pm, Sm, Eu, Gd, Dy, Ho, Em, Tm and Lu;
X represents Ba;
n is 0<n<1;
y is 0<y<1;
n+y=1; and
x represents the number of oxygen atoms necessary for the composite oxide to remain electrically neutral.

2. The composite oxide according to claim 1, wherein the A is La.

3. The composite oxide according to claim 1, wherein oxide particles of X are deposited on a surface of oxide particles of A.

4. A metal-supported material, wherein cobalt particles are supported on the composite oxide according to claim 1.

5. The metal-supported material according to claim 4, wherein a layer comprising fine particles composed of the oxide of A and the oxide of X is provided on the cobalt particles.

6. The metal-supported material according to claim 4, wherein a ratio between a Co dispersity (D$_{ads}$) determined by the H$_2$ pulse chemisorption method and a Co dispersity (D$_{TEM}$) expected from the average particle diameter of the Co particles determined from a TEM image satisfies the following formula:

$$0 < D_{ads}/D_{TEM} < 1.$$

7. The metal-supported material according to claim 4, wherein an average particle diameter of the cobalt particles supported on the composite oxide is 100 nm or less.

8. An ammonia synthesis catalyst comprising the metal-supported material according to claim 4.

9. A method for producing the metal-supported material according to claim 4, the method comprising:
mixing an A precursor containing A and an X precursor containing X to obtain a mixture;
calcining the mixture at a temperature of 600° C. or more to obtain a support composed of the composite oxide;
preparing a supported material before pre-reduction treatment, by supporting a compound containing cobalt on the composite oxide; and reducing the supported material before pre-reduction treatment, at a temperature of 400° C. or more.

10. A method for producing ammonia by bringing hydrogen and nitrogen into contact with a catalyst, wherein the catalyst is the ammonia synthesis catalyst according to claim 8.

\* \* \* \* \*

UNITED STATES PATENT AND TRADEMARK OFFICE
CERTIFICATE OF CORRECTION

| | | |
|---|---|---|
| PATENT NO. | : 12,378,131 B2 | Page 1 of 1 |
| APPLICATION NO. | : 17/053436 | |
| DATED | : August 5, 2025 | |
| INVENTOR(S) | : Katsutoshi Nagaoka | |

It is certified that error appears in the above-identified patent and that said Letters Patent is hereby corrected as shown below:

In the Specification

Column 1, Line 14, delete "2," and insert -- 26, --

Signed and Sealed this
Seventh Day of October, 2025

John A. Squires
*Director of the United States Patent and Trademark Office*